(12) United States Patent  (10) Patent No.: US 8,810,141 B2
Takeda et al.  (45) Date of Patent: Aug. 19, 2014

(54) ILLUMINATION LIGHT CONTROL APPARATUS AND LED ILLUMINATION SYSTEM

(75) Inventors: Toru Takeda, Tokyo (JP); Akeo Kasakura, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/619,829

(22) Filed: Sep. 14, 2012

(65) Prior Publication Data

US 2013/0009560 A1 Jan. 10, 2013

Related U.S. Application Data

(63) Continuation of application No. PCT/JP2011/058879, filed on Apr. 8, 2011.

(30) Foreign Application Priority Data

Apr. 9, 2010 (JP) ................................. 2010-090905
Dec. 24, 2010 (JP) ................................. 2010-288971

(51) Int. Cl.
*H05B 37/02* (2006.01)

(52) U.S. Cl.
USPC .......................................... 315/201; 315/192

(58) Field of Classification Search
USPC .................. 315/201, 250, 294, 192, 297, 307
See application file for complete search history.

(56) References Cited

U.S. PATENT DOCUMENTS

| | | | |
|---|---|---|---|
| 6,411,045 B1 | 6/2002 | Nerone | |
| 6,412,971 B1 | 7/2002 | Wojnarowski et al. | |
| 6,510,995 B2 * | 1/2003 | Muthu et al. | ................. 235/454 |
| 2003/0043611 A1 * | 3/2003 | Bockle et al. | ................. 363/131 |
| 2006/0202915 A1 | 9/2006 | Chikugawa | |
| 2008/0203936 A1 | 8/2008 | Mariyama et al. | |

(Continued)

FOREIGN PATENT DOCUMENTS

| | | |
|---|---|---|
| CN | 1459216 A | 11/2003 |
| CN | 1683820 A | 10/2005 |

(Continued)

OTHER PUBLICATIONS

International Search Report issued on Jun. 14, 2011 for PCT/JP2011/058879 filed on Apr. 8, 2011 with English Translation.

(Continued)

*Primary Examiner* — Daniel D Chang
(74) *Attorney, Agent, or Firm* — Oblon, Spivak, McClelland, Maier & Neustadt, L.L.P.

(57) ABSTRACT

An LED illumination system comprises a light control apparatus, and an LED illumination instrument including first and second LEDs. The light control apparatus includes: a first control unit determining a total amount of average currents to be supplied to the first and the second LEDs at every predetermined cycle depending on an operation amount of a first operation unit; a second control unit determining a ratio between the average currents to be supplied to the first and second LEDs respectively at the every predetermined cycle depending on an operation amount of a second operation unit; and a supply unit generating currents having the total amount of the average currents and the ratio between the average currents determined by the first and second control units at the every predetermined cycle by using a DC power source and supplying the currents to the LED illumination instrument.

13 Claims, 39 Drawing Sheets

(56) References Cited

U.S. PATENT DOCUMENTS

| | | | |
|---|---|---|---|
| 2010/0052566 A1 | 3/2010 | Kitamura et al. | |
| 2010/0066258 A1* | 3/2010 | Yasuda | 315/186 |
| 2010/0079085 A1* | 4/2010 | Wendt et al. | 315/294 |

FOREIGN PATENT DOCUMENTS

| | | |
|---|---|---|
| CN | 101536607 A | 9/2009 |
| CN | 101658071 A | 2/2010 |
| JP | 61-138259 | 8/1986 |
| JP | 5-49265 | 2/1993 |
| JP | 11-220501 | 8/1999 |
| JP | 2001-351789 | 12/2001 |
| JP | 2004-111104 | 4/2004 |
| JP | 2004-519826 | 7/2004 |
| JP | 2004-235097 | 8/2004 |
| JP | 2005-190751 | 7/2005 |
| JP | 2005-235565 | 9/2005 |
| JP | 2007-005743 | 1/2007 |
| JP | 2008-218043 | 9/2008 |
| JP | 2009-026544 | 2/2009 |
| JP | 2009-110918 | 5/2009 |
| JP | 2009-158114 | 7/2009 |
| JP | 2009-170240 | 7/2009 |
| TW | 2008-49664 A | 12/2008 |
| WO | 03/056878 | 7/2003 |
| WO | WO 2005/048658 A1 | 5/2005 |
| WO | 2008/084771 | 7/2008 |
| WO | 2008/149286 | 12/2008 |

OTHER PUBLICATIONS

Japanese Office Action mailed on Feb. 7, 2012, issued for JP Application No. 2011-239609 (with English translation).

Japanese Office Action mailed on Jun. 26, 2012, issued for JP Application No. 2011-239609 (with English translation).

English Translation of the International Preliminary Report on Patentability issued Nov. 15, 2012, in PCT/JP2011/058879.

English Translation of the Written Opinion of the International Searching Authority issued Jun. 14, 2011, in PCT/JP2011/058879.

Combined Chinese Office Action and Search Report issued Dec. 10, 2013 in Patent Application No. 201180011139.0 (with English language translation).

EPO Search Report issued May 8, 2014 in EP 11737106.2.

Combined Notice of Examiner's Opinion and Search Report, issued Apr. 17, 2014 in Taiwanese Patent Application No. 100112402 (with English Translation).

* cited by examiner

ILLUMINATION LIGHT CONTROL APPARATUS AND LED ILLUMINATION SYSTEM

CROSS-REFERENCE TO RELATED APPLICATION

This is a continuation of Application PCT/JP2011/058879, filed on Apr. 8, 2011, now pending, and claims priority from Japanese Patent Application 2010-090905 which was filed on Apr. 9, 2010 and Japanese Patent Application 2010-288971 which was filed on Dec. 24, 2010, the contents of which are herein wholly incorporated by reference.

BACKGROUND OF THE INVENTION

The present inventions relate to an illumination light control apparatus for an LED (Light Emitting Diode) light-emitting device. The present invention also relates to an illumination system including the illumination light control apparatus an LED illumination apparatus.

When the color temperature of the light from any conventional illumination equipment such as incandescent lamps and fluorescent lamps for illumination of the room was made adjustable, the color temperature was controlled by switching on/off between a high color temperature light source such as a halogen lamp and a low color temperature light source such as an incandescent lamp both installed in the same room.

A wide range illumination apparatus such as the stage lighting, in which incandescent bulbs are used as light sources, the hue and the color temperature are adjusted by using various optical filters, since, the color of the illumination light and the color temperature of the white color are important direction factors under the stage lighting.

In recent years, LED light sources such as LED bulbs become popular and are applied to the illumination use in place of the conventional illumination equipment such as incandescent bulbs. Since the feature of the LED's as light sources is their lower power consumption and longer life than those of incandescent bulbs and fluorescent lamps, it is desired to develop the control system for control the hue and the color temperature for white LED's.

As a prior art of this invention, a circuit in which alternative voltage is supplied to both ends of a pair of LED's or a pair of LED strings (including a plurality of LED's connected in series) was already known as referred to as, for example, in Patent Documents 1, 2, 3.

As further example of prior art of this invention, it was also known an LED driver circuit which drove two LED strings connected anti-parallel each other, wherein the timing control is performed as referred to as in, for example, Patent Document 4. The driver circuit independently controls the conduction period of each positive half waves and negative half waves of AC power supplied to the LED strings.

[Patent Document 1] U.S. Pat. No. 6,412,971 (FIG. 23, FIG. 25, FIG. 26)
[Patent Document 2] Japanese Patent Application Laid-open No. 2002-281764 (FIG. 1)
[Patent Document 3] Japanese Patent Application Laid-open No. 2005-513819 (PCT) (FIG. 2, FIG. 3)
[Patent Document 4] Japanese Patent Application Laid-open No. 2008-218043
[Patent Document 5] Japanese Utility Model Application Laid-open No. 61-138259
[Patent Document 6] Japanese Patent Application Laid-open No. 2008-171984

In the case of control a color temperature of a white light illumination using white LED light sources, the color temperature can be made adjustable by switching on/off the LED light sources having different color temperature.

However, if luminance (amount of the light emitted) and chromaticity (hue (color phase), color temperature) become possible to can be made variable by adjusting a driving current supplied to a single LED illumination apparatus, the LED illumination apparatus can appeal to a wide range of consumers.

SUMMARY OF THE INVENTION

In one embodiment of the present invention, an object of the embodiment is to provide such a technique that an AC current is converted into a DC current, the DC current is further converted into an AC current, and the AC current is supplied to a first LED and a second LED connected in antiparallel, thus the luminance and the colors or the color temperatures of the first and second LED's are made adjustable.

In another embodiment of the present invention, an object of the present invention is to provide such a technique that a current, which has a total amount and a ratio of average currents for turning ON a first LED and a second LED at desired luminance and chromaticity, is generated from a DC current converted from an AC current, and the current can be supplied to the first LED and the second LED.

A first embodiment of the present invention is an LED illumination system comprising a light control apparatus and an LED illumination apparatus including a first LED and a second LED which have mutually different chromaticity and which are connected in parallel with opposite polarity each other, so called "anti-parallel".

The light control apparatus comprises:
a DC current generating unit which generates a DC power source from an AC current supplied from an AC power source;
a first operation unit which is provided to operate a luminance of an illumination light from the first LED and the second LED;
a second operation unit which is provided to operate a chromaticity of the illumination light from the first LED and the second LED;
a first control unit which determines a total amount of average currents to be supplied to the first LED and the second LED at every predetermined period depending on an operation amount of the first operation unit;
a second control unit which determines a ratio between the average currents to be supplied to the first LED and the second LED respectively at the every predetermined period depending on an operation amount of the second operation unit; and
a supply unit which converts the DC current supplied from the DC current generating unit to an AC current including one of positive and negative currents to be supplied to the first LED and the other of the positive and negative currents to be supplied to the second LED as having the total amount of the average currents and the ratio between the average currents determined by the first and second control units at the every predetermined period and which supplies the AC current to the LED illumination apparatus.

The first LED and the second LED may include a pair of single LED which has different chromaticity each other. The pair of LED's is connected anti-parallel. The first LED and the second LED may also includes a pair of LEDs, so-called "LED string", in each of which numbers of LED's are connected in series each other. The first and second LED's have different chromaticity. The term, "wave length region of emitted light", means a concept including chromaticity in this specification. The term, "chromaticity", includes hue (color phase) and color temperature also in this specification. Therefore, the first LED and the second LED having different hues or different color temperatures are applicable. The "LED" may include not only light-emitting diodes made from III-V material but also light emitted diodes made from organic materials, so-called OLED('s).

The LED illumination system in the first embodiment of the present invention may have an arrangement that the first control unit includes a comparator which compares a triangular wave voltage having a cycle equal to that of an AC voltage of the AC power source with a reference voltage corresponding to the operation amount of the second operation unit for defining a slice level for the triangular wave voltage and which outputs a positive/negative rectangular wave voltage;

the second control unit includes a pulse width adjusting circuit which determines a duty ratio of the current to be supplied to the LED illumination apparatus in each of positive and negative periods of time in 1 cycle of the positive/negative rectangular wave voltage depending on the operation amount of the first operation unit; and the supply unit supplies the positive current at the duty ratio determined by the pulse width adjusting circuit to one of the first LED and the second LED in the positive period of time of the positive/negative rectangular wave voltage, while the supply unit supplies the negative current at the duty ratio determined by the pulse width adjusting circuit to the other of the first LED and the second LED in the negative period of time of the positive/negative rectangular wave voltage.

The LED illumination system in the first embodiment of the present invention may have an arrangement that the supply unit includes a driving circuit into which positive and negative pulses are inputted at the every predetermined cycle so that the positive current is supplied to the LED illumination apparatus for a time in which the positive pulse is turned ON, while the negative current is supplied to the LED illumination apparatus for a time in which the negative pulse is turned ON;

the first control unit determines the ON time of the positive pulse and the ON time of the negative pulse in the predetermined cycle depending on the operation amount of the first operation unit; and the second control unit determines a ratio between the ON time of the positive pulse and the ON time of the negative pulse in the predetermined cycle depending on the operation amount of the second operation unit.

The LED illumination system in the first embodiment of the present invention have an arrangement that the first control unit determines numbers of the positive and negative pulses having predetermined pulse widths respectively in the predetermined cycle depending on the operation amount of the first operation unit; and the second control unit determines the pulse widths of the positive and negative pulses.

The LED illumination system in the first embodiment of the present invention may apply a configuration that the light control apparatus is connected to the LED illumination apparatus via only a pair of two wiring lines.

A second embodiment of the present invention is concerning to a light control apparatus which controls an LED illumination apparatus including a first LED and a second LED which have different wavelength regions of emitted light each other and which are connected in anti-parallel, the light control apparatus comprising:

a DC current generating (rectifying unit) unit which generates a DC power source converted from an AC current provided from an AC power line;

a first operation unit which is provided to operate a luminance of an illumination light brought about by turning ON the first LED and the second LED;

a second operation unit which is provided to operate a color or a color temperature of the illumination light brought about by turning ON the first LED and the second LED;

a first control unit which determines a total amount of average currents to be supplied to the first LED and the second LED at every predetermined cycle depending on an operation amount of the first operation unit;

a second control unit which determines a ratio between the average currents to be supplied to the first LED and the second LED respectively at the every predetermined cycle depending on an operation amount of the second operation unit; and a supply unit which generates an AC current, either one of positive and negative currents of which is supplied to the first LED and the other one of positive and negative currents of which is supplied to the second LED, having the total amount of the average currents and the ratio between the average currents determined by the first and second control units at the every predetermined cycle by using the DC power source obtained by the DC current generating unit and which supplies the AC current to the LED illumination apparatus.

A third embodiment of the present invention is a LED illumination system, comprising:

a light control apparatus; and an LED illumination instrument including a first LED and a second LED which have different chromaticity each other, wherein the light control apparatus comprises:

a DC current generating unit which generates a DC power source from an AC current received from an AC power line;

a first operation unit which is provided to operate a luminance of an illumination light from the first LED and the second LED;

a second operation unit which is provided to operate a chromaticity of the illumination light from the first LED and the second LED;

a first control unit which determines a total amount of average currents to be supplied to the first LED and the second LED at every predetermined cycle depending on an operation amount from the first operation unit;

a second control unit which determines a ratio between the average currents to be supplied to the first LED and the second LED respectively at the every predetermined cycle depending on an operation amount from the second operation unit; and a supply unit which generates a current to be supplied to the first LED and a current to be supplied to the second LED as having the total amount of the average currents and the ratio between the average currents determined by the first and second control units at the every predetermined cycle by using the DC power source obtained by the DC current generating unit and which supplies the currents to the LED illumination instrument.

a fourth embodiment of the present invention is an LED illumination instrument comprising:

a first LED and a second LED which have different chromaticity each other;

a DC current generating unit which generates a DC current from an AC current;

receiving means which receives total amount information of average currents to be supplied to the first LED and the second LED and ratio information of the average currents to be supplied to the first LED and the second LED respectively from a light control apparatus;

calculating means which calculates a total amount and ratio of the average currents using the total amount information and the ratio information; and Supply means which generates currents corresponding to the total amount and the ratio of the average currents and supplies the currents to the first LED and the second LED.

According to one embodiment of the present invention, it makes possible to provide a technique that the DC current converted from an AC current is further converted into an AC current, and the AC current is supplied to a first LED and a second LED connected in antiparallel, then the luminance and the hue or the color temperatures of the first and second LED's are made adjustable.

According to other aspect of the present invention, it makes also possible to provide a technique that a current, which has a total amount and a ratio of average currents for exciting a first LED and a second LED at desired luminance and chromaticity, is generated from a DC current converted from an AC current, and the current can be supplied to the first and second LED.

DETAILED DESCRIPTION OF THE EMBODIMENTS

Embodiments of the present invention will be explained below with reference to the drawings. Embodiments are exemplified as constructed by way of example. The present invention is not limited to the construction or arrangement of Embodiments.

First Embodiment

Figure 1:
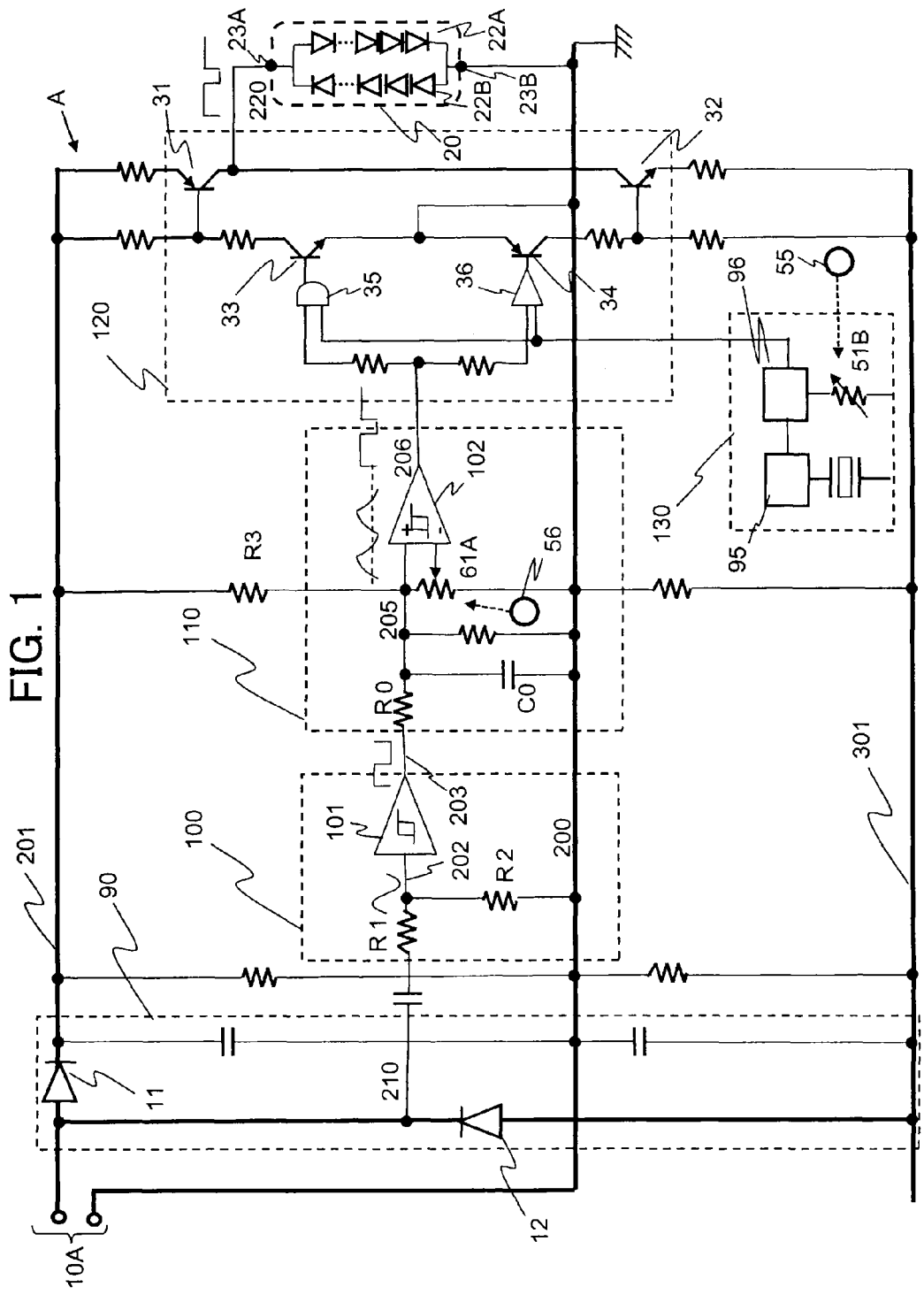
FIG. 1 shows an example of circuit arrangement of an illumination system (LED light-emitting device and light control apparatus) according to a first embodiment.

FIG. 1 shows an example of circuit arrangement of an LED illumination system according to a first embodiment of the present invention. The LED system comprises an illumination control apparatus A for LED's, and an LED illumination apparatus 20 (also referred to as "LED light-emitting device 20" or "light-emitting device 20") which is connected the light control apparatus A. The light control apparatus A adjusts the luminance (amount of the light emitted) and the chromaticity (both hue and color temperature) of the illumination light emitted by LED's included in the LED illumination apparatus 20.

In this arrangement, the LED illumination apparatus 20 (light-emitting device 20) includes a set of an LED group 22A (first LED group) and an LED group 22B (second LED group) which are connected in anti-parallel each other. Each of the LED groups 22A, 22B is composed of a predetermined number of (for example, twenty) LED elements which are connected in series. The preferred number of the LED element or LED elements comprising in the LED groups 22A, 22B is not less than 1. The LED groups 22A, 22B are manufactured, for example, on a sapphire substrate.

The LED illumination apparatus 20 further comprises two terminals 23A, 23B which are led out from respective wiring lines for connecting the LED group 22A and the LED group 22B in parallel. The positive or negative driving current is applied between the two terminals 23A, 23B. When the positive current is applied, then either one of the LED group 22A and the LED group 22B is turned ON (subjected to the lighting), and the other one is turned OFF (subjected to the blackout). On the other hand, when the negative current is applied, then one is turned OFF, and the other is turned ON.

In the example shown in FIG. 1, the light control apparatus A and the LED illumination apparatus 20 are connected such that LED group 22A is turned ON when the positive driving current is supplied to the terminal 23A, and the LED group 22B is turned ON when the negative driving current is supplied to the terminal 23A.

In this embodiment, the light emitted by the LED elements included in each of the LED groups 22A, 22B has wavelength of 410 nm and a forward terminal voltage of 3.5 V. In a case that twenty LED elements are connected in series, the maximum amount of the light is emitted at a DC forward voltage of 70 V.

Each LED element included in the LED group 22A of the light emitting device 20 contains phosphor which is excited by the light of 410 nm and emits white light whose color temperature is 3000 K. These LED elements emit light when they are excited by either positive or negative half wave of AC current supplied between terminals 23A and 23B.

On the other hand, each LED element included in the LED group 22B contains phosphor which is excited by the light of 410 nm and emits white light whose color temperature is 5000 K. These LED elements emit light when they are excited by the other positive or negative half wave of the AC current supplied between terminals 23A and 23B.

However, it is possible to appropriately change numbers of LED elements included in the LED groups 22A, 22B. It is also allowable to use one LED element. This embodiment is constructed such that the LED groups 22A, 22B emit the white lights having the different color temperatures each other. However, in this specification, the term "wavelength region of the light emitted" includes the concept of the chromaticity (hue and color temperature). It is also allowable to provide such an arrangement that the LED groups 22A, 22B have different chromaticity each other. The chromaticities, which are possessed by the LED groups 22A, 22B respectively, is able to be appropriately set provided that the chromaticities of the LED groups 22A, 22B are different from each other.

The light control apparatus A shown in FIG. 1 further comprises input terminals 10A, a half-wave voltage doubler rectifying circuit 90 (hereinafter referred to as "rectifier circuit 90") which is provided as the DC current generating unit, a clock signal generating circuit 100, a duty ratio adjusting circuit 110, a push-pull type driving circuit 120 (hereinafter referred to as "driving circuit 120") which has complementary transistors 31, 32, and a driving pulse generating/varying circuit 130 (hereinafter referred to as "pulse width adjusting circuit 130") which generates the self-excited oscillation frequency. The LED illumination apparatus (light-emitting device) 20 is driven by the driving circuit 120. That is, the light control apparatus A supplies the driving current to the light-emitting device 20 by using output signal from the self-excited oscillation circuit whose frequency is independent from that of the commercial AC frequency.

In the light control apparatus A illustrated in FIG. 1, the input AC voltage of the commercial power source (e.g., 100 V, 50 Hz) inputted from the input terminal 10A is rectified by the rectifier circuit 90. That is, the positive voltage is rectified by a diode 11, and the positive DC current at about 120 V is supplied to a wiring line 201. The negative voltage is rectified by a diode 12, and the negative DC voltage at about 120 V is supplied to a wiring line 301. A wiring line 200 has the common ground electric potential with respect to the wiring line 201 and the wiring line 301.

±15 V, for which the wiring line 200 having the common ground electric potential, is supplied from an unillustrated power source circuit for operating the circuit to the pulse width adjusting circuit 130 and comparators (operation amplifiers) 101, 102 possessed in the clock generating circuit 100 and the duty ratio adjusting circuit 110 respectively.

Figure 2:
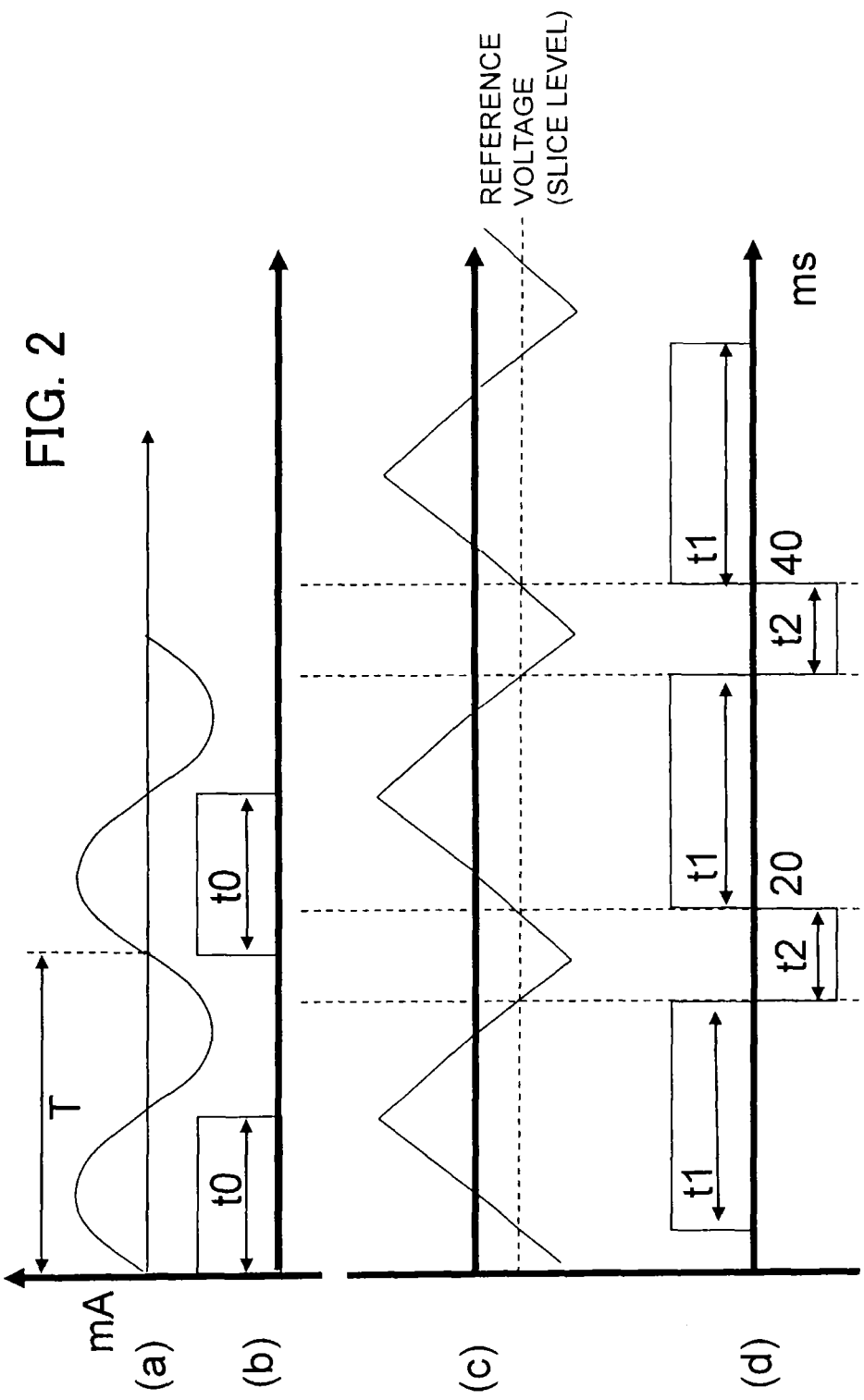
FIG. 2 illustrates the shape of shape of wave in the light control apparatus in the first embodiment.
Figure 3:
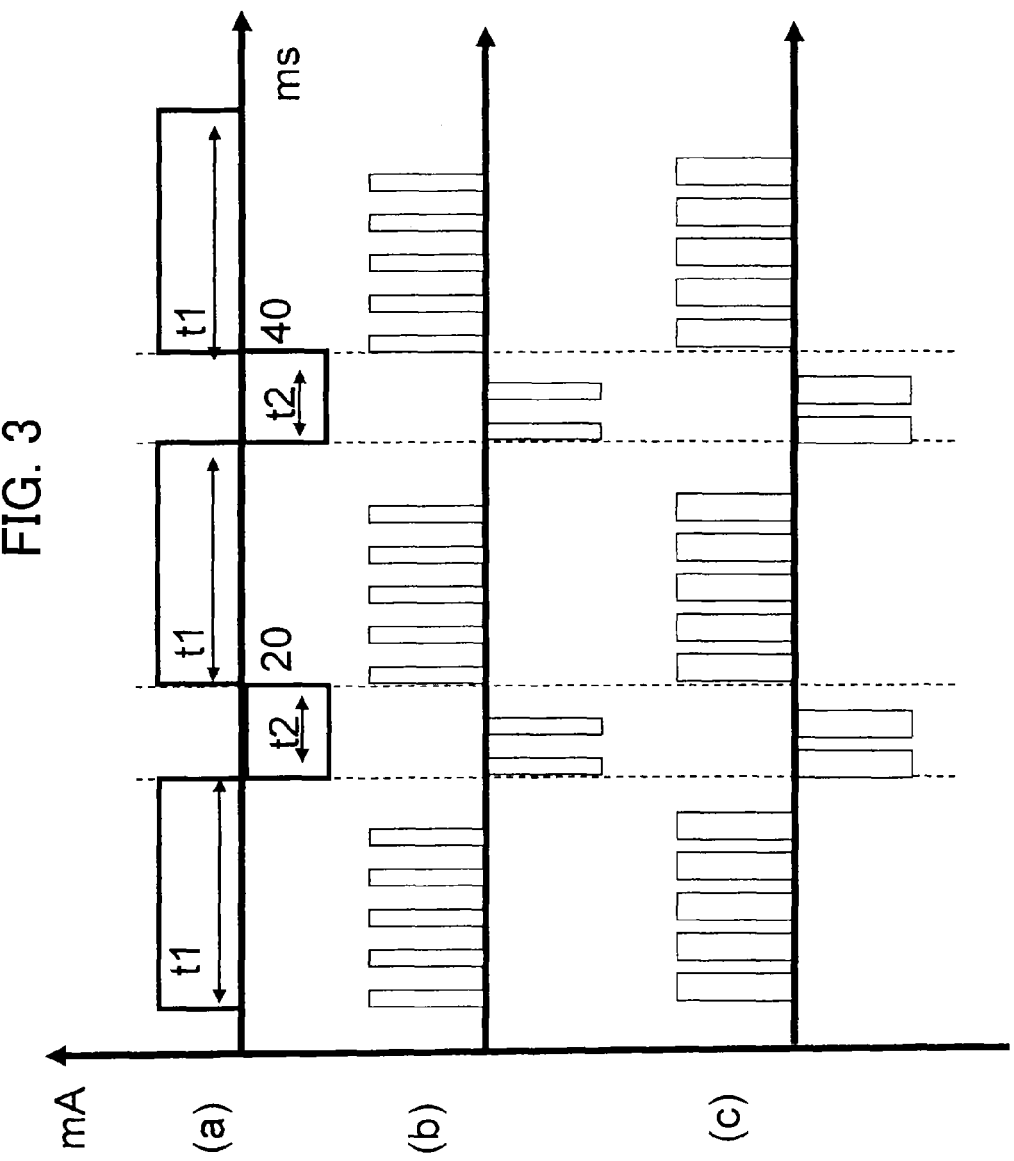
FIG. 3 illustrates the shape of wave in the light control apparatus in the first embodiment.

The operation of the respective portions of the light control apparatus A (light control circuit) will be explained below. FIGS. 2 and 3 illustrate shape of wave provided in the light control circuit. FIG. 2 (a) shows the AC voltage inputted into the input terminal 10A. FIG. 2 (b) shows the output shape of wave from the comparator 101. FIG. 2 (c) shows the triangular wave formed by an integrator (resister R0 and capacitor C0) included in the duty ratio adjusting circuit 110. FIG. 2 (d) shows the output shape of wave from the comparator 102. FIG. 3 (a) shows the output shape of wave from the comparator 102, FIG. 3 (b) schematically shows the current shape of wave supplied to the LED groups 22A, 22B, and FIG. 3 (c) schematically shows the current shape of wave supplied to the LED groups 22A, 22B.

In the clock generating circuit 100, the input AC voltage (50 Hz, 100 V) of the input terminal 10A is supplied from the wiring line 210, and the divided voltage, which is determined by the ratio (R1/R2) between the resistors R1, R2, is inputted into the comparator 101. The rectangular wave voltage as illustrated in FIG. 2 (b) is outputted to the wiring line 203 disposed on the output side of the comparator 101 in accordance with the driving of the comparator 101. The rectangular wave voltage is utilized as the clock which is turned ON/OFF at every half cycle period of time t0 of the input AC current (FIG. 2 (a)).

In the duty ratio adjusting circuit 110, the triangular wave is generated by the integration circuit constructed by the resistor R0 and the capacitor C0. The triangular wave is inputted into the non-inverting input terminal (+V) of the comparator 102. On the other hand, the inverting input terminal (−V) of the comparator 102 is connected to a movable point of a variable resistor 61A. The variable resistor 61A has one end which is connected to the wiring line 201 via a resistor R3 and another end which is connected to the wiring line 200. Accordingly, the voltage, which depends on the position of the movable point of the variable resistor 61A, is inputted as the reference voltage into the inverting input terminal of the comparator 102. A resistance value of the variable resister 61A may be operated by an operation unit (operation portion) 56 (second operation unit) for controlling color (adjusting for chromaticity).

In the comparator 102, the reference voltage acts as the slice level for the triangular wave inputted from the non-inverting input terminal. That is, the comparator 102 provides the positive output when the triangular wave is higher than the slice level, and the comparator 102 provides the negative output when the triangular wave is lower than the slice level. Therefore, the rectangular wave, in which the positive period of time t1 having the voltage higher than the reference voltage and the negative period of time t2 having the voltage lower than the reference voltage are alternately repeated, is outputted from the comparator 102 (see FIG. 2 (d)). The period of time t1 is more shortened as the slice level approaches nearer to the voltage inputted into the non-inverting input terminal. Thus, the comparator 102 functions a second controller to determine a rate between a positive average current and a negative average current in a cycle.

The driving circuit 120 has transistors 31, 32, 33, 34. The transistors 33, 31 function as a switch to supply the positive driving current via the wiring line 220 to the LED group 22A of the light-emitting device 20 in the period of time t1 as such a period of time that the output of the comparator 102 is positive. The transistors 34, 32 function as a switch to supply the negative driving current via the wiring line 220 to the LED group 22B in the period of time t2 as such a period of time that the output of the comparator 102 is negative.

The pulse width adjusting circuit 130 of the self-excited oscillation type is an adjusting circuit for the driving current amount in the periods of time t1, t2 in which the supply is effected to the LED groups 22A, 22B. The pulse width adjusting circuit 130 is constructed by a pulse width modulation (PWM) circuit. That is, the pulse width adjusting circuit 130 includes, as main components, a self-excited oscillation circuit 95, a pulse duty ratio adjusting circuit 96, and a variable resistor 51B.

The pulse width adjusting circuit 130 adjusts the duty ratio of the basic pulse at 500 Hz generated by the self-excited oscillation circuit 95 to obtain the duty ratio corresponding to the resistance value of the variable resistor 51B by means of PWM in the pulse duty ratio adjusting circuit 96 so that the output is provided at the adjusted duty ratio. In this embodiment, the arrangement is made such that the higher the resistance value of the variable resistor 51B is, the larger the duty ratio is. A resistance value of the variable resister 51B is operated by an operation unit (operation portion) for controlling luminance. The pulse width adjusting circuit 130 functions as a first controller to determine a total amount of the positive average current and the negative average current to be supplied to the light-emitting device 20 in a cycle.

The output (pulse) of the pulse width adjusting circuit 130 is inputted into an AND (logical product) circuit 35 and an OR (logical sum) circuit 36 into which the output of the comparator 102 is inputted. The output terminal of the AND circuit 35 provides the input into the base of the transistor 33. The base of the transistor 31 is connected to the collector of the transistor 31. Therefore, when the output of the comparator 102 is positive, and the output from the pulse width adjusting circuit 130 is turned ON, then the AND circuit 35 is turned ON, the transistor 33 is turned ON, and the transistor 31 is subsequently turned ON. The driving current, which is based on the positive voltage, is supplied to the LED group 22A, and the LED group 22A is flashed.

On the other hand, in the period of time t2 that the output of the comparator 102 is negative, the OR circuit 36 is turned ON in the period of time that the output of the pulse width adjusting circuit 130 is turned OFF, and the transistor 34 and the transistor 32 are turned ON. Then, the driving current, which is based on the negative voltage, is supplied to the LED group 22B, and the LED group 22B is flashed.

Therefore, as illustrated in FIG. 3 (b), the pulse-shaped driving current, which corresponds to the pulse width and the number of pulses outputted from the pulse width adjusting circuit 130, is supplied to the LED group 22A and the LED group 22B in the period of time t1 and the period of time t2 (FIG. 3 (a)). In this way, also in the first embodiment, the electric power supply amount (driving current amount) can be allowed to differ with respect to the LED group 22A and the LED group 22B by changing the supply period of time (duty ratio) of the driving current for each of the LED groups 22A, 22B in one cycle by means of the operation unit (for example, a knob) of the variable resistor 61A. That is, it is possible to obtain the variable color temperature of the light-emitting device 20.

When the resistance value of the variable resistor 51B is adjusted by the operation unit (for example, a knob) 55, and the duty ratio of the pulse outputted from the pulse width adjusting circuit 130 is raised, then the pulse width, which is supplied to the LED groups 22A, 22B, is widened as illustrated in FIG. 3 (c). That is, it is possible to raise the average current amount of the driving current for each of the LED groups 22A, 22B. When the operation is performed reversely, it is possible to lower the average current amount of the driving current for each of the LED groups 22A, 22B. In this way, it is possible to obtain the variable total light amount (luminance) of the light-emitting device 20.

In the operation state in which the period of time t1 is longer than the period of time t2 as illustrated in FIGS. 2 and 3, the time, in which the LED group 22A is flashed in the positive half cycle of the input AC voltage, is longer than the time in which the LED group 22B is flashed in the negative half cycle of the input AC voltage. The human eye does not sense the flashing of the LED groups 22A, 22B as described above. The LED group 22B, which has the color temperature (5000 K) higher than the color temperature (3000 K) of the LED group 22A, has the dominant lighting time. Therefore, the human eye senses a bluish white color.

On the contrary, when the movable point of the variable resistor 61A is allowed to approach to the positive electric potential (toward the wiring line 201) as deviated from the midpoint by means of the operation of the variable resistor 61A, then the flashing time of the LED group 22A is shortened in the positive half cycle, while the flashing time of the LED group 22B is lengthened in the negative half cycle.

Therefore, the LED group 22A, which has the low color temperature, has the dominant flashing time. The human eye senses a reddish white color. The variable resistor 61A provides the adjusting function for the color tone as described above. Therefore, the color temperature of the white color emitted or radiated by the light-emitting device 20 can be made continuously variable between 3000 K and 5000 K.

As described above, in the first embodiment, the total light amount, i.e., the luminance (brightness) of the light-emitting device 20 can be adjusted by adjusting the resistance value of the variable resistor 51B. When the pulse width outputted from the circuit 130 is increased (duty ratio is increased) by means of the operation of the variable resistor 51B, the pulse-shaped current, which is allowed to flow through the wiring line 220 to connect the transistors 31, 32 and one terminal of the light-emitting device 20 (the other terminal of the light-emitting device 20 is connected (grounded) to the wiring line 200), has the pulse width which is increased in both of the positive and the negative as illustrated in FIG. 3 (c). Therefore, the average current value is increased in both of the positive and negative polarities, and the total light emission amount of the light-emitting device 20 is increased. Therefore, it is possible to adjust the luminance (light-emitting amount) brought about by the light-emitting device 20.

According to the first embodiment, the frequency of the AC driving current, which supplies to the LED light emitting device, can make controllable by adjusting the frequency of the out-put signal of the self-excited oscillation circuit. Therefore, an advantage is obtained such that the occurrence of any flicker (flickering of the light emission of LED) can be suppressed by setting the frequency to such an extent that the flashing of LED cannot be recognized by the human eye. The driving circuit (driving circuit 120 in the first embodiment) for the LED light-emitting device 20 can be constructed by at least one push-pull driving circuit. For example, in the arrangement of the first embodiment shown in FIG. 1, the driving control can be performed for the light-emitting device 20 on the basis of the output from the comparator 102 by using a known circuit chip having a control circuit and four semiconductor switches (transistors) called "H-type full bridge" (H-type full bridge driving circuit, for example, TA8428K(S) produced by Toshiba Corporation) in place of the driving circuit 120 and the pulse width adjusting circuit 130.

The input terminals 10A of the first embodiment may receive the electric power from the commercial power source by means of an unillustrated plug. Alternatively, the electric power may be received such that the input terminals 10A may connect to commercial power line in house.

Second Embodiment

Figure 4:
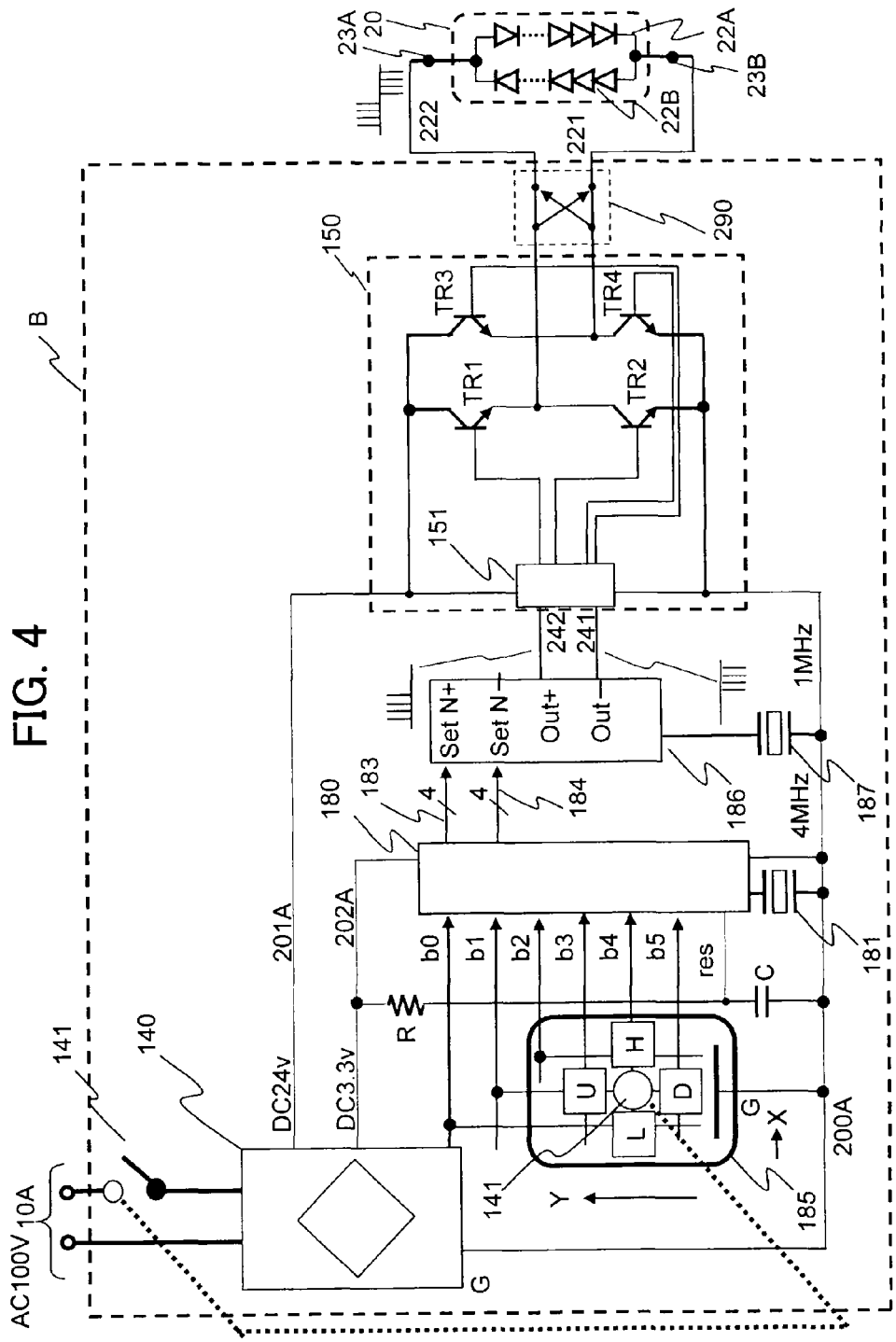
FIG. 4 shows an example of circuit arrangement of an illumination system (LED light-emitting device and light control apparatus) according to a second embodiment.

The second embodiment of the present invention will be explained. An example, in which the driving control of a light-emitting device 20 is carried out by using a microcomputer (microprocessor), is explained in the second embodiment. FIG. 4 shows an example of arrangement of an LED illumination system according to the second embodiment. With reference to FIG. 4, the LED illumination system includes a light control apparatus B and an LED illumination apparatus (emitting device) 20 explained in the first embodiment. The light control apparatus B includes an input terminal 10A connected to the AC power source (e.g., 50 Hz, 100V), a two-voltage DC power source circuit 140 (hereinafter referred to as "power source circuit 140"), a main power source switch 141, an H-type full bridge driving circuit 150 (hereinafter referred to as "driving circuit 150"), a memory-containing type microprocessor 180 (hereinafter referred to as "microcomputer 180"), and an X-Y matrix type push-button switch 185 (hereinafter referred to as "XY switch 185"), as first and second operation units. The driving circuit 150 includes four transistor switches (semiconductor switches) and a control circuit 151. For example, TA8428K(S) produced by Toshiba Corporation may be applied as the driving circuit 150. In this second embodiment, the transistors TR1 to TR4 are applied as switching elements. However, FETs may be employed as switching elements instead of the transistors TR1 to TR4.

All components of the light control apparatus B as described above are installed in an insulating case (not illustrated) having a height and a width of about 10 cm as a lighting control apparatus B of the light-emitting device 20. The XY switch 185 is provided operably from the outside on one surface of the insulating case. The insulating case is installed, for example, in such a state that the opposite surface of the one surface is installed on a wall of a building or a part thereof is embedded in a wall of a building in a state in which the one surface is exposed to the outside. The input terminal 10A may be a female connector provided for the insulating case. The input terminal 10A may include a power source cable and a plug. Further, the installation place is not limited to the wall surface of the building.

The light-emitting device 20 of this embodiment is the same as those explained in the first to third embodiments. The light-emitting device 20 is fixed to a ceiling in a room in many cases. Two terminals 23A, 23B, which are possessed by the light-emitting device 20, are connected to the lighting control apparatus B via cables 221, 222. However, there is no limitation thereto.

A positive DC voltage of about 24 V is supplied to a wiring line 201A which connects the power source circuit 140 to the control circuit 151, and a positive DC voltage of 3.3 V is supplied to a wiring line 202A which connects the power source circuit 140 to the power source terminal of the microcomputer 180. The power source circuit 140, the microcomputer 180, and the control circuit 151 (the driving circuit 150) are connected each other by a wiring line 200A as a common ground. The wiring line 201A supplies the electric power to drive the light-emitting device 20, and the wiring line 202A supplies the driving electric power for the microcomputer 180.

The XY switch 185 has such a circuit structure that both of the X line and the Y line are short-circuited to the ground terminal G when any one of nine intersections between the X line and the Y line is pushed down. Further, the XY switch 185 has such a circuit arrangement that the wiring lines b0 to b5, which are connected to the input terminal of the microcomputer 180, are held at the voltage of about 3.3 V when any one of the intersections is not pushed down.

An inexpensive microprocessor (MP) having a memory-containing type, which is in such an extent that a master clock is operated at 4 MHz from an oscillator 181, may be applied as the microcomputer 180. Those possessed as the input terminals include the six input terminals b0 to b5 other than the power source reset terminal "reset". Further, the microcomputer 180 is provided with "set N+ register" and "set N− register" each having a 4-bit width. The value of the set N+ register and the value of the set N− register are able to be set to a timer 186 disposed at the next stage from the output terminal.

The timer 186 is a timer and counter, which is driven by a ceramic oscillator 187 at a given self-oscillation frequency (e.g., 1 MHz). Complementary burst pulses illustrated in FIG. 5A (b) and (c) are outputted in a self-excited manner at preset timings from the wiring lines 241, 242 for connecting the output terminal and the input terminal of the control circuit 151. The frequency setting is performed beforehand for the timer 186 so that the complementary burst pulses have a pulse frequency of 10 kHz and a burst repetition frequency (FIG. 5A (a)) of about 500 Hz. However, the values of the pulse frequency and the burst repetition frequency are as examples, and appropriate values of them may be set.

The register value of the set N+ register, which is set to the timer 186, is used to control the number of burst pulses supplied in the positive half cycle. That is, the larger the register value of the set N+ register is, the more increased the number of burst pulses supplied in the positive half cycle is. On the other hand, the register value of the set N− register, which is set to the timer 186, is used to control the number of burst pulses supplied in the negative half cycle. That is, the larger the register value of the set N− register is, the more increased the number of burst pulses supplied in the negative half cycle is. The periods of time (T1, T2) of generation of the burst pulses can be changed in the respective positive and negative half cycles by adjusting a counter set to the timer 186.

With reference to FIG. 4, a polarity exchange switch 290 is provided between the wiring line 221 and the wiring line 222 to connect the driving circuit 150 and the light-emitting device 20. In the arrangement of the second embodiment, the preferred connection is provided such that the wiring line 222 is connected to the terminal 23A and the wiring line 221 is connected to the terminal 23B. In a case that the wiring lines 222, 221 and the terminals 23A, 23B of the light-emitting device 20 are connected oppositely, the polarity conversion switch 290 provides such a state that the wiring line 222 is substantially connected to the terminal 23A and the wiring line 221 is connected to the terminal 23B by manually performing the switching operation. When the polarity is exchanged by the operation of the polarity exchange switch 290, the switching is effected from the state in which the driving current is supplied from the wiring line 222 to the light-emitting device 20 to the state in which the driving current is supplied from the wiring line 221.

An explanation will be made below about the operation of the respective components of the light control circuit B. At first, the input terminal 10A is connected to the commercial power source of 100 V, and then the main power source switch 141 is closed. When the main power source switch 141 is closed, then the rectification and the voltage conversion operation are performed by the power source circuit 140, and the driving electric power (DC 3.3 V) is supplied to the microcomputer 180. Further, the reset terminal "res" has the high electric potential (hereinafter referred to as "H") while delaying by about 50 msec in accordance with the time constant of the capacitor C and the resister R, and the operation as the microcomputer 180 is started.

As illustrated in FIG. 4, the main power source switch 141 can be installed at the central portion of the XY switch 185. However, the main power source switch 141 is an ordinary main power source switch which makes no response to the operation of button of the XY switch 185.

The microcomputer 180 starts the initialization operation in accordance with a known method. An operation program, which is recorded in unillustrated internal ROM (Read Only Memory), is loaded to unillustrated RAM (Random Access Memory) to successively start the operation in accordance with the program from the beginning of the program.

Figure 5A:
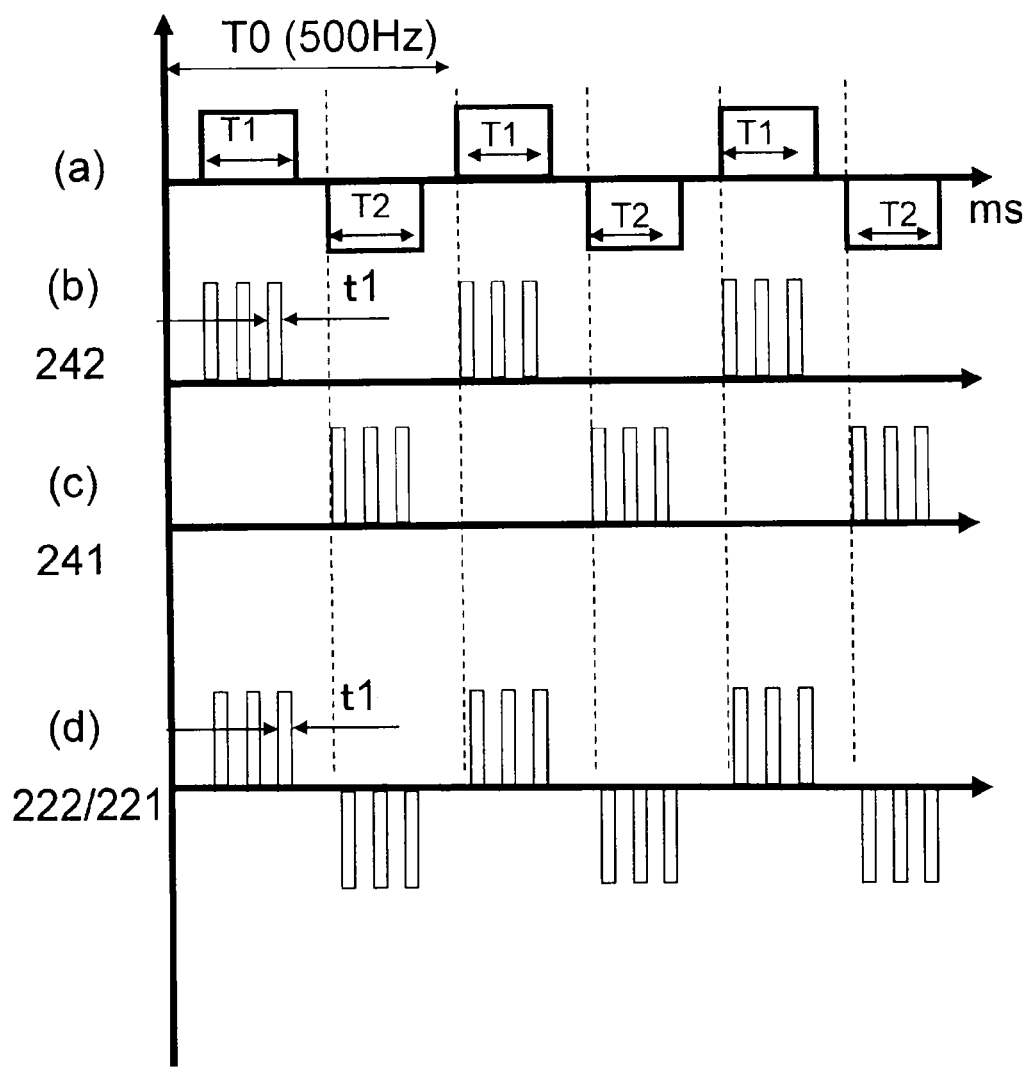
FIG. 5A illustrates the shape of wave in the light control apparatus in the second embodiment.
Figure 5B:
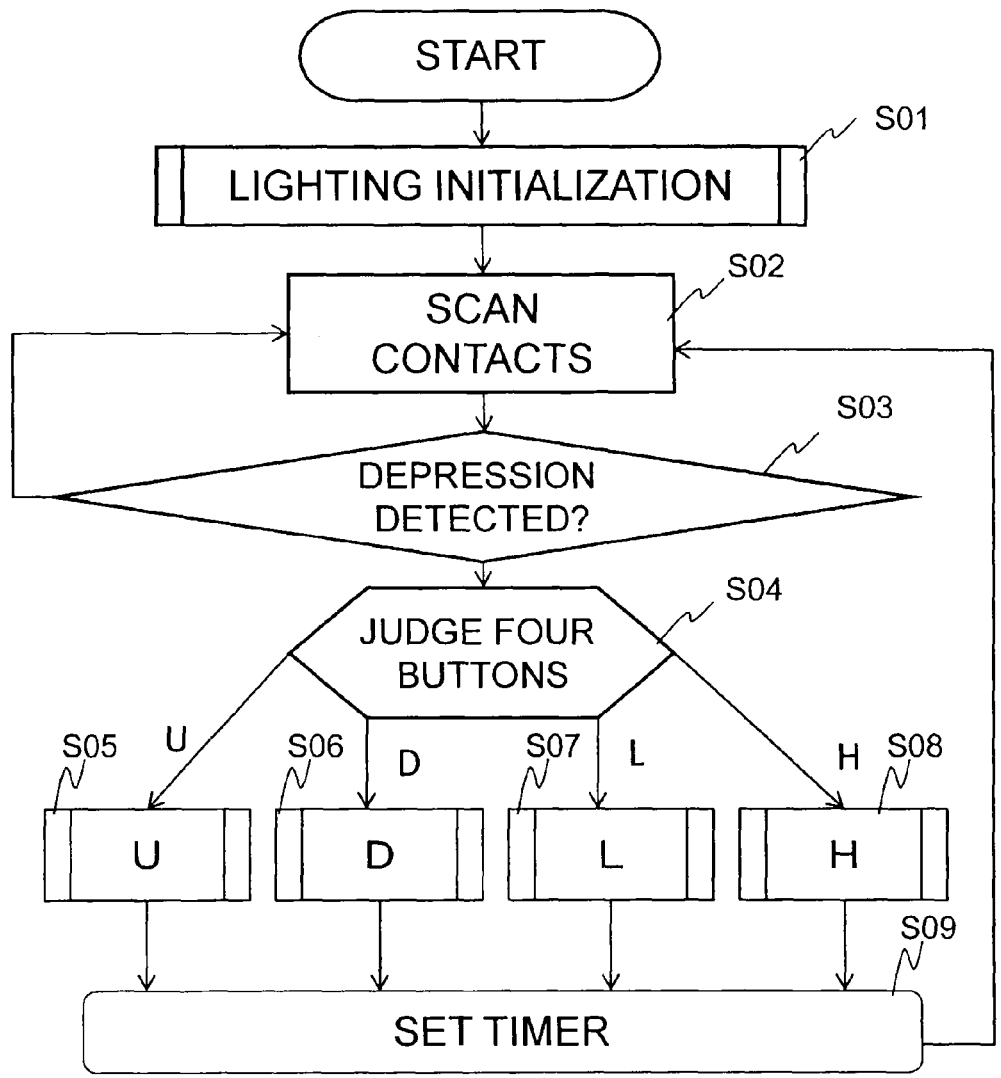
FIG. 5B shows a flow chart illustrating a process of program for a microprocessor in the second embodiment.

As illustrated in a flow chart of FIG. 5B, the lighting initialization operation is firstly performed in order that the light-emitting device 20 is in a predetermined standard lighting state (Step S01) in the programmed operation of the microcomputer 180 after the initialization operation. As a result, the pulse wave, which has the shape of waves illustrated in FIG. 5A (b) and (c) are supplied respectively to the driving circuit 150 by the aid of the wiring lines 241, 242.

That is, the burst pulses is supplied from the wiring line 242 and 241 to the control circuit 151 in the period of time T1 in the former half cycle at the burst repetition frequency T0 (500 Hz), and the burst pulses is supplied from the wiring line 241 to the control circuit 151 in the period of time T2 in the latter half cycle.

The control circuit 151 receives the burst pulses through the wiring lines 242, 241 to control ON/OFF operation (switching operation) of the transistors TR1 to TR4 in accordance with the burst pulses. The control circuit 151 turns OFF the transistors TR1 to TR4 during the period in which no pulse is inputted through the wiring lines 241 and 242. On the other hand, the control circuit 151 turns ON the transistors TR1 and TR4 and turns OFF the transistors TR2 and TR3 during the period in which the positive pulses are supplied to the control circuit 151. Accordingly, DC current from the power source circuit 140 flows on the wiring line 222 through the transistor TR1 and is spent for lighting up of the LED group 22A. Hereinafter, the current is connected to ground after passing through the transistor TR4.

On the other hand, the control circuit 151 turns ON the transistors TR2 and TR3 and turns OFF the transistors TR1 and TR4 during the period in which the negative pulses are supplied to the control circuit 151. Accordingly, DC current from the power source circuit 140 flows on the wiring line 222 through the transistor TR3 and is spent for lighting up of the LED group 22B. Hereinafter, the current is connected to ground after passing through the transistor TR2.

Thus, positive pulses (positive driving current) and negative pluses (negative driving current) are supplied to the light-emitting device 20 alternately through the line 222 (the terminal 23A). In other words, AC currents are supplied to the light-emitting device 20 as driving currents. Specifically, in the period of time T1 (FIG. 5A (a)), the burst pluses (FIG. 5A (b)) are supplied through the wiring line 242 to the control circuit 151. Thereby, the positive burst pulse-shaped current is supplied to the wiring line 222. On the contrary, the burst pluses (FIG. 5A (b)) are supplied through the wiring line 241 to the control circuit 151 during the period of time T2 (FIG. 5A (c)). Thereby, the negative burst pulse current is supplied to the wiring line 222 (see FIG. 5A (d)). Therefore, each of the positive and negative burst pulse currents (i.e., the driving current for the light-emitting device 20), which is supplied to the wiring line 222, has the shape of wave which is the same shape as that of the shape of wave of each of the positive and negative burst pulses (i.e., the control signal for the driving circuit 150) supplied via the wiring lines 242, 241. The "shape of wave of the same shape" means such a shape of wave that the relative timings of ON and OFF of the pulses are approximately identical with each other, which includes both of a case in which the heights of pulses are identical with each other and a case in which the heights of pulses are different from each other.

As a result, the LED group 22A is turned ON (lighted) by the positive driving current from the wiring line 222, while the LED group 22B is turned ON (lighted) by the negative driving current from the wiring line 222. In this arrangement, the number of burst pulses (average current) supplied to the wiring line 222 is equal to the number of those supplied to the wiring line 221. Therefore, the LED group 22A and the LED group 22B are turned ON (lighted) to an identical extent (approximately equivalently) respectively, and the white color state having a moderate color temperature is maintained.

As described above, owing to the frequency setting for the timer 440 performed beforehand, 1 cycle T0 is set to 2 msec (500 Hz), and the output periods of time T1, T2 of the burst pulses are set to 500 µsec respectively in the former half and the latter half of 1 cycle. Therefore, an envelope shape of wave of 1 cycle illustrated in FIG. 5A (a) resides in the rectangular alternating current (AC) at 500 Hz. Therefore, the actual current, which is allowed to flow through the light-emitting device 20 via the wiring line 222, has the shape of wave which resides in the alternate repetition of the positive bursts having a pulse width of 50 µsec (t1) and the negative bursts having the same width (see FIG. 5A (d)). The operation until arrival at this point in time is allowed to proceed by merely closing the main power source switch 141.

In FIG. 5A (d), the pulse width, which is larger than the actual width, is schematically depicted in the drawing, because it is difficult to express the pulses having the pulse width of 50 µsec. In accordance with the above statement, the operation of Step S01 illustrated in FIG. 5B comes to an end.

After that, the microcomputer 180 starts a scanning operation for contacts of the XY switch 185, and a waiting state is continued until the depression is detected (loop of Steps S02, S03 illustrated in FIG. 5B).

Though not illustrated in FIG. 5B, the count of an unillustrated waiting timer is started in the waiting state. If the depression is not detected until the waiting timer undergoes the time out (if the illumination control operation is not performed by a user), the main power source switch 141 is shut off (opened). Accordingly, the light-emitting device 20 returns to the blackout state.

If the illumination control operation, i.e., the push-button operation for the XY switch 185 is performed by the user, then the microcomputer 180 is judged which one of the push buttons, such as "U (UP)" button, "D (DOWN)" button, "L (LOW)" button or "H (HIGH)" button provided for the XY switch 185, is depressed, on the basis of the ON/OFF (I/O) pattern of the wiring lines b0 to b5 (Step S04), and the process indicated by button pushed is executed.

That is, if the U button is depressed, the luminance (emission amount) increasing process (Step S05) is executed. If the D button is depressed, the luminance (emission amount) decreasing process (Step S06) is executed. If the L button is depressed, the color temperature increasing process (Step S07) is executed. If the H button is depressed, the color temperature decreasing process (Step S08) is executed. Details of the processes of Steps S05 to S08 will be described later on. If any one of the processes of Steps S05 to S08 is executed, the values of "set N+ register" and "set N− register" possessed by the microcomputer 180 are varied. When any one of Steps S05 to S08 is completed, the microcomputer 180 sets the values of "set N+ register" and "set N− register" to the timer 186 (Step S09). The process is returned to Step S02, and the scanning process for contacts is restarted.

Details of the processes of Steps S05 to S08 will be individually explained below. At first, an explanation will be made about the response to the action of the user (operator) who intended to increase or decrease the emission amount (luminance of the light-emitting device 20). For example, if the operator depresses the U button, the microcomputer 180 detects this action of the U button and performs the process of Step S05, i.e., the process to follow a flow of the luminance increasing process illustrated in FIG. 6B.

Figure 6A:
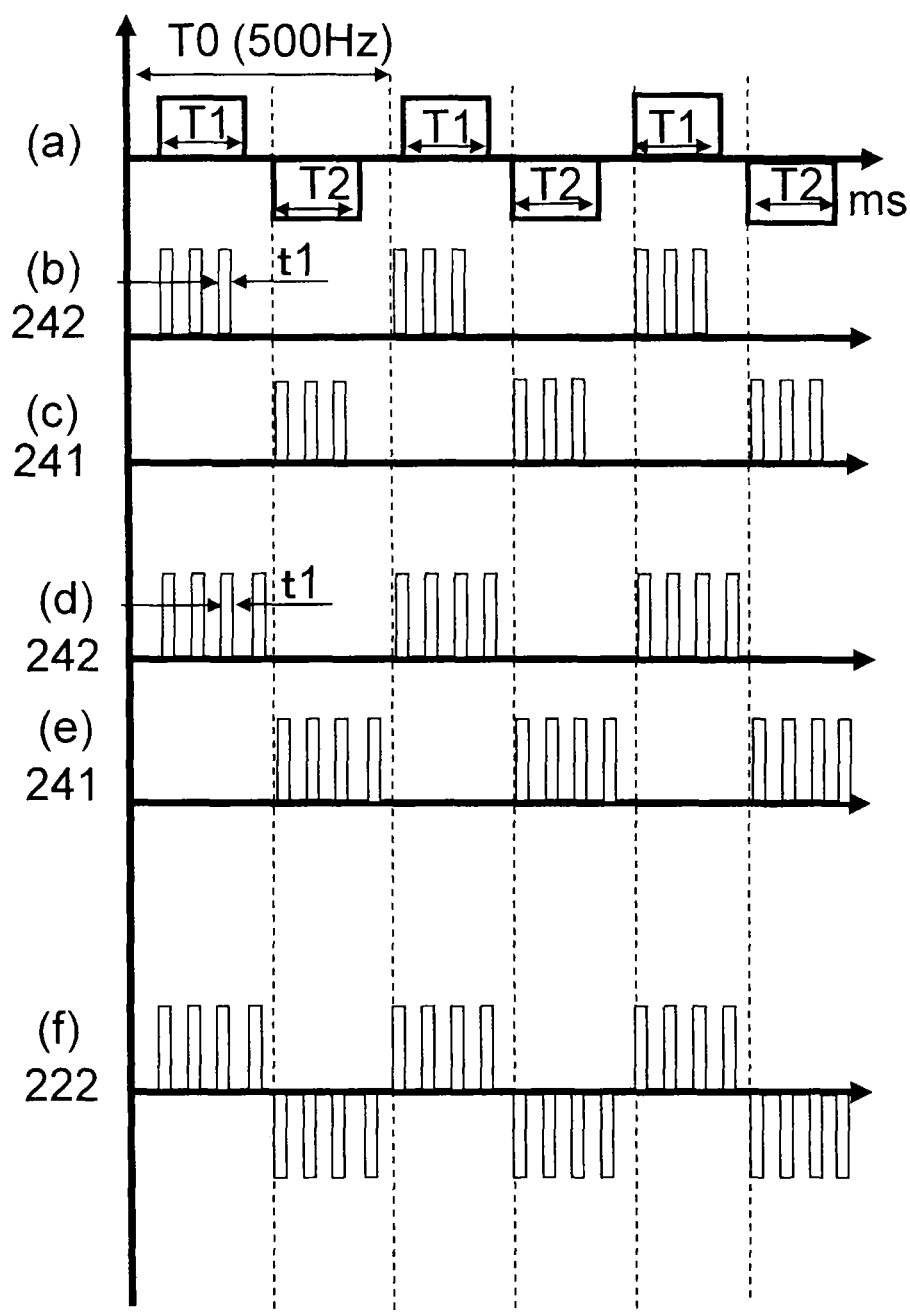
FIG. 6A illustrates the shape of wave in the light control apparatus in the second embodiment.
Figure 6B:
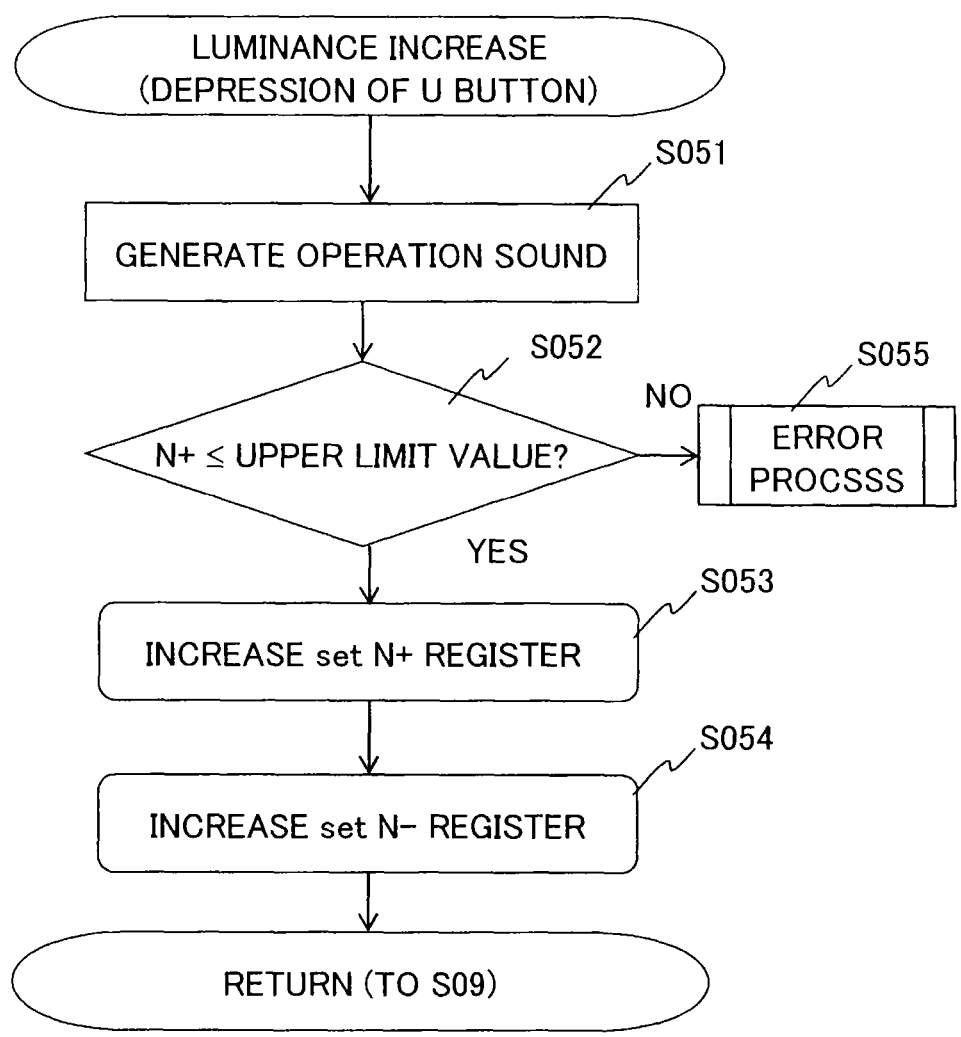
FIG. 6B shows a flow chart illustrating a process of program (luminance-increasing process) for the microprocessor in the second embodiment.

With reference to FIG. 6B, at first, the microcomputer 180 drives an unillustrated electronic sound generator to generate a detection sound (for example, "pip" sound) in order to inform the operator of the detection of the depression of the button (Step S051). The light control apparatus B may be provided with an LED lamp for informing the detection of the depression. The LED lamp may be turned ON (lighted) for a predetermined period of time together with the output of the detection sound or in place of the detection sound.

Subsequently, the microcomputer 180 refers to the value N of each of the set N+ register (not illustrated) and the set N− register (not illustrated) contained in the microcomputer 180 itself to judge whether or not the value N is not less than a predetermined upper limit value (Step S052). In this procedure, if the value N is not less than the upper limit value (S052, NO), it is judged that the user repeatedly increases the luminance and the button is continuously depressed while exceeding the maximum luminance determined by the performance of the LED element. The process proceeds to an error process routine (Step S055), and the operation error is informed.

On the contrary, if the value N is smaller than the upper limit value (S052, YES), the microcomputer 180 drives the output port for the wiring line 183 to write, for example, a value "100 (4 of decimal number)" into the set N+ register contained in the timer 186 (Step S053). Before the writing, the set N+ register holds the initial value "011 (3 of decimal number)" written into the register by the initialization operation (Step S01). The value of the set N+ register is increased in accordance with the process in Step S053.

Subsequently, the microcomputer 180 drives the output port for the wiring line 184 to write the same value "100" as that of the increment value of the set N+ resister into the set N− register contained in the timer 186 as well (Step S054). Before the writing, the set N− register holds the initial value "011" in the initialization operation. The value of the set N− register is increased in accordance with the writing in Step S054. After that, the process returns to Step S09.

The four pulses are outputted, for example, in the predetermined period of time T1 of the former half of 1 cycle as illustrated in FIG. 6A (d) to the out+ line (wiring line 242) of the timer (counter) 186, and the four pulses are outputted, for example, in the predetermined period of time T2 of the latter half of 1 cycle as illustrated in FIG. 6A (e) to the out− line (wiring line 241) of the timer (counter) 186 in accordance with the processes of Steps S053, S054. As a result, the pulse current, which is 4/3 times the initial value, i.e., larger than the initial value by 33% as illustrated in FIG. 6A (f), is supplied via the wiring line 222 to the light-emitting device 20 driven by the control circuit 150. The total luminance (emission amount), which is brought about from the light-emitting device 20, is increased by about 33%.

After that, when the user intends to increase the luminance again and the U button is depressed, then the processes and the operations are repeatedly performed as described above. The luminance (emission amount) is increased 5/3 times as compared with the initial value. That is, the obtained luminance is improved or increased by 66%. In this way, the process for increasing the luminance is performed.

Figure 6C:
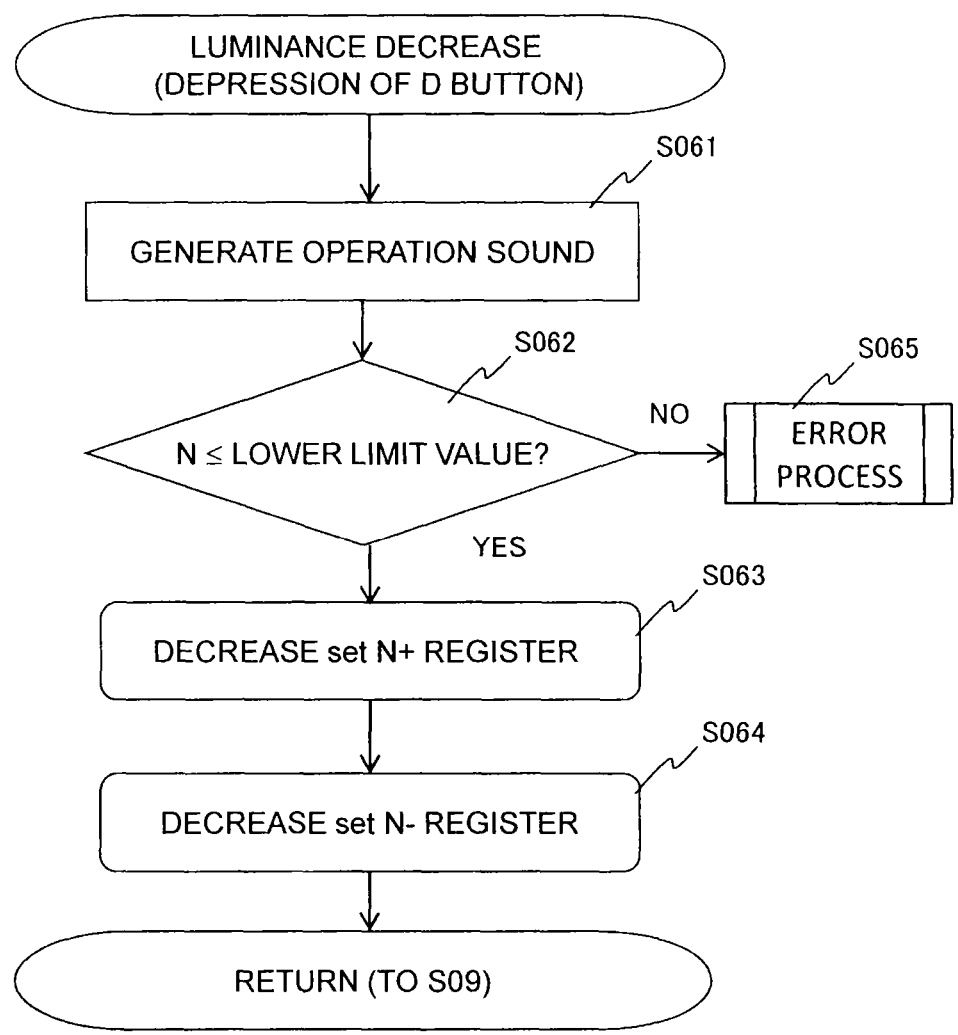
FIG. 6C shows a flow chart illustrating a process of program (luminance-decreasing process) for the microprocessor in the second embodiment.

The decrease of the luminance is also performed by the similar procedure as described above. That is, if when the D button, which is the luminance decreasing button, is depressed, the luminance decreasing process of Steps S061 to S064 illustrated in FIG. 6C is performed as the process ranging from Step S04 (FIG. 5B) to Step S06. The process in Steps S061 to S064 is the same as the process illustrated in FIG. 6B except that the error process (Step S065) is performed if the register value N is not more than a predetermined lower limit value in Step S062 and the register value is reduced in Steps S063, S064. The register value is reduced by "001" of binary number every time when the D button is depressed once.

Therefore, if the D button is depressed once immediately after the initialization operation (Step S01), the total luminance (emission amount) is lowered to ⅔ of the initial value, i.e., by 33%. If the D button is depressed twice, the obtained total light amount is reduced to ⅓ of the initial value, i.e., by 66%. However, the proportion of the increase/decrease in the luminance (emission amount), which is provided by depressing the U button or the D button once, may be appropriately set.

The foregoing statement is provided to explain the increase/decrease in the luminance (emission amount). Next, an explanation will be made about the procedure for changing the chromaticity (color temperature). In the second embodiment, the light-emitting device 20 comprises the LED group 22A having the low color temperature of 2500 K (K represents the Kelvin temperature) and the LED group 22B having the high color temperature of 6000 K. Therefore, when the driving current allowed to flow through the LED 22A is increased, and the driving current allowed to flow through the LED 22B is decreased, then it is possible to lower the color temperature of the entire light-emitting device 20.

To lower the color temperature, the user (operator) depresses the L button of the XY switch 185. Accordingly, a color temperature decreasing process of Step S07 (FIG. 7B) is executed after performing the judging process of Step S04 by the microcomputer 180.

Figure 7A:
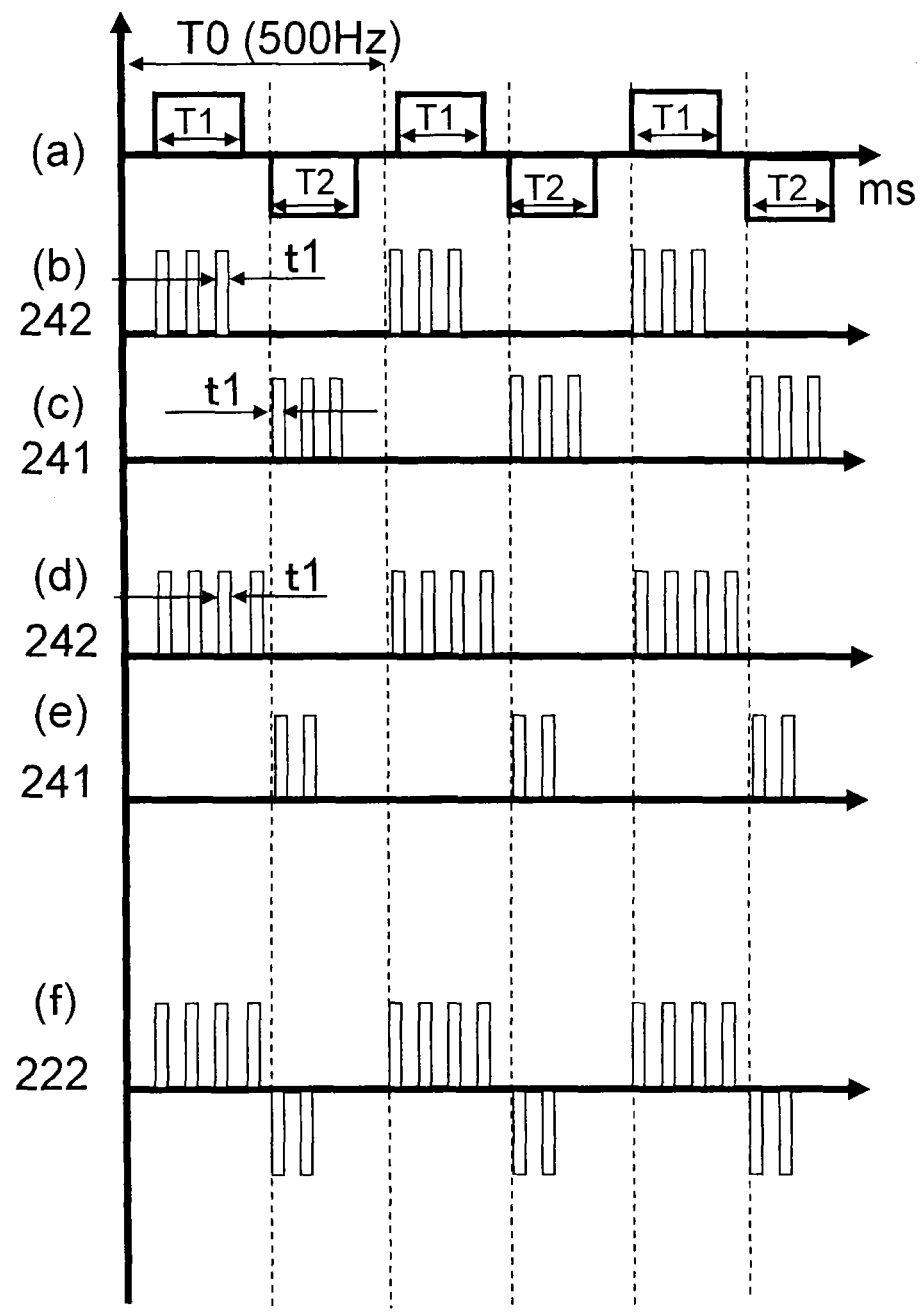
FIG. 7A illustrates the shape of wave in the light control apparatus in the second embodiment.
Figure 7B:
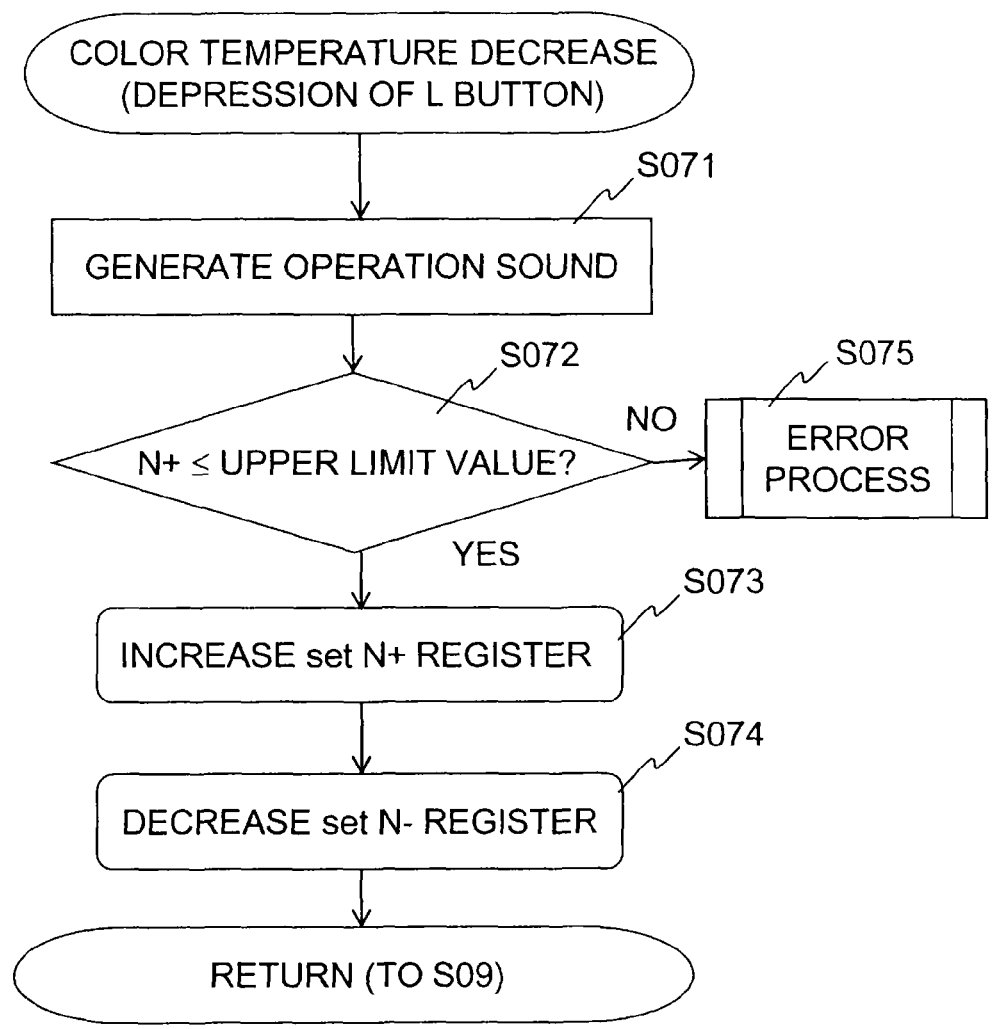
FIG. 7B shows a flow chart illustrating a process of program (color temperature-lowering process) for the microprocessor in the second embodiment.

As illustrated in FIG. 7B, when the process is started, an operation sound generating process is performed (Step S071). Subsequently, the microcomputer 180 judges whether or not the value of the set N+ register is less than an upper limit value (Step S072). If the register value of the set N+ register is not less than the upper limit value (S072, NO), an error process is performed (Step S075).

On the contrary, if the register value is less than the upper limit value (S072, YES), the microcomputer 180 adds a predetermined value (for example, "001" of binary number) to the set N+ register (Step S073). On the other hand, the microcomputer 180 subtracts a predetermined value (for example, "001" of binary number) from the set N− register (Step S074). After that, the process returns to Step S09.

The number of pulses outputted to the wiring line 242 is increased as illustrated in FIG. 7A (d), while the number of pulses outputted to the wiring line 241 is decreased as illustrated in FIG. 7A (e) in accordance with Step S073 and Step S074.

As illustrated in FIG. 7A (f), the average value of the positive current supplied to the LED group 22A of the light-emitting device 20 via the wiring line 222 is increased, while the average value of the negative current supplied to the LED group 22B is decreased. As a result, the luminance (emission amount), which is brought about from the LED group 22A having the low color temperature, is increased, and the luminance (emission amount), which is brought about from the LED group 22B having the high color temperature, is decreased. Therefore, the color temperature is lowered as a whole to provide a reddish white color.

To raise the color temperature, the user (operator) depresses the H button of the XY switch 185. Accordingly, a color temperature increasing process of Step S08 (FIG. 7C) is executed after performing the judging process of Step S04 by the microcomputer 180.

Figure 7C:
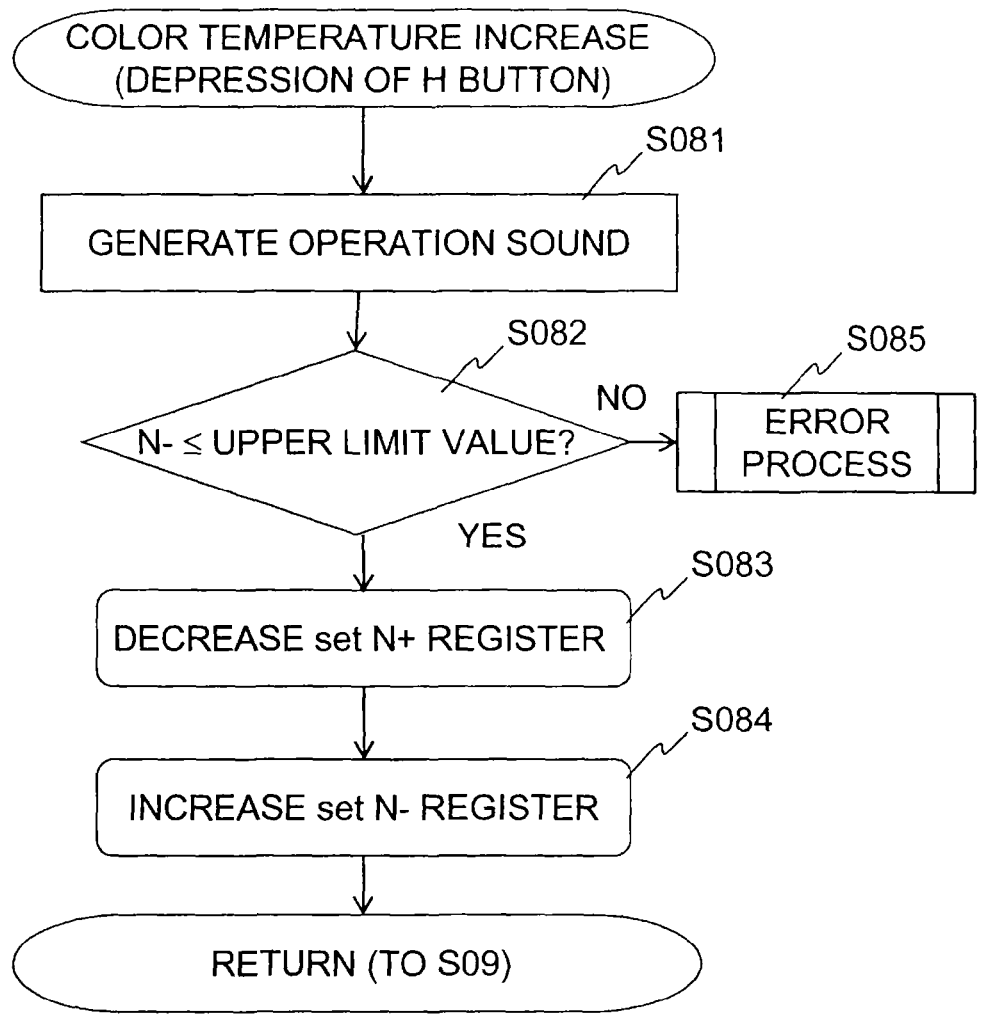
FIG. 7C shows a flow chart illustrating a process of program (color temperature-raising process) for the microprocessor in the second embodiment.

As illustrated in FIG. 7C, when the process is started, an operation sound generating process is performed (Step S081). Subsequently, the microcomputer 180 judges whether or not the value of the set N− register is less than an upper limit value (Step S082). If the register value of the set N− register is not less than the upper limit value (S082, NO), an error process is performed (Step S085).

On the contrary, if the register value is less than the upper limit value (S082, YES), the microcomputer 180 subtracts a predetermined value (for example, "001" of binary number) from the set N+ register (Step S083). On the other hand, the microcomputer 180 adds a predetermined value (for example, "001" of binary number) to the set N-register (Step S084). After that, the process returns to Step S09.

The number of pulses outputted to the wiring line 242 is decreased, while the number of pulses outputted to the wiring line 241 is increased in accordance with Step S083 and Step S084. Accordingly, the average value of the positive current supplied to the LED group 22A of the light-emitting device 20 via the wiring line 222 is decreased, while the average value of the negative current supplied to the LED group 22B is increased. As a result, the luminance (emission amount), which is brought about from the LED group 22A having the low color temperature, is decreased, and the luminance (emission amount), which is brought about from the LED group 22B having the high color temperature, is increased. Therefore, the color temperature is raised as a whole to provide a bluish white color.

According to the second embodiment, it is possible to change the luminance (brightness) and the chromaticity (color temperature) of the light-emitting device 20 by using the microcomputer 180.

Third Embodiment

Next, a third embodiment will be explained. The third embodiment corresponds to a modified embodiment of the second embodiment. Therefore, the feature which is different from the feature of the second embodiment will be explained and the common feature will be omitted from the explanation.

The timer 186 illustrated in FIG. 4 is a known one which realizes such functions that any sudden increase in the number of times of depression of the button, which would be otherwise caused against the intent of the operator, is avoided when the operator continuously depresses the button, and the mechanical error such as the chattering or the like is avoided as well.

In the case of the circuit arrangement illustrated in FIG. 4, it is uncertain that either one of lines 221 and 222 are connected to anode terminal (terminal 23A) and the other one of the lines to the cathode terminal (terminal 23B). Therefore, the polarity exchange switch 290 is added to exchange the polarities of the wiring lines 222, 221 as the output lines of the control unit.

Figure 8:
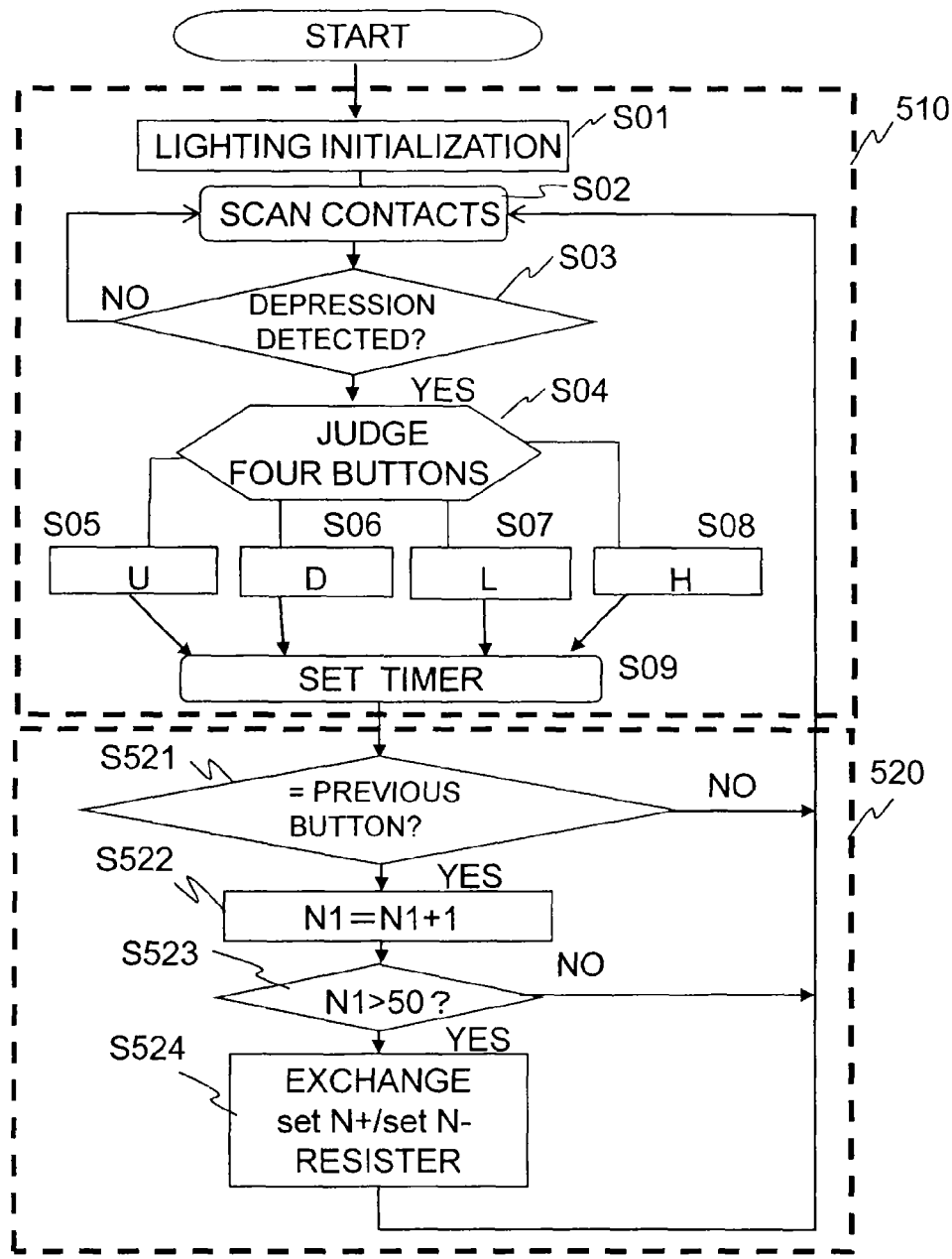
FIG. 8 shows a flow chart illustrating a process of program (polarity-converting process) for a microprocessor in the third embodiment.

The third embodiment is concerning to an example in which the polarity exchange switch 290 is controlled by the execution of a program performed by a computer (for example, microcomputer). FIG. 8 shows a flow chart concerning the third embodiment.

A flow process shown in block 510 of FIG. 8 is the lighting control program illustrated in FIG. 5B. A flow process shown in block 520 of FIG. 8 is an output polarity exchange program according to the third embodiment. When the output polarity exchange program is executed, the microcomputer 180 is operated as follows.

In a routine of "=previous button?" in Step S521, the microcomputer 180 makes comparison with an unillustrated "previous button type storage register". In this arrangement, the previous button type storage register is provided in the microcomputer 180, which stores the code to indicate the type of the button depressed by the user (operator) at last.

If the button type, which is indicated by the previous button type storage register, is not the same as the type of the button depressed this time, then the microcomputer 180 stores the code to indicate the type of the button depressed this time in the previous button type storage register, and then the process returns to Step S02. On the contrary, if the button type, which is indicated by the previous button type storage register, is the same as the type of the button depressed this time (S521, YES), 1 is added to the value N1 of an unillustrated counter (Step S522).

The value of the counter is raised every time when the same button is repeatedly depressed, and the value of the counter finally arrives at a predetermined value. In the example described in the third embodiment, if the operator continuously depresses the same button for 5 seconds or more, then the value N1 of the counter exceeds the predetermined value "50", and the process proceeds to Step S524.

In Step S524, the microcomputer 180 exchanges the output terminal (out+) of "set N+ register" installed in the microcomputer 180 and the output terminal (out−) of "set N− register". Accordingly, the burst pulses, which are based on the value of the set N− register, are outputted from the wiring line 242, and the burst pulses, which are based on the value of the set N+ register, are outputted from the wiring line 241. Accordingly, such a state is given that the AC current, in which the positive and the negative are reversed, is supplied to the wiring line 222. In this arrangement, when the light-emitting device 20 is connected in the reverse (opposite) direction, i.e., when the wiring line 222 is connected to the terminal 23B and the wiring line 221 is connected to the terminal 23A, then the LED group 22B is turned ON (lighted) when the positive driving current is supplied to the wiring line 222, and the LED group 22A is turned ON (lighted) when the negative driving current is supplied. However, as described above, the corresponding relationship between the register value and the LED group is the same as that provided in the normal connection. Therefore, even in the case of the reverse (opposite) connection, the light-emitting device 20 performs the lighting operation in the same manner as in the normal connection. Therefore, in the third embodiment, it is possible to omit the polarity exchange switch 290.

According to the third embodiment, a staff in charge of the installation construction work can perform the switching into the state in which the wiring lines 222, 221 and the terminals 23A, 23B are connected substantially normally, by operating the XY switch 185 so that the direction of the color modulation (increase/decrease in color temperature) is coincident with the indication of the light modulation/color modulation apparatus judging from the result of the lighting owing to the output polarity exchange function as described above.

Fourth Embodiment

Next, a fourth embodiment will be explained. The fourth embodiment has the common feature which is common to the feature of the second and third embodiments. Therefore, the different feature, which is different from the feature of the fourth embodiment, will be explained, and the common feature will be omitted from the illustration.

The temperature coefficient of the equivalent resistance value is negative in the light-emitting device 20 in many cases. It is feared that the light-emitting device 20 may suffer from the self-destruction loop such that if the temperature of the installation place is raised, then the equivalent resistance value is lowered, the current value is raised, and the device temperature is increased. It is known to be effective that a feedback loop is provided for the driving circuit in order to reliably avoid the inconvenience. In the fourth embodiment, a feedback loop is added to the arrangement of the second embodiment.

Figure 9:
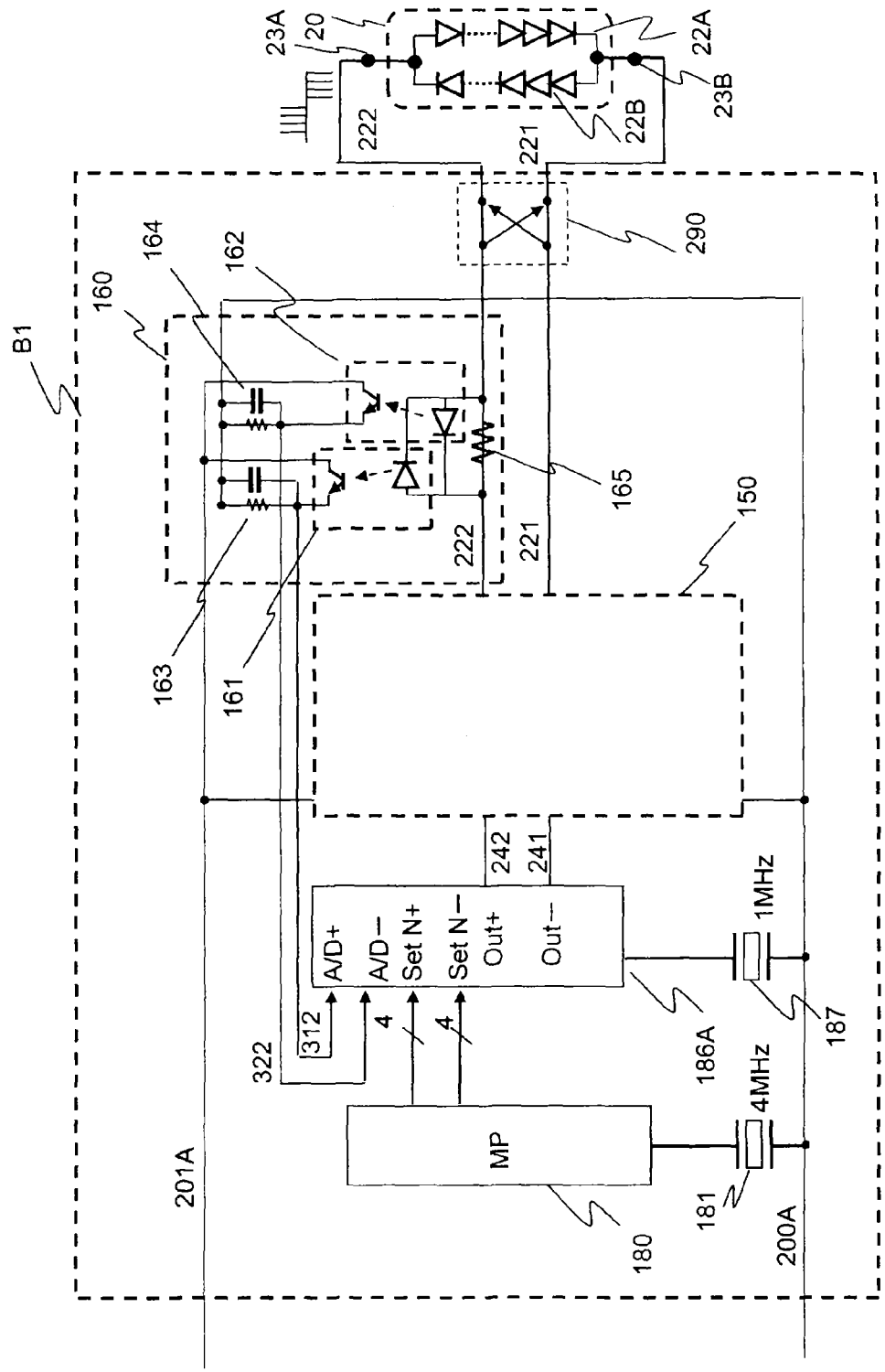
FIG. 9 shows an example of circuit arrangement of a part of a light control apparatus for an LED light-emitting device according to a fourth embodiment.
Figure 10A:
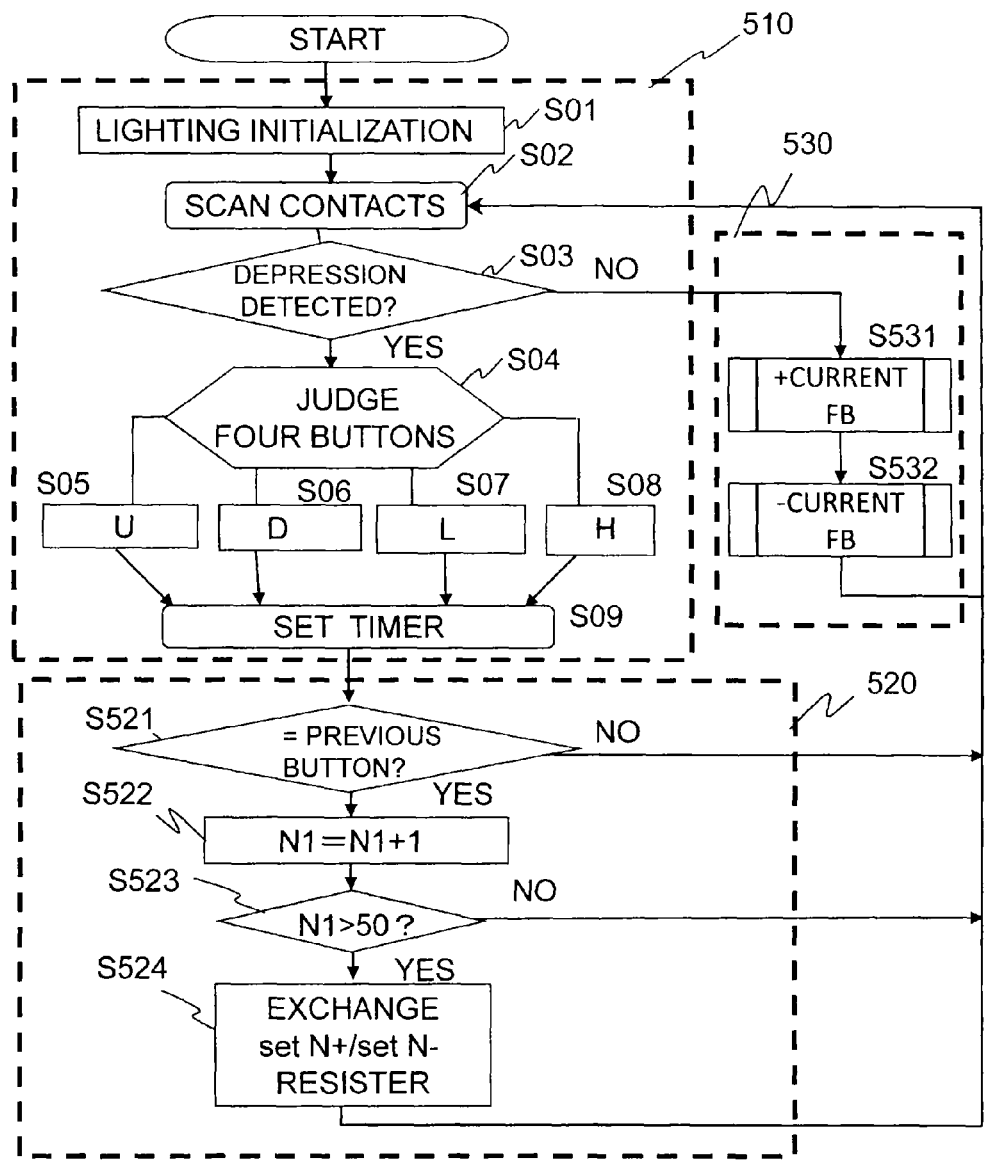
FIG. 10A shows a flow chart illustrating a process of program (feedback control) for a microprocessor in the fourth embodiment.
Figure 10B:
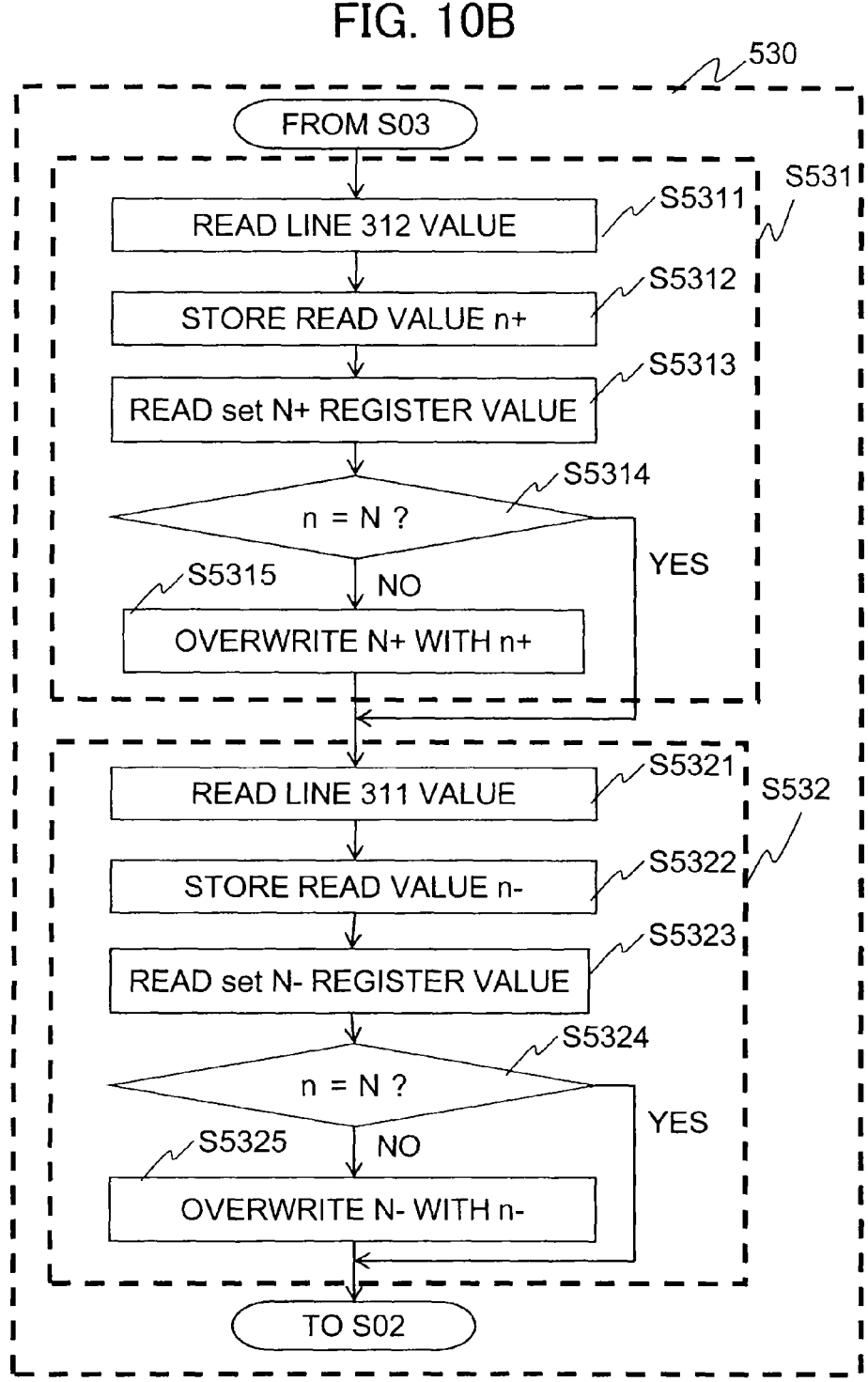
FIG. 10B shows a flow chart illustrating a process of program (feedback control) for the microprocessor in the fourth embodiment.

FIG. 9 illustrates an exemplary circuit arrangement according to the fourth embodiment. FIGS. 10A and 10B illustrate flow charts illustrating a microcomputer process according to the fourth embodiment. In FIG. 9, the input terminal 10A, the main power source switch 141, the power source circuit 140, and the XY switch 185 illustrated in FIG. 4 are omitted from the illustration.

With reference to FIG. 9, a light control apparatus (lighting control circuit) B1 has a drive current detection circuit 160 for realizing the constant current drive. The drive current detection circuit 160 includes a resister 165, photocouplers 161, 162 each of which is optically independent, and integration circuits 163, 164 each of which includes a resister and a capacitor (condenser).

The resistor 165 has a resistance value of, for example, about 5Ω to generate the voltage of 0.5 to 5.0 V proportional to the current value of 0.1 to 1.0 A of the light-emitting device 20. The photocouplers 161, 162 are connected in parallel to the resistor 165. A diode is provided on the input side of each of the photocouplers 161, 162. Therefore, the combined transistor is in conduction only in the case of the forward direction of each of them.

Therefore, the photocoupler 161 is in conduction when the positive current, which is applied to drive the LED group 22A, is allowed to flow through the wiring line 222. The photocoupler 162 is in conduction only when the negative current, which is applied to drive the LED group 22B in the reverse (opposite) connection, is allowed to flow through the wiring line 222. As for the conduction of the photocouplers 161, 162, the integration circuit 163 and the integration circuit 164 are charged independently. As a result, the voltage, which is proportional to the average value of the positive current, is observed on the wiring line 312. The voltage, which is proportional to the average value of the negative current, is observed on the wiring line 322.

The observed voltage is principally proportional to the average value of the pulse current allowed to flow through the wiring line 222 as the control output line. However, the voltage simultaneously makes response to the fluctuation of the DC component generated, for example, by the temperature change as well. The analog value is led to a microcomputer (MP) 186A (instead of the timer 186 in FIG. 4) via the independent wiring lines 312, 322.

In the MP 186A, the analog value is converted into 4-bit digital numerical value expression of 16 digits (values) which is stored in an unillustrated internal register, by means of an unillustrated internal analog/digital converter. The respective voltage values (digital values), which are fed from the wiring line 312 and the wiring line 322 to be stored in the internal register, have the same expression form as that of the set N+ register and the set N− register. The value, which is exhibited by each of the set N registers, indicates the voltage value corresponding to the driving current supplied to each of the LED groups 22A, 22B via the wiring line 222.

After that, the operation, which corresponds to the execution of the program by the microcomputer 186A, is performed as illustrated in FIGS. 10A and 10B. A flow process enclosed with a block 530 illustrated in FIG. 10A resides in a constant current driving routine which is composed of a positive current feedback routine 5531 and a negative current feedback routine 5532. The constant current driving routine 530 is started when the button of the XY switch 185 is not depressed (S03, NO) in the contact scanning operation (Step S02).

In the positive current feedback routine 5531 of the constant current driving routine 530, as illustrated in FIG. 10B, the microcomputer 186A reads the voltage value inputted from the wiring line 312 (Step S5311), and the value n+, which is obtained by performing the A/D conversion, is stored in a temporary register (internal register) (Step S5312). Subsequently, the register value N+, which is held in the set N+ register, is read (Step S5313) to compare the register value N+ and the internal register value n+ (Step S5314). If the values are identical with each other, the process proceeds to Step S5321 while skipping Step S5315. If the values are different from each other, then the value of the set N+ register is overwritten with the internal register value n+ (Step S5315), and the positive current feedback routine S531 comes to an end.

The same or equivalent process is also performed in the negative current feedback routine S532. As illustrated in FIG. 10B, the process, which is the same as or equivalent to that of the routine 531, is performed in the routine 532. That is, the microcomputer 186A reads the voltage value n− of the wiring line 322 (Step S5321), and the value n−, which is obtained by performing the A/D conversion, is stored in the temporary register (internal register) (Step S5322). Subsequently, the register value N−, which is held in the set N− register, is read (Step S5323) to compare the register value N− and the internal register value n− (Step S5324). If the values are identical with each other, the process skips Step S5325. If the values are different from each other, then the value of the set N− register is overwritten with the internal register value n− (Step S5325), and the negative current feedback routine S532 is completed. The completion of the respective routines S531, S532 results in the waiting state (Step S02) in which the state of the XY switch 185 is subjected to the scanning.

According to the first to fourth embodiments described above, it is possible to effect the connection with the two terminals 23A, 23B possessed by the light-emitting device 20 irrelevant to whether the light-emitting device 20 is the LED bulb or the LED light emission module and irrelevant to whether the light-emitting device 20 is assembled as the light-emitting device equipment or constructed as the bulb. It is possible to adjust the luminance (emission amount) and the chromaticity (color phase, color temperature) of the light-emitting device 20 by controlling the driving current supply with respect to the LED groups 22A, 22B having the different polarities possessed by the light-emitting device 20.

This fact has such an advantage that the light modulation and the color modulation of the light-emitting device 20 may be realized by utilizing the wiring lines having been already equipped in the building. An advantage is also provided such that any special wiring line, which includes, for example, those based on the three-wire system and the four-wire system, is unnecessary even when the light-emitting device 20 is installed in a newly-built building to realize the light modulation and the color modulation functions.

Further, an advantage is provided such that the means for controlling the light modulation and the color modulation of the light-emitting device 20 can be realized in a form of an "intermediate switch" inserted into an intermediate portion of a power source cord as in the desk (table) illumination equipment.

An advantage is exhibited in the most useful form of utilization when a plurality of bulb sockets are connected in parallel and installed on a ceiling in an existing building, a flashing switch is installed in a form of being embedded in a wall, and the commercial AC power source is supplied to a flashing switch box.

In this case, the light modulation function and the color modulation function can be realized without requiring any change of the wiring lines, merely by exchanging the incandescent bulb with the light-emitting device 20 which performs the light emission at the two types of color temperatures as explained in the embodiment of the present invention, and exchanging the flashing switch with the light modulation/color modulation apparatus as explained in the embodiment of the present invention.

Fifth Embodiment

Next, an LED illumination system according to a fifth embodiment of the present invention will be explained. A pair of power lines drawn AC power from a power source (commercial power source) are in the position of the light control apparatus to be installed, and a pair of two power supply lines are previously installed between the position of the light control apparatus to be installed and the position of the LED illumination apparatus to be installed. In such a situation, the driving current, which is adjusted by a control circuit carried on the light control apparatus, can be supplied to the LED illumination apparatus. In the fifth embodiment, an explanation will be made about an LED illumination system including a light control apparatus and an LED illumination apparatus when a wiring structure is applicable such that a pair of two power supply lines are connected from a power source to the light control apparatus as described above, and the light control apparatus and the LED illumination apparatus are connected by a pair of two power supply lines (driving current supply lines).

Figure 11:
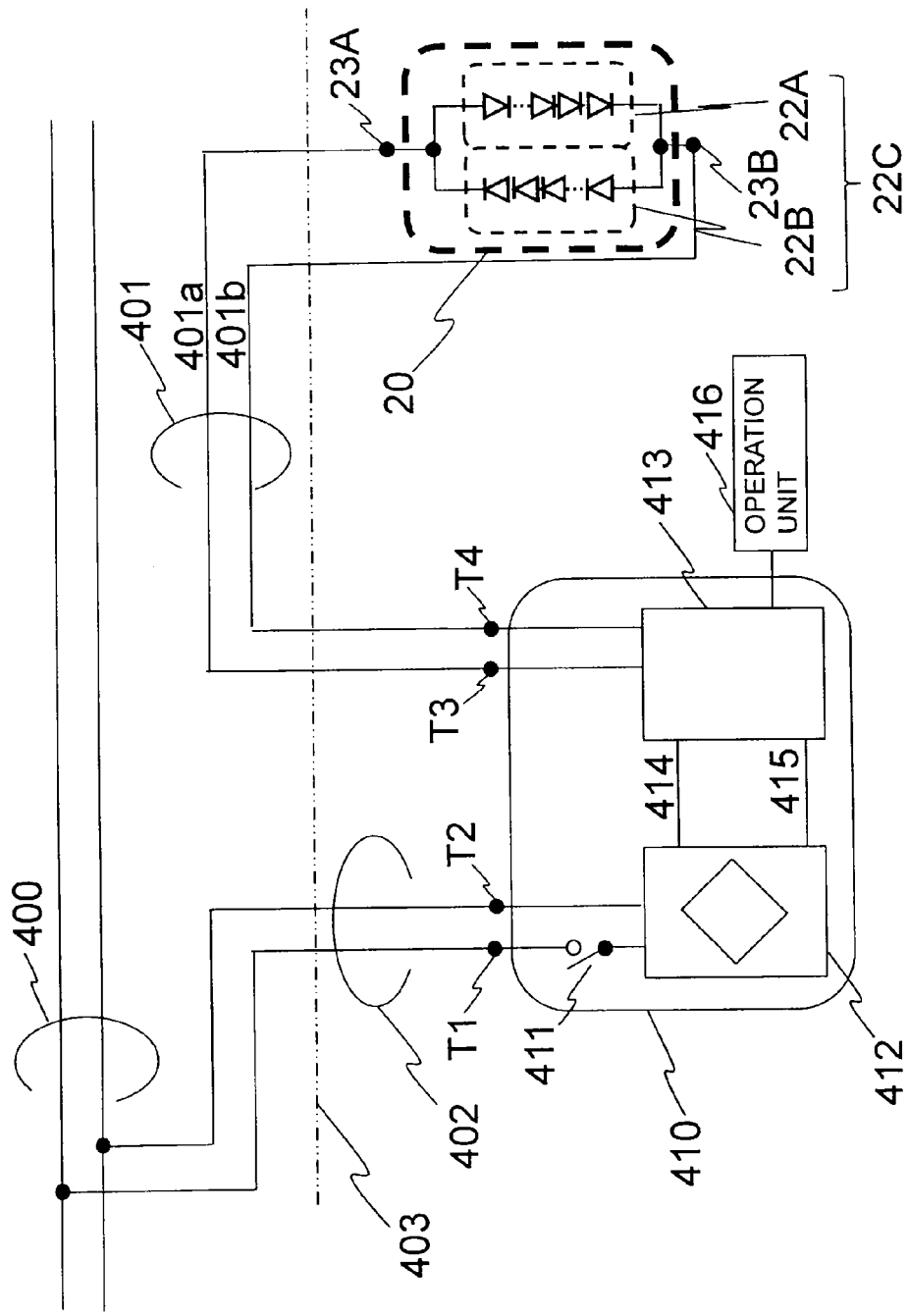
FIG. 11 shows an example of arrangement of an illumination system (LED light-emitting device and light control apparatus) according to a fifth embodiment.
Figure 12:
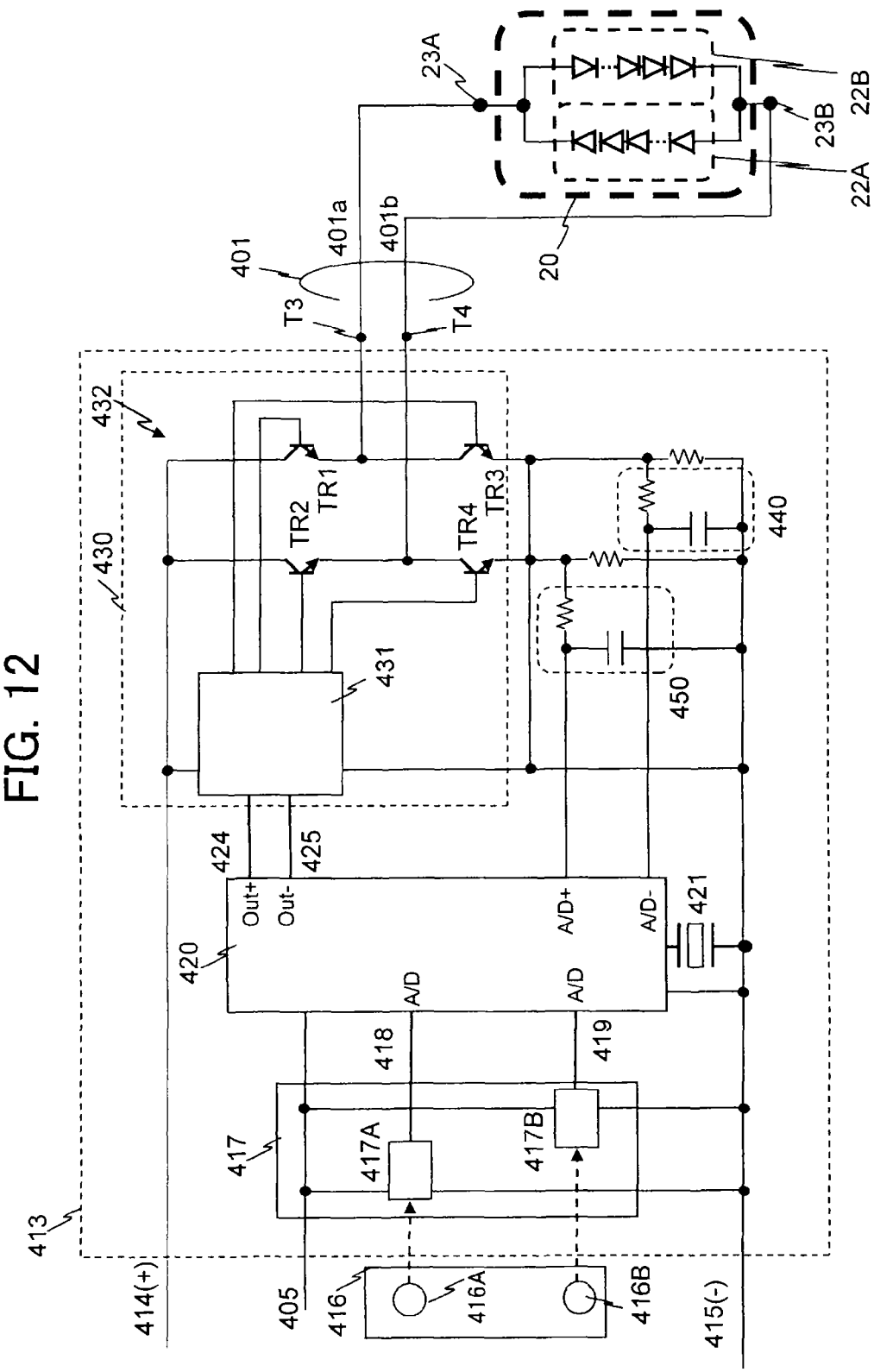
FIG. 12 shows an exemplary arrangement of the light control apparatus in the fifth embodiment.

FIG. 11 shows a schematic circuit arrangement of an LED illumination system according to the fifth embodiment. FIG. 12 shows an exemplary arrangement of a control circuit shown in FIG. 11. FIG. 11 shows a schematic circuit arrangement of the LED illumination system.

FIG. 11 shows, with a boundary of an imaginary line (virtual line) 403 depicted by a two-dot chain line, an electrical wiring line installation space (on the upper side of the imaginary line 403) and an installation space for the LED illumination system (on the lower side of the imaginary line 403) in which the LED illumination apparatus (light-emitting device) 20 and the light control apparatus (light modulation box) 410 connected with the electrical wiring lines are arranged.

The electrical wiring line installation space is usually provided in the wall or at the back of the ceiling, which is isolated from the illumination system installation space by the wall or the ceiling. In the example shown in FIG. 11, the wiring lines, which are arranged in the electrical wiring line installation space, include a pair of commercial power source bus lines 400 to which the commercial power source (for example, AC 100 V, 50 Hz) is supplied, a pair of power supply lines 401 (401a, 401b) which are provided for the illumination apparatus, and a pair of lead-in lines 402 which are provided for flashing the illumination apparatus and which are led out from the commercial power source bus lines 400.

A pair of input side terminals T1, T2, which are possessed by the light control apparatus (light modulation box) 410, are connected to the lead-in lines 402. The light control apparatus 410 has a pair of output side terminals T3, T4. The terminals T3, T4 are connected to the power supply lines 401 (401a, 401b) for the illumination apparatus. On the other hand, the LED illumination apparatus (light-emitting device) 20, which has a pair of terminals 23A, 23B, is connected to the power supply lines 401 for the illumination apparatus. The LED illumination apparatus 20 is provided with an LED group 22A and an LED group 22B which are connected in antiparallel in the same manner as the LED illumination apparatus explained in the first embodiment. However, in the fifth embodiment, the color temperature of the white light emitted by the LED group 22A is higher than the color temperature of that emitted by the LED group 22B.

The light control apparatus 410 can receive the AC power from the commercial power source supplied from the terminals T1, T2. Therefore, the light control apparatus 410 includes a DC power source supply circuit (power source circuit) 412 of the full-wave rectification type which functions as the DC current generating unit. Owing to the power source circuit 412, it is possible to provide the stable DC power source irrelevant to the conduction state of the load.

The power source circuit 412 is connected to a control circuit 413 via DC power source supply lines 414, 415. When the commercial AC power source has the execution value (practical value) of 100 V, the power source circuit 412 is the DC power source which supplies the DC voltage of about 140 V when no load is applied, via the power supply lines 414, 415.

With reference to FIG. 12, the control circuit 413 is provided with an operation amount detecting unit 417 which is connected to an operation unit 416, a control device (controller) 420 which functions as first and second control units, and a driving device (driver) 430. The driving device 430 includes a driving logic circuit (control circuit) 431, and a driving circuit 432 which is an H-type bridge circuit. Output terminals of the driving circuit 432 are connected to terminals T3, T4, which are connected to the LED illumination apparatus 20 via the power supply lines 401. The LED illumination apparatus 20 includes an LED module 22C. The LED module 22C includes the LED group 22A and the LED group 22B which are connected in parallel while providing the opposite polarities between the terminals 23A, 23B (see FIG. 11).

The operation unit 416 is an operation device which is provided to carry out the adjustment (light modulation) of the luminance (light emission amount) and the adjustment (color modulation) of the chromaticity (hue, color temperature) of the light emitted by the LED illumination apparatus 20. The operation unit 416 includes an operation dial 416A for the light modulation and an operation dial 416B for the color modulation. When a user rotates the respective dials 416A, 416B, it is possible to adjust the luminance (light emission amount) and the chromaticity (hue, color temperature) of the LED illumination apparatus 20.

An operation amount detecting unit 417 is a signal generator which outputs the signal corresponding to the amount of rotation (angle of rotation) of the dial as the operation amount of each of the operation dials 416A, 416B. In this embodiment, the operation amount detecting unit 417 includes a variable resistor 417A in which the resistance value is varied depending on the amount of rotation (angle of rotation) of the operation dial 416A, and a variable resistor 417B in which the resistance value is varied depending on the amount of rotation (angle of rotation) of the operation dial 416B. A predetermined DC voltage (for example, 5 V at the maximum when no load is applied), which is generated from the commercial AC power source by the power source circuit 412, is applied to a wiring line 405 in the operation amount detecting unit 417. A voltage (5 V at the maximum), which depends on the resistance value of the variable resistor 417A, is generated on a wiring line (signal line) 418 which connects the operation amount detecting unit 417 and the control device 420. On the other hand, a voltage (5 V at the maximum), which depends on the resistance value of the variable resistor 417B, is generated on a wiring line (signal line) 419 which connects the operation amount detecting unit 417 and the control device 420. In this way, the operation amount detecting unit 417 generates the signal voltage depending on each of the operation amounts of the operation dials 416A, 416B.

Slide bars are also applicable in place of the operation dials 416A, 416B. When the slide bars are applied, the voltage (signal), which depends on the amount of movement in place of the amount of rotation, is generated in the operation amount detecting unit 417. Further, the operation amount detecting unit 417 outputs, as the control signal, the voltage depending on the variable resistance value. Alternatively, rotary encoders, which detect the amounts of rotation (angles of rotation) of the operation dials 416A, 416B, may be provided, and the pulses, which indicate the amounts of rotation of the rotary encoders, may be inputted into the control device 420. In this case, it is possible to omit any analog/digital converter for converting the voltage into the digital value described later on.

The control device 420 is a control circuit which is constructed by combining, for example, an analog/digital converter (A/D converter), a microcomputer (MP), a register, a timer, and a counter. As for the microcomputer, for example, it is possible to apply a memory-containing type microprocessor in which the master clock is operated at an operation frequency (for example, 4 MHz) from an unillustrated crystal oscillator.

In the microcomputer, an operation program, which is recorded in unillustrated internal ROM (Read Only Memory), is loaded to unillustrated RAM (Random Access Memory), and the process is executed in accordance with the program.

The A/D converter outputs the digital value of the voltage generated in the signal line 418, and the digital value is set to the unillustrated register. Further, the A/D converter outputs the digital value of the voltage generated in the signal line 419, and the digital value is set to the unillustrated register.

The timer and the counter, which are provided for the control device 420, are driven by a ceramic oscillator 421 which oscillates at a desired self-excited oscillation frequency (for example, 1 MHz). The complementary pulses are outputted in a self-excited manner at preset timings from wiring lines 424, 425 which connect the control device 420 and the driving logic circuit 431. The complementary pulses are previously set, for example, such that the repetition frequency is a predetermined frequency.

Figure 13:
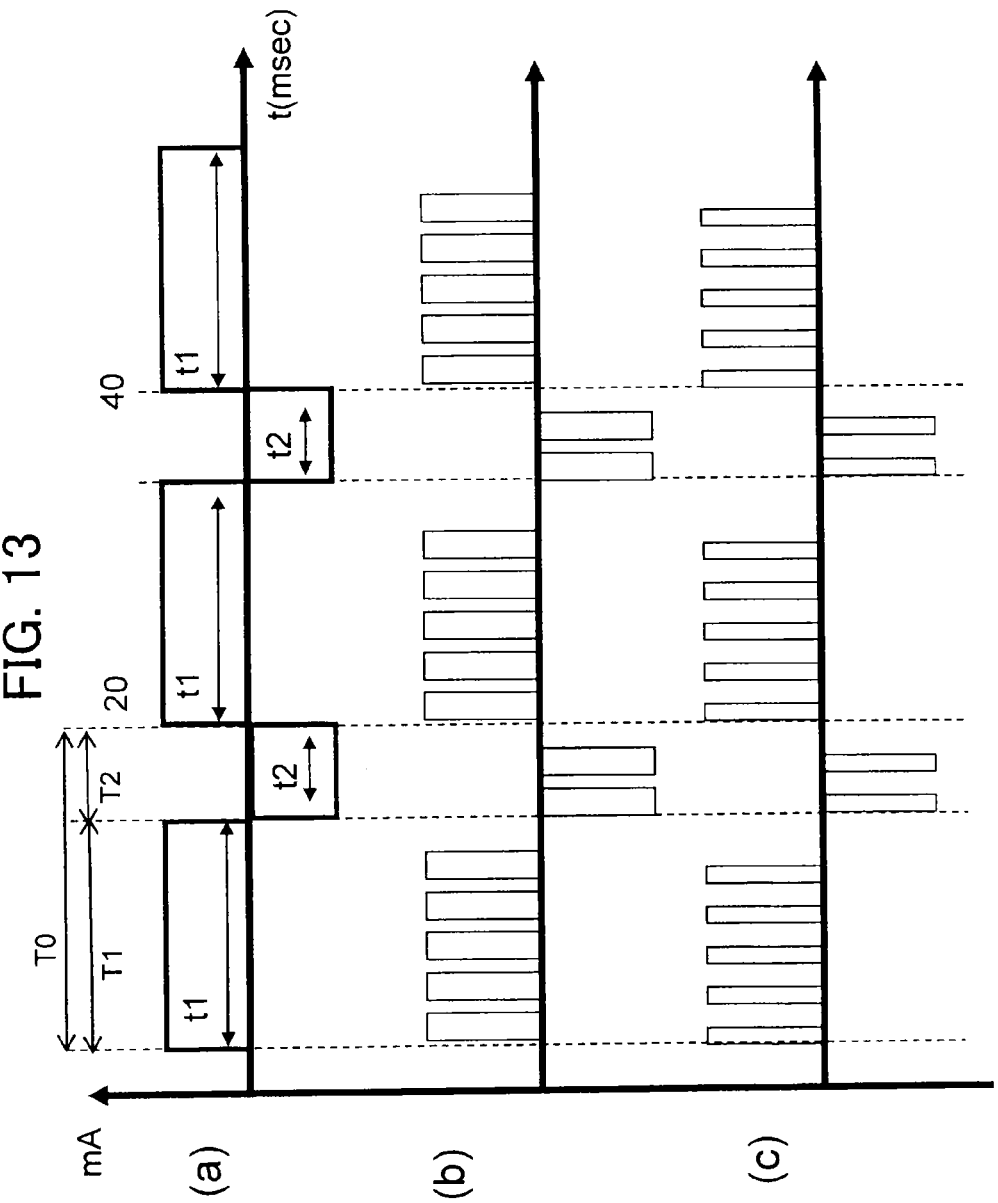
FIG. 13 shows examples of the shape of current wave supplied to the LED light-emitting device when the luminance is adjusted in the fifth embodiment.

The microcomputer performs the control pulse generating process in accordance with the digital values (operation amounts of the operation dials 416A, 416B) set in the respective registers. The control device 420 supplies the control signal via the signal lines 424, 425 to the driving device 430 in each 1 cycle (period) T0 (20 msec) at the repetition frequency t0 (50 Hz in this embodiment). In this embodiment, as shown in FIG. 13 (a), in 1 cycle (period T0), the control device 420 outputs the positive pulse during the period of time T1 in which the positive control signal is supplied, and the control device 420 outputs the negative pulse during the period of time T2 in which the negative control signal is supplied.

The microcomputer controls the luminance (light emission amount) by increasing or decreasing the ON time of the pulses in the period of time T1 and the period of time T2 respectively without changing the ratio of the ON time between the positive and negative pulses in 1 cycle, in accordance with the variation of the operation amount of the operation dial 416A. On the other hand, the microcomputer controls the chromaticity (color temperature in this embodiment) by substantially changing the ratio between the respective periods of time T1, T2 and changing the ratio between the ON time of the positive pulse and the ON time of the negative pulse in 1 cycle in accordance with the variation of the operation amount of the operation dial 416B.

The driving logic circuit 431 controls the ON/OFF operation (switching operation) of transistors (switching elements) TR1 to TR4 provided for the driving circuit 432 in accordance with the pulses (control signal) supplied from the wiring lines 424, 425. That is, the control circuit 431 turns OFF the transistors TR1 to TR4 when the pulse input is not given from the wiring lines 424, 425. On the other hand, the control circuit 431 turns ON the transistors TR1, TR4, while the control circuit 431 turns OFF the transistors TR2, TR3 during the period in which the positive pulse is inputted from the wiring line 424. Accordingly, the DC current, which is supplied from the power source circuit 412 via the wiring line 414, is allowed to flow through the transistor TR1 to the power supply line 401a, and the DC current is consumed for the lighting (turning ON) of the LED group 22A. After that, the current is allowed to flow (grounded) to the wiring line 415 via the power supply line 401b and the transistor TR4.

On the other hand, the driving logic circuit 431 turns ON the transistors TR2, TR3, while the driving logic circuit 431 turns OFF the transistors TR1, TR4 during the period in which the negative pulse is inputted from the wiring line 425. Accordingly, the DC current, which is supplied from the power source circuit 412 via the wiring line 414, is allowed to flow through the transistor TR2 to the wiring line 401b, and the DC current is consumed for the lighting (turning ON) of the LED group 22B. After that, the current is allowed to flow (grounded) to the wiring line 415 via the wiring line 401a and the transistor TR3.

Therefore, the positive driving current and the negative driving current, which have the same shape of waves as those of the pulses (control signal) outputted from the control device 420, are alternately supplied to the LED illumination apparatus 20. In other words, the AC currents, which have the different polarities, are supplied as the driving currents to the LED groups 22A, 22B. The average current, which is supplied to each of the LED groups 22A, 22B, depends on the ON time of the pulse. That is, the larger the ON time of the positive/negative pulse is, the more raised the average current value of the driving current supplied to each of LED's 22A, 22B in 1 cycle is. On the contrary, the smaller the duty ratio is (the smaller the ON time of the pulse is), the smaller the average current value is.

FIG. 13 (a) shows the pulses provided when the duty ratio is 1. Therefore, one pulse is outputted in each of the supply periods of time T1, T2 for the positive and negative pulses. FIG. 13 (b) shows a state in which the duty ratio is lowered in the periods of time T1, T2 in accordance with the PWM control of the microcomputer. The state, in which a plurality of positive/negative pulses each having a predetermined pulse width are supplied, is provided by changing the duty ratio. Further, FIG. 13 (c) shows a state provided when the duty ratio is further lowered as compared with FIG. 13 (b). In this situation, the pulse width of each of the positive/negative pulses is further decreased.

Examples shown in FIG. 13 (a) to FIG. 13 (c) are illustrative of the situation provided when the operation dial 416A for the light modulation is operated so that the luminance (light emission amount) is decreased. When the operation dial 416A is operated as described above, then the ON time of the pulse is decreased by decreasing the duty ratio in accordance with the PWM control by the microcomputer, and thus the average current is lowered. Accordingly, the luminance (light emission amount) is lowered. However, the ratio of the ON time of the pulse is unchanged in 1 cycle (period of time T1 and period of time T2). Therefore, it is possible to increase/decrease the luminance (light emission amount) without changing the chromaticity (color temperature in this embodiment) of the LED illumination apparatus 20.

Figure 14:
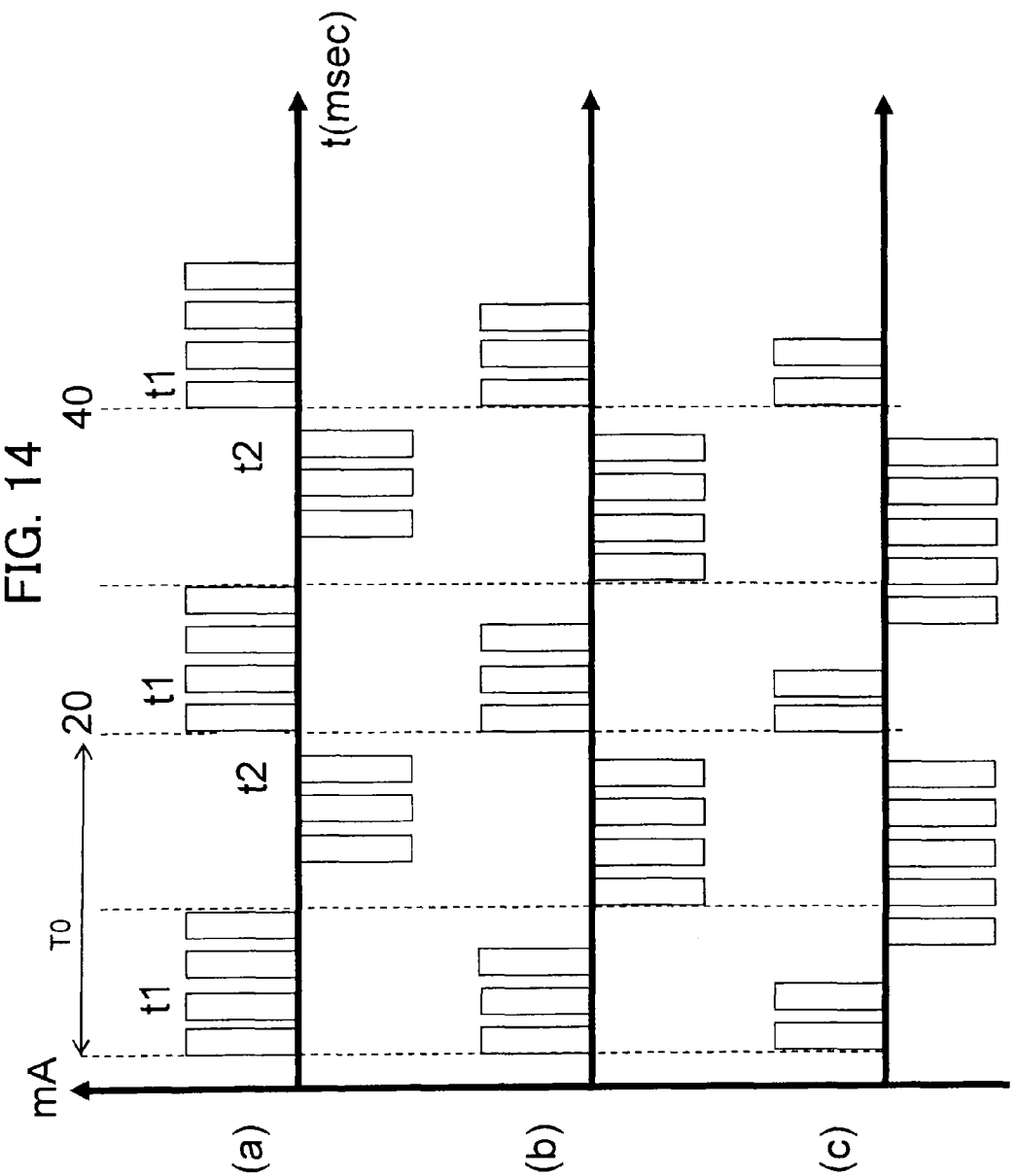
FIG. 14 shows examples of the shape of current wave supplied to the LED light-emitting device when the color temperature is adjusted in the fifth embodiment.

On the other hand, FIG. 14 (a) to FIG. 14 (c) show the states of the pulses provided when the operation dial 416B is operated. When the operation dial 416B is operated, the microcomputer changes the numbers of the positive and negative pulses in 1 cycle (period T0) without changing the pulse widths provided in the concerning situation. In FIG. 14 (a), the positive and negative pulses have the widths which are identical with each other, and the ratio of the ON time of the pulse is 4:3.

On the other hand, in FIG. 14 (b), the ratio of the ON time of the pulse is changed to 3:4. Further, in FIG. 14 (c), the ratio of the ON time of the pulse is changed to 2:5. The ratio between the lighting times of the LED groups 22A, 22B in 1 cycle is varied in accordance with the change of the ratio as described above. Accordingly, the chromaticity (color temperature in this embodiment) is changed for the combined light (synthesized light) emitted by turning ON the LED groups 22A, 22B respectively.

The repetition frequency T0 (self-excited oscillation frequency), which is provided to output the positive and negative pulses as described above, may be determined, for example, between 30 Hz and 50 KHz in view of the sensitivity of the human eye, the prevention of the switching loss, and the occurrence of the noise. Preferably, the repetition frequency T0 (self-excited oscillation frequency) is 50 Hz to 400 Hz. More preferably, the repetition frequency T0 (self-excited oscillation frequency) is 50 or 60 Hz to 120 Hz. The self-excited oscillation frequency may be determined independently from the commercial power source frequency. However, it is not denied that the same frequency as the commercial power source frequency is selected. In this embodiment, the transistors TR1 to TR4 are applied as the switching elements. However, FET may be used in place of transistor.

Integration circuits 450, 440 are provided for the control circuit 413 shown in FIG. 12. The integration circuit 450 feedbacks, to the control device 420, the voltage proportional to the average value of the positive currents for driving the LED group 22A, and the integration circuit 440 feedbacks, to the control device 420, the voltage proportional to the average value of the negative currents for driving the LED group 22B. The control device 420 observes the feedback voltages of the integration circuits 440, 450 by using the A/D converter to utilize the same for generating the control signal (pulses).

An explanation will be made below about an exemplary operation of the light control apparatus 410. When a main power source switch 411 (FIG. 11) is closed, then the operation is performed by the power source circuit 412 for the rectification and the voltage conversion, and the DC power source is supplied to the control circuit 413.

The microcomputer of the control device 420 starts the initialization operation in accordance with a known method. The operation program, which is recorded in unillustrated internal ROM (Read Only Memory), is loaded to unillustrated RAM (Random Access Memory) to perform the process in accordance with the program.

When the luminance of the LED illumination apparatus 20 is adjusted, for example, the following operation and the operation of the light control apparatus 410 are performed. For example, the operator (user) fully turns the operation dial (operation knob) 416A, for example, rightwardly or clockwise, and the luminance (light emission amount) of the illumination is set to the maximum. Accordingly, the DC voltage, which is 5.0 volt at the maximum, is generated on the signal line 418. The control device 420 converts the voltage generated on the signal line 418 into the digital signal by means of the internal A/D converter so that the digital signal is read. The control signal is imparted via the signal lines 424, 425 to the driving logic circuit 431 of the driving circuit 430. The driving logic circuit 431 drives the driving circuit (H-type bridge) 432 in accordance with the control signal. In this procedure, the driving circuit 432 is driven at 50 Hz as the preset self-excited oscillation frequency. The shape of control signal wave, which is provided in this situation, is shown in FIG. 13 (*a*). The positive current is allowed to flow through the power supply line 401*a* during the time t1 which is the ON time of the positive pulse (control signal), and the LED group 22A (LED-H) is turned ON (subjected to the lighting). On the other hand, the negative current is allowed to flow through the power supply line 401*a* during the time t2 which is the ON time of the negative pulse (control signal), and the LED group 22B (LED-L) is turned ON (subjected to the lighting).

As a result, the AC current at about 50 Hz is applied to the power supply lines 401, and the LED group 22A and the LED group 22B, which are carried on the LED illumination apparatus 20, are alternately turned ON. The ratio between the current (individual current) allowed to flow during the time t1 and the current (individual current) allowed to flow during the time t2 dominates the chromaticity (color temperature in this embodiment) of the combined light (synthesized light) emitted by the LED groups 22A, 22B. In the state shown in FIG. 13 (*a*), the lighting time of the LED group 22A having the high Kelvin temperature (color temperature) is longer than the lighting time of the LED group 22B. The light emission color of the LED module 22C provides a somewhat bluish white color.

The user turns the operation dial (luminance control knob) 416A counterclockwise in the left direction to perform the setting so that the luminance of the illumination has the median (medium value). Accordingly, the DC voltage at about 2.5 volt is generated on the signal line 418.

The microcomputer of the control device 420 converts the voltage into the digital value by means of the internal A/D converter, and the digital value is read. The microcomputer controls the operation of the driving device 430, and supplies the AC current to the LED illumination apparatus 20. In this situation, the pulse shape is in a state shown in FIG. 13 (*b*). That is, the ratio between the ON time of the positive pulse in the period of time T1 and the ON time of the negative pulse in the period of time T2 is unchanged, but the modulation of the pulse frequency (about 400 Hz) is effected (duty ratio is lowered). Therefore, a plurality of pulse groups are provided, in which one pulse has a pulse width corresponding to the duty ratio at the maximum luminance. The pulse width of the positive pulse is the same as the pulse width of the negative pulse. Accordingly, the average current is decreased as compared with when the maximum luminance is provided. Therefore, the luminances of the LED group 22A (LED-H) and the LED group 22B (LED-L) are lowered.

After that, the user further turns the operation dial (luminance control knob) 416A counterclockwise in the leftward direction, and the luminance of the illumination is set to the minimum value. Accordingly, the DC voltage at about 0.5 volt is generated on the signal line 418.

The microcomputer of the control device 420 converts the voltage value by the A/D converter, and the converted value is read to control the driving device 430 in accordance with the voltage value. That is, as shown in FIG. 13 (*c*), the control device 420 further lowers the duty ratio of the positive and negative pulses in the periods of time T1, T2. Accordingly, the ratio between the ON time of the positive pulse in the period of time T1 and the ON time of the negative pulse in the period of time T2 is unchanged, and the modulation of about 400 Hz is unchanged as well. However, the pulse width (duty) at 400 Hz is further decreased, and hence the average current is further decreased as compared with that provided at the median (middle) luminance. Therefore, both of the LED group 22A (LED-H) and the LED group 22B (LED-L) provide the darkest luminances.

Next, an explanation will be made about an operation of the operator (user) and an exemplary operation of the light control apparatus 410 when the chromaticity (color temperature in this embodiment) of the LED light control apparatus 20 is adjusted. As for the shape of the current wave shown in FIG. 13 (*b*), the average current for the LED group 22A (LED-H) is larger than the average current for the LED group 22B (LED-L). Therefore, a somewhat bluish white color is provided.

An explanation will be made about a case in which the user intends the change to a somewhat reddish white color having a low color temperature in the state in which the current shape of wave shown in FIG. 13 (*b*) is supplied to the LED illumination apparatus 20. The user rotates the operation dial (chromaticity control knob) 416B to leftward (in the counterclockwise direction). Accordingly, the DC voltage (for example, about 4 volt), which is generated on the signal line 419, is lowered, for example, to about 3.0 volt.

The microcomputer of the control device 420 reads the digital value of the DC voltage of the signal line 419 converted by the A/D converter, and the shape of the pulse which controls the driving device 430 is changed. For example, the microcomputer of the control device 420 changes the shape of pulse supplied to the driving logic circuit 431 of the driving device 430 from the shape of pulse shown in FIG. 13 (*b*) to the shape of wave shown in FIG. 14 (*a*). That is, the ratio between the positive current (pulses) and the negative current (pulses), which has been 5:2 in the state shown in FIG. 13 (*b*), is changed by the microcomputer to 4:3 as shown in FIG. 14 (*a*). Accordingly, the average current, which is supplied to LED 22A, is decreased, and the average current, which is supplied to LED 22B, is increased. As a result, the light emission color, i.e., the color temperature of the LED module 22C is somewhat lowered to provide a reddish white color. In this situation, as shown in FIG. 14 (*a*), the ratio between the pulses is changed, but the total value of the pulses (total value of the average currents) is not changed. Therefore, the luminance of the LED module 22C is not changed.

After that, the user further intends the change to a reddish white color having the lowest Kelvin temperature, and the operation dial (chromaticity knob) 416B is rotated leftwardly (in the counterclockwise direction) to the limit. Accordingly, the DC voltage of the signal line 419, which has been about 3.0 volt, is lowered to about 1.0 volt.

When microcomputer 420 detects digital signals on signal line 419 which converted from DC voltage, the microcomputer of the control device 420 changes the control signal (pulses) to be supplied to the driving logic circuit 431. That is, the microcomputer imparts the control signal to the driving device 430 so that shape of the current pulses which flow through the power supply line 401*a* is changed from the shape shown in FIG. 14 (*a*) via the shape shown in FIG. 14 (*b*) to the shape shown in FIG. 14 (*c*) (ratio between the positive and negative currents (pulses) becomes 2:5). Accordingly, the average current for the LED group 22A (LED-H) is further decreased, while the average current for the LED group 22B (LED-L) is further increased. As a result, the color temperature of the LED module 22C is extremely lowered to provide a strongly reddish white color. In this situation, the entire luminance of the LED module 22C is not changed as well.

Figure 15:
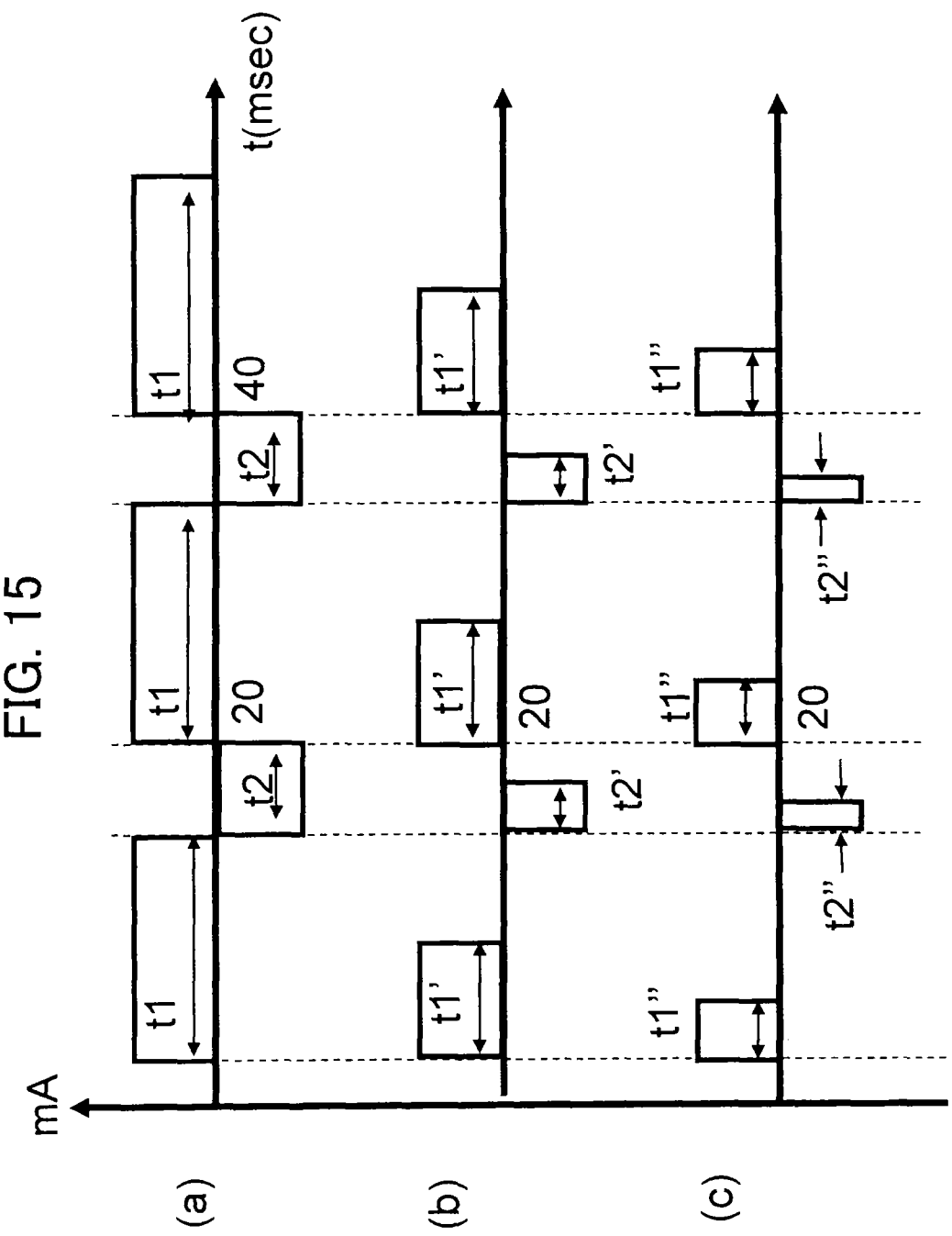
FIG. 15 shows examples of the shape of current wave supplied to the LED light-emitting device when the luminance is adjusted in a modified embodiment of the fifth embodiment.

FIG. 15 illustrates a modified embodiment, which shows the electric power change equivalent to that shown in FIG. 13. As shown in FIG. 15 (a), the current shape exhibits the same state as that shown in FIG. 13 (a) in the initial state.

When the light modulation is intended and the average value (effective value) of the current is lowered, then the electric power per unit time is equivalent in both cases, even when the current pulse as shown in FIG. 15 (b) is applied in place of the current pulse as shown in FIG. 13 (b). Similarly, FIG. 15 (c) is equivalent to FIG. 13 (c) in view of the electric power. When the control is performed as shown in FIG. 15, then the microcomputer of the control device 420 calculates the ON time of the pulse corresponding to the amount of rotation of the operation dial (luminance control knob) 416A, and the control is performed so that the pulse is turned ON during the concerning period. According to the modified embodiment as described above, it is possible to reduce the switching loss of the driving circuit 432.

Details of the operation will be explained below. In this modified embodiment, it is possible to apply the same circuit arrangement as the circuit arrangement shown in FIG. 12. However, the operation of the unillustrated program contained in the microcomputer is different.

It is assumed that the state shown in FIG. 15 (a) is in the situation of the maximum luminance, and it is assumed that the user operates the operation dial (luminance control knob) 416A so that the luminance of the illumination has the median (medium value). Accordingly, the times (pulse widths) t1, t2 shown in FIG. 15 (a) are decreased by 50% respectively by the microcomputer in such a state that the ratio therebetween is not changed. Accordingly, as shown in FIG. 15 (b), the currents (pulses) have the times (pulse widths) t1', t2' corresponding to 50% of the times (pulse widths) t1, t2 respectively. Accordingly, the average currents are lowered, and both of the LED groups 22A, 22B provide slightly dark light emission.

Further, when the user operates the operation dial 416A so that the luminance of the illumination has the minimum value, the microcomputer decreases the times (pulse widths) t1', t2' shown in FIG. 15 (b) by 25% respectively in such a state that the ratio therebetween is not changed. Accordingly, as shown in FIG. 15 (c), the currents (pulses) have the times (pulse widths) t1", t2" corresponding to 25% of the times (pulse widths) t1', t2' respectively. Accordingly, the average currents are lowered, and both of the LED groups 22A, 22B provide extremely dark light emission.

Figure 16:
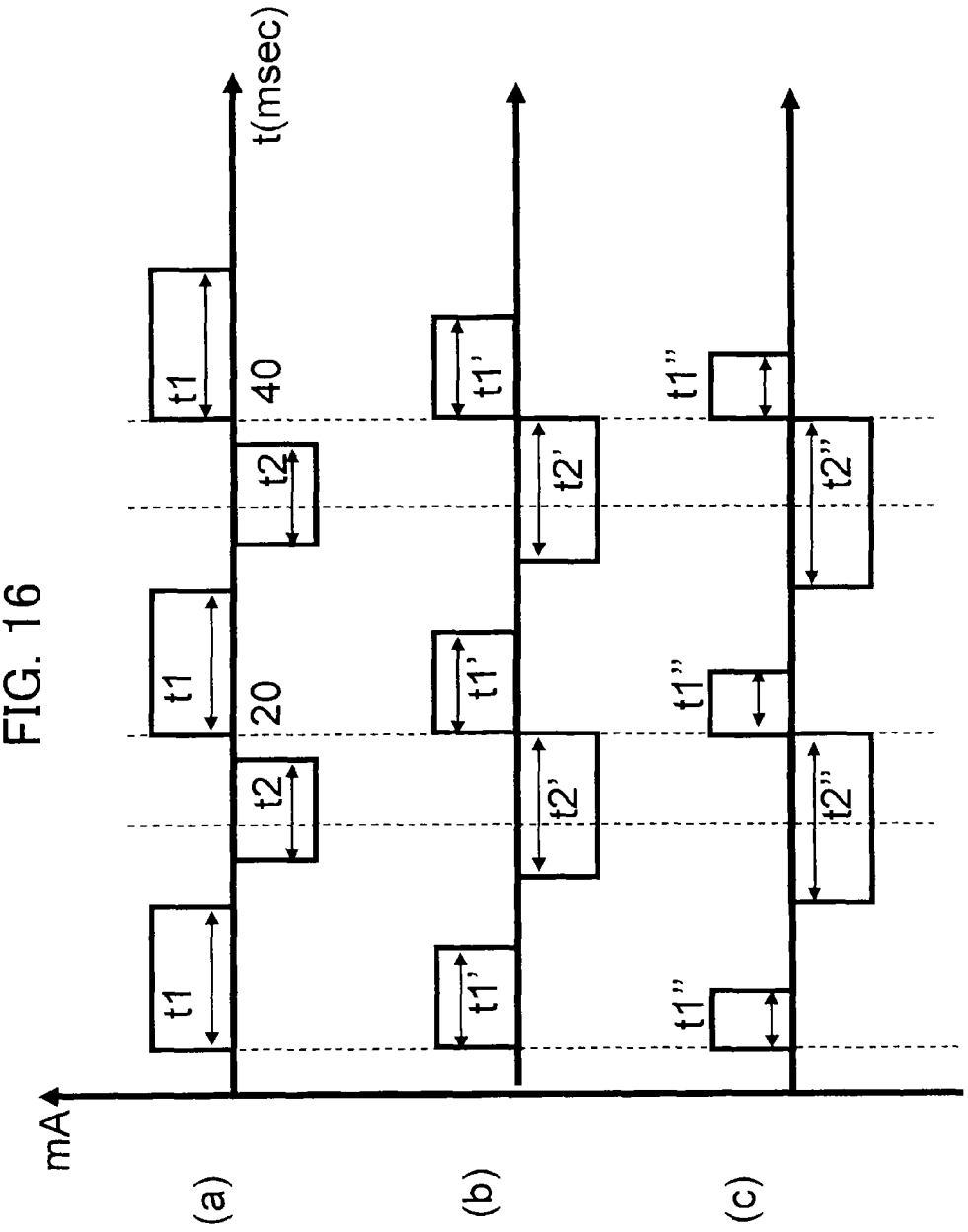
FIG. 16 shows examples of the shape of current wave supplied to the LED light-emitting device when the color temperature is adjusted in the modified embodiment of the fifth embodiment.

When the user intends the decrease in the chromaticity (color temperature in this embodiment) and the user operates the operation dial (chromaticity control knob) 416B in the state shown in FIG. 15 (a), then the microcomputer changes the ratio between the times (pulse widths) t1, t2 to make the change to a state in which the time t1 is decreased to the time t1' and a state in which the time t2 is increased to the time t2' as shown in FIG. 16 (b).

Further, when the user operates the operation dial 416B so that the color temperature is decreased maximally, then the time t1' is further decreased, and the time t2' is further increased to provide a state shown in FIG. 16 (c).

In this way, the microcomputer can adjust the luminance (light emission amount) and the chromaticity (hue, color temperature) of the light emitted from the LED module 22C by changing one pulse width supplied to the driving logic circuit 431 depending on the operation amount of each of the operation dials 416A, 416B.

In the modified embodiment described above, the harmonics components, which are contained in the current pulse, are decreased as compared with the examples shown in FIG. 13 and FIG. 14. Therefore, there are provided such an advantage that the electric wave (or radio wave) interference exerted on the surroundings can be reduced and such an advantage that the electric power loss of the semiconductor, which is approximately proportional to the switching frequency, can be reduced.

According to the first to fifth embodiments, the light control apparatus converts the AC current supplied from the AC power source such as the commercial power source into the DC current by means of the power source circuit, and the control device 420 controls the driving device 430 to generate the AC current having the desired frequency based on the self-excited oscillation frequency (positive and negative currents supplied in every period T0) from the DC current converted from the AC current so that the AC current is supplied as the driving current to the pair of LED groups (LED groups 22A, 22B) connected in antiparallel. Accordingly, it is possible to enhance the degree of freedom of the design of the light control apparatus. Further, the self-excited oscillation frequency is set to the frequency higher than the sensitivity of the human eye, and thus it is possible to avoid the occurrence of the flicker (flickering) of the illumination. Further, it is also possible to contribute to the improvement in the power factor.

Further, the control device 420 can individually control the average currents to be supplied to the LED groups 22A, 22B respectively. Further, it is possible to adjust the luminance by increasing/decreasing the respective average currents without changing the ratio between the average currents. Further, it is possible to change the color temperature of the light emitted from the LED module 22C without changing the luminance by changing the ratio between the average currents to be supplied to the LED groups 22A, 22B respectively.

<Light-Emitting Module and Package>

Figure 17A:
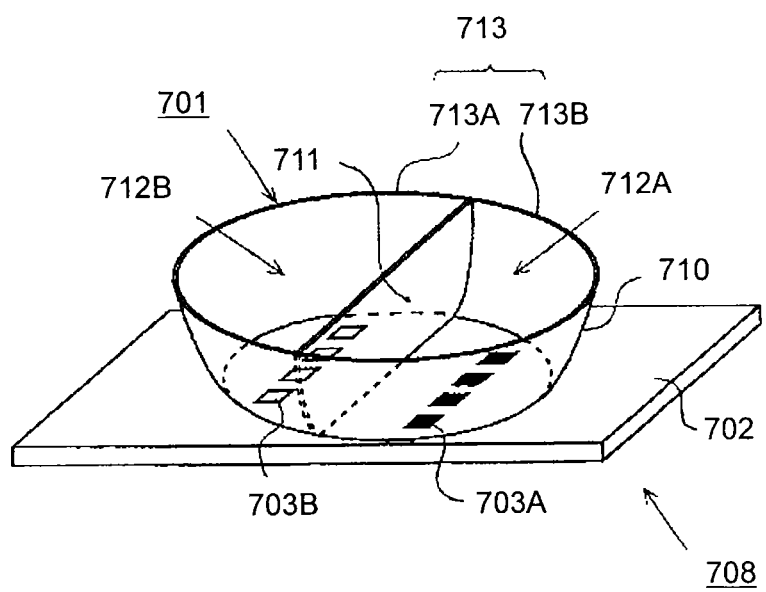
FIG. 17A shows a perspective view illustrating a schematic arrangement of a package in a semiconductor light-emitting apparatus (hereinafter referred to as "white LED") for constructing a light-emitting module (LED module).
Figure 17B:
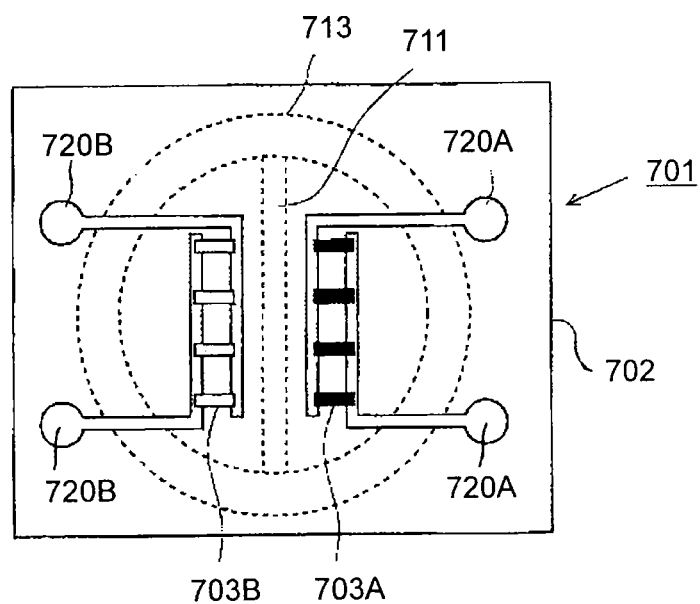
FIG. 17B shows a mounted state of the wiring line for supplying the electric power to a semiconductor light-emitting element (hereinafter referred to as "LED chip") provided for the package.
Figure 18:
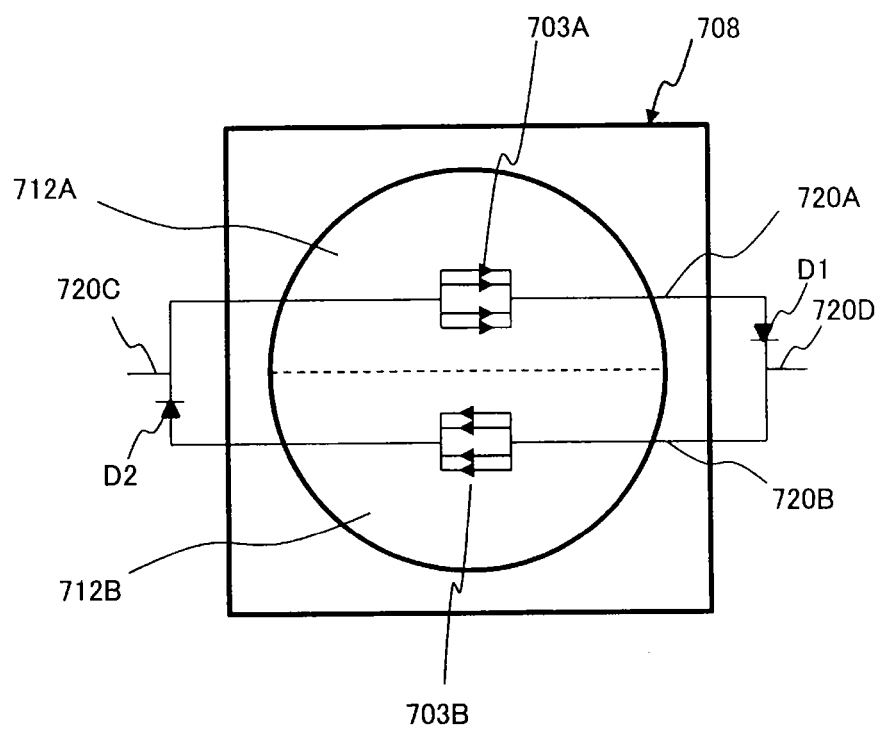
FIG. 18 shows the package (white LED) shown in FIGS. 17A and 17B as schematically illustrated by using electrical symbols.
Figure 19:
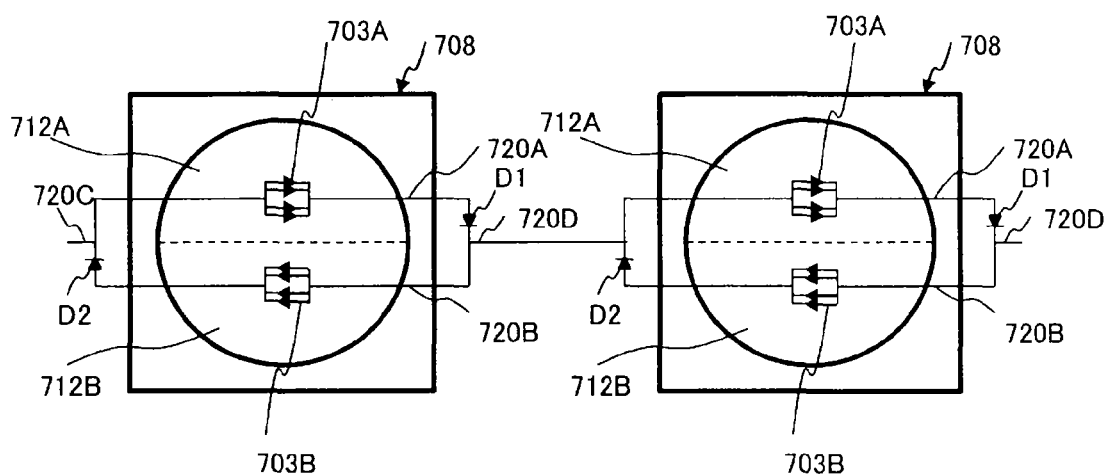
FIG. 19 schematically shows a state in which white LED's shown in FIG. 18 are connected in series.
Figure 20:
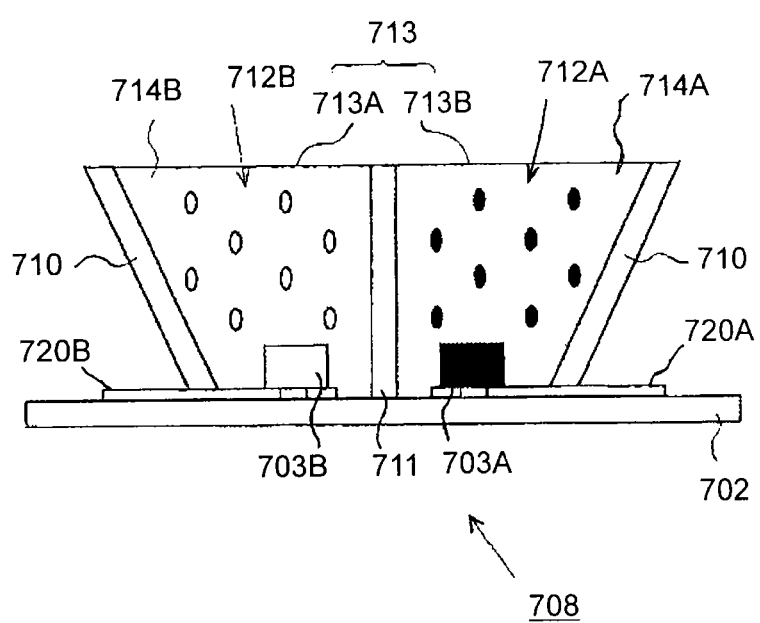
FIG. 20 shows a sectional view illustrating a situation in which white LED shown in FIG. 17A is cut or sectioned along a plane including the wiring line.

Next, a light-emitting module and a package will be explained. The light-emitting module and the package are applicable to the LED illumination apparatuses explained in the embodiments. FIG. 17A illustrates a perspective view illustrating a schematic arrangement of a package 701 included in a semiconductor light-emitting apparatus (hereinafter referred to as "white LED") 708 for constructing a light-emitting module (LED module). FIG. 17B shows a mounted state of wiring lines 720A, 720B for supplying the electric power to semiconductor light-emitting elements (LED elements, hereinafter referred to as "LED chips") 703A, 703B provided in the package 701. FIG. 18 shows the package 701 illustrated in FIGS. 17A and 17B as schematically illustrated by using electrical symbols. FIG. 19 schematically shows a state in which white LED's shown in FIG. 18 are connected in series. Further, FIG. 20 shows a sectional view illustrating the white LED 708 illustrated in FIG. 17A as sectioned along a plane including the wiring lines 720A, 720B.

As illustrated in FIG. 17A, the white LED 708 is constructed to include the package 701. The package 701 has an annular reflector 710 which is truncated cone-shaped and which is arranged on a substrate 702. The reflector 710 has a function to guide a part of the output light outputted from respective divided area portions 712 described later on in the emission (radiation) direction of the white LED 708, and the reflector 710 also functions as a main body of the package 701. The upper surface side of the truncated cone shape of the reflector 710 is disposed in the emission direction of the light emitted by the white LED 708, on which an opening 713 is formed. On the other hand, the substrate 702 is arranged on the lower surface side of the truncated cone shape of the reflector 710, and wiring lines, which are provided to supply the electric power to the LED chips, are laid, for example, on the lower surface side, although details will be described later on (the wiring lines are not illustrated in FIG. 17A).

A partition 711, which divides the internal space of the annular reflector 710 equivalently into two areas as illustrated in FIGS. 16A and 17, is provided perpendicularly to the substrate 702. Two divided area portions 712A, 712B are defined in the reflector 710 by the partition 711. Further, an opening of the divided area portion 712A occupies the right half of the opening 713 of the reflector 710, and an opening of the divided area portion 712B occupies the left half of the opening 713 of the reflector 710. In this application, the opening of the divided area portion 712A is referred to as "divided opening 713A", and the opening of the divided area portion 712B is referred to as "divided opening 713B". That is, the opening 713 is divided by the partition 711 into the divided openings 713A, 713B.

However, the shapes of the divided area portions 712A, 712B in the package 701 are not limited to the structure in which the perpendicular wall is provided as the partition 711. The divided area portions 712A, 712B may be depressions or recesses which have shapes of, for example, truncated cones, truncated pyramids, or hemispheres respectively. It is not essential that the shapes and the internal volumes of the both divided area portions 712A, 712B should be identical with each other as well.

The package 701 illustrated in FIG. 17A is such a structural member that the divided area portions 712A, 712B are included in the integrated member. However, it is not essential to use such a package 701. Two structural members (packages), which are provided with the structures as the divided area portions, may be juxtaposed, wherein one of them can be allowed to function as the divided area portion 712A, and the other can be allowed to function as the divided area portion 712B.

Four LED chips 703A and four LED chips 703B are provided in the divided area portions 712A, 712B illustrated in FIG. 17A respectively. The LED chips 703A, 703B (referred to as "LED chips 703" when the LED chips are referred to generally or inclusively) are connected respectively to wiring lines 720A, 720B (referred to as "wiring lines 720" generally or inclusively in some cases) which form a pair. The light emission is effected by receiving the electric power supply. The LED chips 703 are connected to the wiring line 720 in each of the divided area portions as illustrated in FIG. 16B. That is, the four LED chips 703A are mounted on the wiring line 720A, and the four LED chips 703B are mounted on the wiring line 720B. The four LED chips 703, which are provided in each of the divided area portions, are connected in parallel in the forward direction with respect to the corresponding wiring line.

Those applicable as the LED chip include an ultraviolet LED chip which emits the light having the ultraviolet wavelength (light emission peak wavelength: 300 to 400 nm), a purple LED chip which emits the purple light (light emission peak wavelength: 400 to 440 nm), and a blue LED chip which emits the blue light (light emission peak wavelength: 440 nm to 480 nm). The number of LED chips 703 provided in each of the divided area portions 712A, 712B is, for example, 1 to 10. The number of LED chips 703 may be appropriately determined depending on the chip size and the required brightness. As for the type or types of the LED chips 703 provided in each of the divided area portions 712A, 712B, the LED chips 703 of the same type may be provided, or the LED chips 703 of different types may be provided. As for the combination of the different types, a combination of ultraviolet or purple LED and blue LED is assumed.

The mounted state of the LED chips 703A, 703B is schematically shown in FIG. 18. That is, the wiring lines 720A, 720B, which are positioned on the upper side and the lower side respectively as shown in FIG. 17B, are subjected to the wiring connection to provide such a state that the four LED chips 703A connected in parallel and the four LED chips 703B connected in parallel are connected in parallel in a state in which the polarities are opposite to one another. Further, the wiring line 720C and the wiring line 720D are led out from the wiring line 720A and the wiring line 720B subjected to the wiring connection respectively. The white LED 708 (package 701) is constructed to have the two terminals.

Further, the countercurrent-preventive diode D1 is inserted between the wiring line 720D and the cathode of the LED chip 703A, and the countercurrent-preventive diode D2 is inserted between the wiring line 720C and the cathode of the LED chip 703B. Accordingly, when the current, which is directed from the wiring line 720C to the wiring line 720D, is allowed to flow, only the respective LED chips 703A are turned ON (subjected to the lighting). On the other hand, when the current, which is directed from the wiring line 720D to the wiring line 720C, is allowed to flow, only the respective LED chips 703B are turned ON (subjected to the lighting). Therefore, the white LED 708 can be driven with the current in which the direction changes depending on the time, i.e., the AC current.

A predetermined number (exemplified by a number of 2 in FIG. 19) of the white LED's 708 (package 701) shown in FIG. 18 are connected in series as shown in FIG. 19. Accordingly, it is possible to obtain the LED module (light-emitting module) in which the LED chips 703A (corresponding to the LED group 22A (first LED (group)) and the LED chips 703B (corresponding to the LED group 22B (second LED (group)) schematically shown, for example, in FIG. 17A are connected in antiparallel.

The mounting of the LED chips 703 on the substrate 702 will now be explained on the basis of FIG. 21. The substrate 702 is a base portion for holding white LED 708 including the LED chips 703. The substrate 702 has a metal base member 702A, an insulating layer 702D which is formed on the metal base member 702A, and paired wiring lines 720C, 720D which are formed on the insulating layer 702D. The LED chip 703 has a p-electrode and an n-electrode as a pair of electrodes formed on a bottom surface and an upper surface which are opposed to one another. The electrode disposed on the bottom surface side of the LED chip 703 is joined to the upper surface of the paired wiring line 720C by the aid of eutectic solder 705 of AuSn. The electrode disposed on the upper surface side of the LED chip 703 is connected to the other paired wiring line 720D by means of a wire 706 made of metal. A pair of wiring lines 720A or 720B illustrated in FIG. 17B are formed by the pair of the paired wiring lines 720C, 720D so that the electric power is supplied to the four LED chips 703 disposed in each of the divided area portions.

Figure 21:
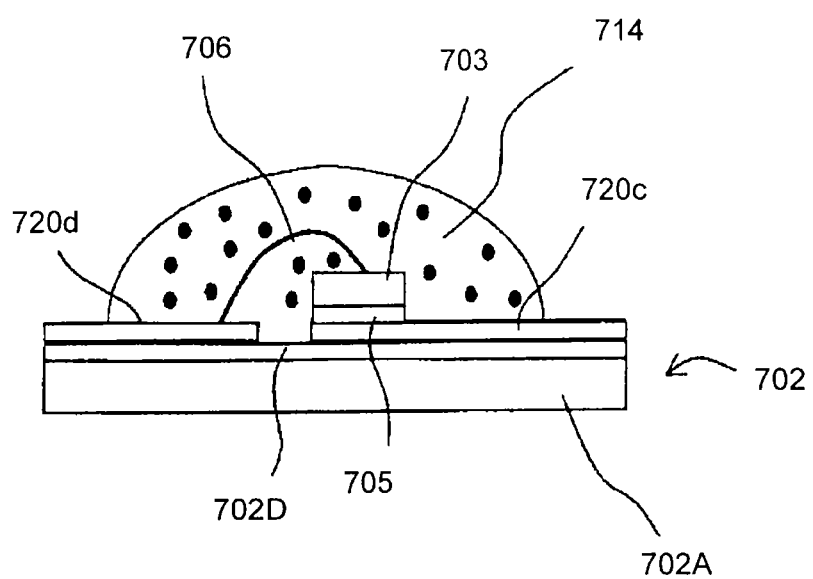
FIG. 21 illustrates the mounting of the LED chip on a substrate.

The electric connection between the LED chip 703 and the pair of paired wiring lines 720C, 720D of the substrate 702 is not limited to the form illustrated in FIG. 21. The electric connection can be performed by means of any appropriate method depending on the arrangement of the set of electrodes of the LED chip 703. For example, when the set of electrodes are formed on only one surface of the LED chip 703, the paired wiring lines 720C, 720D and the LED chip 703 can be electrically connected to one another such that the surface, on which the electrodes are provided, is directed upwardly to install the LED chip 703 thereon, and each set of the electrodes and each of the paired wiring lines 720C, 720D are connected, for example, by means of a wire 706 made of metal respectively. When the LED chip 703 is a flip-chip (face-down), the electric connection can be performed by connecting the electrodes of the LED chip 703 to the paired wiring lines 720C, 720D by means of gold bump or solder.

In this arrangement, the LED chip 703 excites fluorescent portions 714A, 714B (referred to as "fluorescent portion 714" generally or inclusively in some cases) as described later on. In particular, it is preferable to adopt a GaN-based LED element based on the use of a GaN-based compound semiconductor, for the following reason. That is, the light emission output and the external quantum efficiency are extremely large when the ultraviolet to blue light is emitted. Extremely bright light emission is obtained at an extremely low electric power by making combination with any fluorescent substance or fluorescent member as described later on. As for the GaN-based LED element, it is preferable to adopt those having a light-emitting layer containing In, for example, AlxGay-InzN light-emitting layer or InxGayN light-emitting layer. The following fact is well-known. That is, when the light emission wavelength is purple to blue, the light emission efficiency is especially enhanced when the light-emitting layer has a multi quantum well structure provided with an InxGayN well layer to provide a double-hetero structure in which the well layer is interposed by cladding layers.

As illustrated in FIG. 21, the fluorescent portion 714, which contains one or more kinds of fluorescent substance or fluorescent substances (fluorescent material or fluorescent materials) for absorbing a part of the light emitted from the LED chip 703 and emitting the light having a different wavelength and a transparent material for sealing the fluorescent substance or fluorescent substances, is provided on the substrate 702 while covering the LED chip 703 therewith. In FIG. 21, the reflector 710 is omitted from the illustration. However, such an embodiment may be an embodiment of white LED constructed with the package. The part of the light emitted from the LED chip 703 behaves as the exciting light which is partially or totally absorbed by the light-emitting substance (fluorescent substance or fluorescent material) included in the fluorescent portion 714. The fluorescent portion of the white LED 708 will be explained more specifically on the basis of FIG. 17. In the divided area portion 712A, the fluorescent portion 714A covers the LED chip 703A, and the fluorescent portion 714A is exposed at the divided opening 713A. Further, in the divided area portion 712B, the fluorescent portion 714B covers the LED chip 703B, and the fluorescent portion 714B is exposed at the divided opening 713B. Therefore, the output lights from the respective fluorescent portions 714A, 714B are radiated or emitted to the outside from the respective divided openings.

The white LED 708 has an object to output the white light. In particular, the combination of the LED chip 703 and the fluorescent substance is selected so that the emitted light color of white LED 708 has minimum value of duv, the deviation from the black-body radiation track, preferably to satisfy $-0.02 \leq duv \leq 0.02$ in the uv chromaticity diagram of the UCS (u, v) color system (CIE 1960). In the present invention, the deviation from the black-body radiation track, duv, follows the definition in Note of Item 5.4 of JIS Z8725 (method for measuring light source distribution temperature and color temperature/correlated color temperature). However, the black-body radiation track is not the absolute basis or reference. Any light emission color corresponding to any artificial standard (light emission color normalized by the deviation from any artificially determined reference light) is required in some cases.

When the light emission wavelength of the LED chip 703 is ultraviolet or purple, the white light is obtained by allowing the fluorescent portion 714 to emit or generate the three primary colors of R, G, B or the lights having wavelengths in the complementary color relationship including, for example, BY and RG. When the light emission wavelength of the LED chip 703 is blue, the white light is obtained by allowing the fluorescent portion 714 to emit or generate the light of Y or RG and effecting the color mixture with the light emission of the LED chip 703.

Sixth Embodiment

A sixth embodiment of the present invention will be explained below. In the sixth embodiment, an explanation will be made about an LED illumination system which makes it possible to realize both of the luminance control (luminance adjustment) and the chromaticity control (color temperature adjustment) without performing any construction work for replacing wiring lines by utilizing, for example, a wall-embedded type light control apparatus (light controller) provided in the room and utilizing an existing two-wire wiring lines.

Figure 22:
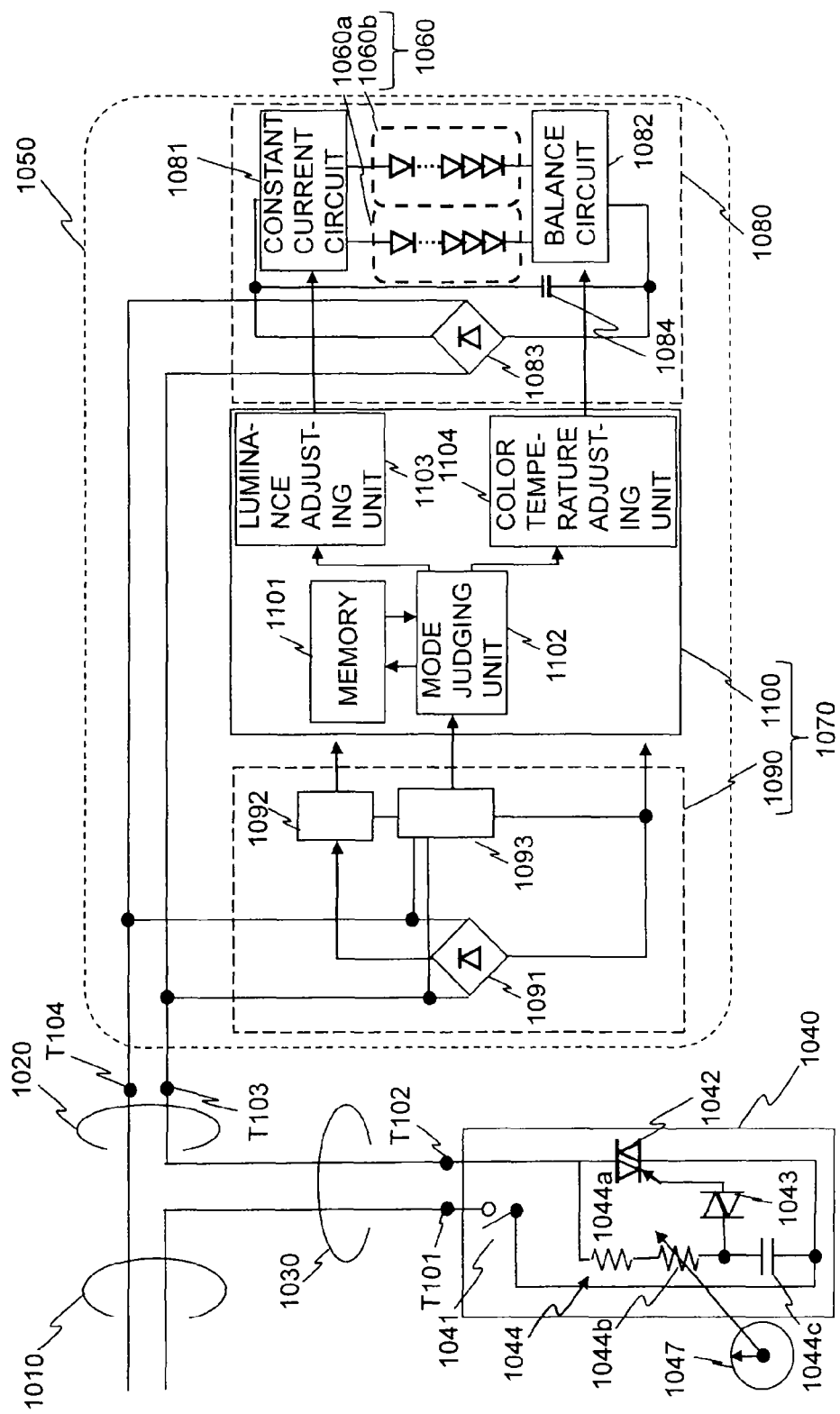
FIG. 22 shows an example of arrangement of an LED system according to a sixth embodiment.

FIG. 22 shows an exemplary arrangement of the LED illumination system according to the sixth embodiment. FIG. 22 shows a pair of commercial power source bus lines 1010 to which the commercial power source (for example, AC 100 V, 50 Hz) is supplied, a pair of power supply lines 1020 for an illumination instrument (illuminator), and a pair of lead-in lines 1030 for a light control apparatus. The wiring lines 1010, 1020, and 1030 are generally laid out in an electrical wiring line installation space provided in the wall or the ceiling of a building.

The light control apparatus 1040, which has a pair of terminals T101 and T102, is connected to the lead-in lines 1030. On the other hand, the LED illumination instrument (also referred to as "LED illumination apparatus" or "LED light-emitting device" or referred to as "LED bulb" in some cases as well), which has a pair of two terminals, is connected to the power supply lines 1020. In FIG. 22, the LED illumination instrument 1050, which has a pair of terminals T103, T104 and which is provided in place of an incandescent bulb (lamp), is connected. The light control apparatus 1040 is installed, for example, on the wall of the building. The LED illumination instrument 1050 is installed by means of a fixture provided on the wall or the ceiling, wherein the LED illumination instrument 1050 is electrically connected to the power supply lines 1020 by the aid of a socket or a connector.

The light control apparatus 1040 has the terminals T101, T102, a main power source switch 1041, a triac 1042, a trigger diode 1043, and a time constant circuit 1044. The terminals T101, T102 are connected to the lead-in lines 1030 in order to supply the electric power from the bus lines 1010 into the light control apparatus 1040. The main power source switch 1041 is the main power source switch for turning ON/OFF the LED illumination instrument 1050.

The triac 1042 functions as a conduction control unit for controlling the AC current supplied to the LED illumination instrument 1050. The triac 1042 is turned ON (ignited) by receiving the trigger signal from the trigger diode 1043 in the positive/negative half cycle in 1 cycle of the AC current of the commercial power source to continuously supply the positive or negative voltage (current) to the terminal T102 until the concerning half cycle is completed. The trigger diode 1043 supplies the trigger signal to the triac 1042 in order to ignite the triac 1042.

The time constant circuit 1044 controls the timing at which the trigger diode 1043 supplies the trigger signal to the triac 1042. The time constant circuit 1044 has a resistor 1044a, a variable resistor 1044b, and a capacitor (condenser) 1044c, and the time constant circuit 1044 is connected to the trigger diode 1043. The resistance value of the variable resistor 1044b is varied depending on the operation amount of an operation unit (user interface) 1047. The operation unit 1047 is used to operate the conduction time (ignition phase angle) of the triac 1042.

The resistor 1044a, the variable resistor 1044b, and the capacitor 1044c constitute a CR time constant circuit which charges the application voltage to the trigger diode 1043 in the positive half cycle (former half of the cycle) of the AC current, and the trigger diode 1043 is turned ON in accordance with the time constant determined by the resistance values and the capacitance value thereof.

FIG. 22 shows the time constant circuit which ignites the triac 1042 in the positive half cycle. However, the light control apparatus 1040 also includes a time constant circuit which ignites the triac 1042 in the negative half cycle. The light control apparatus 1040 may further include a hysteresis removing circuit which removes the hysteresis by removing the residual electric charge of the capacitor 1044c in the positive and negative half cycles.

Figure 23:
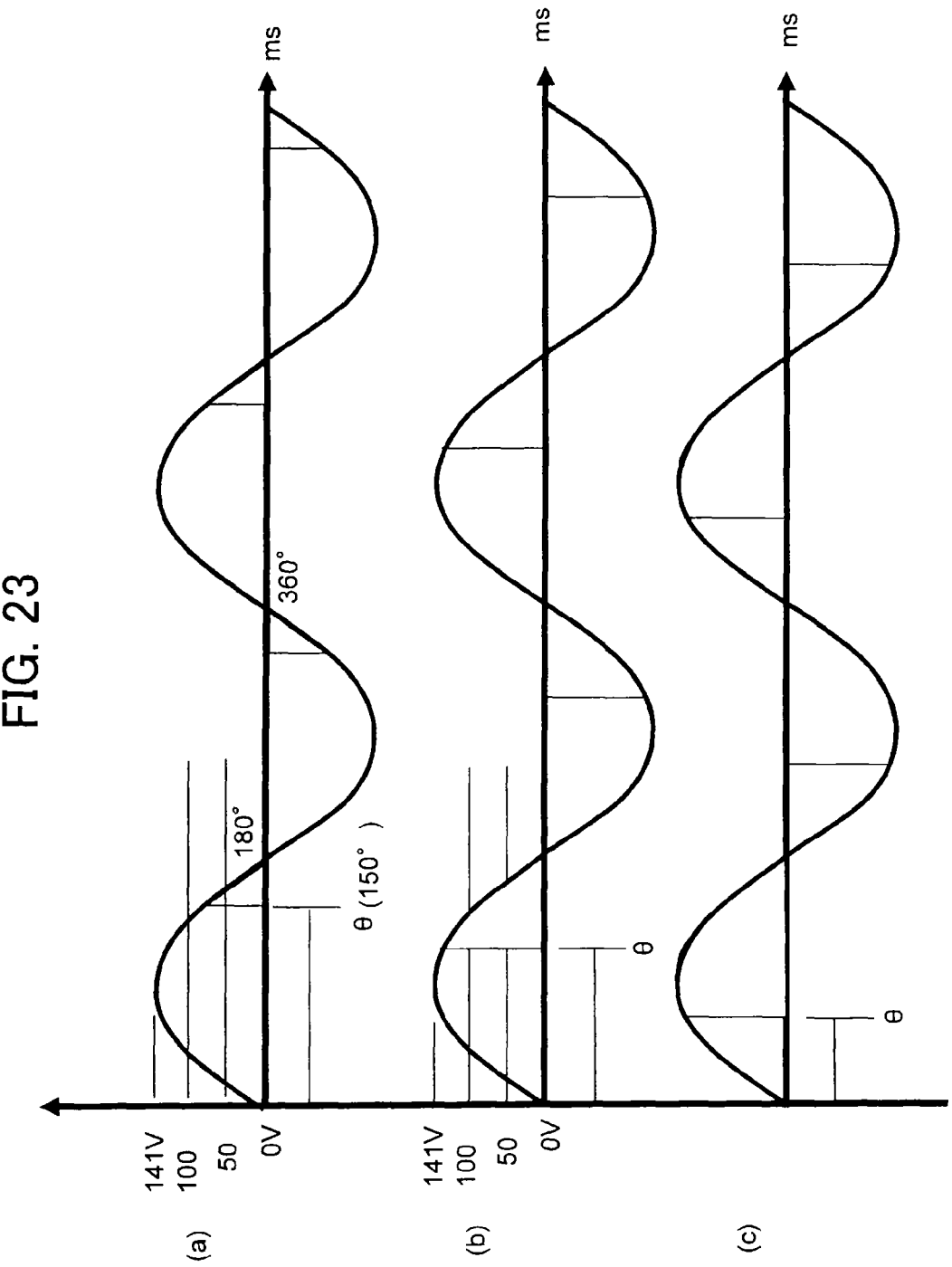
FIG. 23 shows the relationship between the AC shape of wave of a commercial power source applied to a light modulator and the AC voltage supplied to an LED illuminator by the ignition of a triac.

FIG. 23 shows the relationship between the AC wave shape of the commercial power source applied to the light control apparatus 1040 and the AC voltage supplied to the LED illumination instrument 1050 in accordance with the ignition of the triac 1042. As shown in FIG. 23 (a), the AC voltage of sine curve is applied from the commercial power source to the light control apparatus 1040. The positive charge is started with respect to the capacitor 1044c of the time constant circuit 1044 simultaneously with the start of the voltage application in the positive half cycle. The trigger diode 1043 supplies the trigger signal to the triac 1042 at the time at which the electric charge charged in the capacitor 1044c is in a predetermined amount. Accordingly, the triac 1042 is ignited at a predetermined angle θ in the positive half cycle to start the supply of the positive current to the LED illumination instrument 1050. The current supply is continued until the half cycle is completed. The same or equivalent operation is also performed in the negative half cycle.

In this way, the triac 1042 is ignited at the timing in accordance with the time constant of the time constant circuit 1044 in each of the positive and negative half cycles to supply the AC electric power to the LED illumination instrument 1050. That is, the triac 1042 allows the AC current supplied from the commercial power source to be in conduction at the ignition time.

The time constant is changed depending on the resistance value of the variable resistor 1044b. That is, the smaller the resistance value of the variable resistor 1044b is, the smaller the time constant is, wherein the timing, at which the triac 1042 is ignited, is advanced (see (b) and (c) in FIG. 23). The ignition phase angle (conduction time) of the triac 1042 can be made variable by changing the resistance value of the variable resistor 1044b in accordance with the operation of the operation unit 1047 as described above.

With reference to FIG. 22, the LED illumination instrument 1050 is provided with a microcomputer 1100 and an ignition phase angle detection circuit 1090 to function as an analyzing unit, and a driving unit (driving circuit) 1080 for an LED module 1060. The driving unit 1080 includes the LED module 1060 as the driving object. The LED module 1060 includes an LED group 1060a and an LED group 1060b which are arranged in parallel in the forward direction. Each of the LED group 1060a and the LED group 1060b is composed of a plurality of LED elements which are connected in series.

The ignition phase angle detection circuit 1090 is provided with a rectifier circuit 1091 which converts, into the DC current, the AC current supplied in accordance with the control of the ignition phase angle of the triac 1042 of the light control apparatus 1040, a constant voltage source 1092 which generates the DC voltage for the operation of the microcomputer 1100 from the DC voltage outputted from the rectifier circuit 1091, and an angle detection circuit 1093 which detects the ignition phase angle of the triac 1042.

The microcomputer 1100 is provided with a memory (storage device) 1101, a mode judging unit 1102 which is provided as selecting means, a luminance adjusting unit 1103 which is provided as a luminance control unit, and a color temperature adjusting unit 1104 which is provided as a color temperature control unit. The memory 1101 stores the program to be executed by the processor (CPU (central processing unit)) included in the microcomputer 1100 and the data to be used when the program is executed. Further, the memory 1101 has a recording area for recording the hysteresis of the conduction time determined from the ignition phase angle.

The mode judging unit 1102 switches the control mode of the LED module 1060 between the light adjustment mode in which the luminance (light emission amount) of the LED module 1060 is adjusted and the color adjustment mode in which the chromaticity (color temperature) of the LED module 1060 is adjusted, by making reference to the hysteresis of the conduction time.

That is, the mode judging unit 1102 selects the light adjustment mode as the initial setting when the main power source switch 1041 is turned ON. The mode judging unit 1102 receives the ignition phase angle of each 1 cycle from the angle detection circuit 1093 to calculate the conduction time in the half cycle of the triac 1042 from the ignition phase angle. For example, the conduction time is determined as the difference C between the point in time A of the ignition start of the triac 1042 and the point in time B of the completion (voltage 0) of the half cycle.

The time per unit angle (for example, 1 degree) in the half cycle can be determined from the frequency of the AC current (50 Hz, 1 cycle: 20 ms in the embodiment). That is, the conduction time can be calculated as (180[°]−ignition angle [°])×(time per 1 degree=about 0.056 [ms]).

In the light adjustment mode, the mode judging unit 1102 gives the conduction time to the luminance adjusting unit 1103, and the mode judging unit 1102 records the conduction time in the memory 1101. Accordingly, the hysteresis of the conduction time in each 1 cycle is stored in the memory 1101.

The mode judging unit 1102 obtains or calculates the difference from the last record of the conduction time in the memory 1101 every time when the conduction time for 1 cycle is calculated (measured). If the difference is 0, the mode judging unit 1102 starts the time measurement by means of a timer. If the time, in which the difference is 0 (time in which the conduction time is unchanged), exceeds a predetermined time, the mode judging unit 1102 switches the control mode into the color adjustment mode (color adjustment mode is selected). On the other hand, if the difference is detected during a period in which the time, in which the difference is 0, does not exceed the predetermined time, then the mode judging unit 1102 completes the time measurement by the timer, and the mode judging unit 1102 maintains the selection of the light adjustment mode.

In the color adjustment mode, the mode judging unit 1102 measures the conduction time for each 1 cycle in the same manner as in the light adjustment mode. The conduction time is recorded in the memory 1101, and the difference between the conduction times of every one cycles is calculated. However, in the color adjustment mode, the conduction time for each 1 cycle is given to the color temperature adjusting unit 1104. If the difference between the conduction times is 0, the mode judging unit 1102 starts up the timer to measure the time period in which the difference in the conduction time is 0, in the same manner as in the color adjustment mode. If the time period, in which the difference in the conduction time is 0, exceeds a predetermined time, the mode judging unit 1102 switches the control mode into the light adjustment mode again (light adjustment mode is selected). However, if the difference is detected before the period, during which the difference maintain 0, exceed the predetermined time period then the mode judging unit 1102 completes the time measurement by the timer, and the mode judging unit 1102 maintains the selection of the color adjustment mode.

In this way, the mode judging unit 1102 monitors the conduction time, and the mode judging unit 1102 switches the control mode on condition that the time, in which the conduction time is unchanged, exceeds the predetermined time. The mode judging unit 1102 imparts the conduction time to one of the luminance adjusting unit 1103 and the color temperature adjusting unit 1104 depending on the selected mode. In the foregoing explanation, the mode judging unit 1102 supplies the conduction time for each 1 cycle to the luminance adjusting unit 1103 or the color temperature adjusting unit 1104. Alternatively, the mode judging unit 1102 may supply the conduction time once a plurality of cycles, if necessary.

The luminance adjusting unit 1103, which is provided as the luminance control unit, controls the constant current circuit 1081 which is provided as the light adjustment means included in the driving circuit 1080 so that the LED module 1060 emits the light at the luminance corresponding to the conduction time (ignition phase angle) supplied from the mode judging unit 1102. For example, the luminance adjusting unit 1103 has a map which indicates the correlation between the conduction time and the driving current, and the driving current, which corresponds to the conduction time, is determined from the map to control the constant current circuit 1081 so that the driving current as described above is supplied.

The correlation between the conduction time and the driving current indicated in the map can be set arbitrarily. The length of the conduction time and the magnitude of the driving current may be in a proportional relationship. Alternatively, the relationship between the length of the conduction time and the driving current may be nonlinear. For example, the driving current may be increased in a stepwise manner depending on the length of the conduction time. In short, it is appropriate that the driving current value is increased when the user operates the operation unit 1047 to raise the luminance, and the driving current value is lowered when the user operates the operation unit 1047 to lower the luminance. It is also allowable that the increase/decrease in the driving current as described above is not in a proportional relationship with respect to the conduction time (ignition phase angle).

The constant current circuit 1081 supplies the driving currents to the LED group 1060a (first LED (group)) and the LED group 1060b (second LED (group)), both constructing the LED module 1060 respectively. The magnitude of at the driving current values is predetermined with respect to the conduction time (ignition phase angle) under the control of the luminance adjusting unit 1103. The magnitude of driving currents supplied to the LED module 1060 is sum of the driving current $I_{lowk}$ supplied to the LED group 1060a and the driving current $I_{hik}$ supplied to the LED group 1060b. The constant current circuit 1081 increases/decreases the average values of the driving currents supplied to the LED groups 1060a, 1060b by increasing/decreasing the sum of the currents. Then, the luminance (light emission amount) of the LED module 1060 is controlled.

The color temperature adjusting unit 1104 as the color temperature control unit controls a balance circuit 1082 which is provided as the color adjustment means included in the driving circuit 1080 so that the LED module 1060 emits the light at the color temperature corresponding to the conduction time (ignition phase angle) in the color adjustment mode. The balance circuit 1082 includes a pulse width modulation (PMW) circuit, which adjusts the ratio between the driving current (average current) $I_{lowk}$ supplied to the LED group 1060a and the driving current (average current) $I_{hik}$ supplied to the LED group 1060b. In this arrangement, the color temperature adjusting unit 1104 has, for example, a map or a table which indicates the correlation between the conduction time and the driving current ratio. The balance circuit 1082 is controlled so that the driving current $I_{lowk}$ and the driving current $I_{hik}$ are supplied at a predetermined driving current ratio depending on the conduction time.

The mode judging unit 1102, the luminance adjusting unit 1103, and the color temperature adjusting unit 1104 can be constructed as the function realized by executing the program by the processor included in the microcomputer 1100.

In the foregoing explanation, the conduction time is determined from the ignition phase angle. However, it is not an essential requirement that the conduction time is determined and the hysteresis of the conduction time is recorded. That is, the hysteresis of the ignition phase angle may be recorded in place of the conduction time, and the LED module 1060 (LED groups 1060a, 1060b) may be subjected to the driving control by using the total value or the ratio of the driving currents depending on the ignition phase angle.

In the sixth embodiment, the LED module 1060 resides in the light emission diode group manufactured, for example, on a sapphire substrate, comprising the set of LED group 1060a and the LED group 1060b which are arranged in parallel in the same direction and each of which includes a plurality of (for example, twenty) LED elements connected in series.

Each of the LED elements included in the LED groups 1060a, 1060b respectively has a light emission wavelength of 410 nm, and the terminal voltage is 3.5 V when the forward direction current is applied. When twenty LED elements are connected in series, the maximum light amount is generated with a DC current at 70 V.

A fluorescent member, which emits the white color at about 3000 K when the fluorescent member is stimulated (excited) by the light having a light emission wavelength of 410 nm, is embedded or buried in each of the LED elements for constructing the LED group 1060a. On the other hand, a fluorescent member, which emits the white color at about 5000 K when the fluorescent member is stimulated (excited) by the light having a light emission wavelength of 410 nm, is embedded or buried in each of the LED elements for constructing the LED group 1060b. Therefore, the color temperature differs between the white light radiated by the light emission of the LED group 1060a and the white light radiated by the light emission of the LED group 1060b.

The numbers of the LED elements for constructing the LED groups 1060a, 1060b can be appropriately changed. One LED element is also available. It is appropriate that the LED groups 1060a, 1060b perform the light emission at the mutually different chromaticities (hues, color temperatures). The chromaticities, which can be adopted for the respective LED groups 1060a, 1060b, can be appropriately selected. It is not necessarily indispensable that the LED module 1060 should be based on the combination of the LED groups which emit the white lights having the different color temperatures. It is also allowable that the LED module 1060 is based on a combination of LED groups which emit different colors. As for the combination of different colors, it is possible to apply any desired combination of, for example, green and blue or yellow and red. It is conceived that such an LED illumination instrument may be utilized as a neon sign.

An explanation will be made in detail below about the operation of the operation unit 1047 and the luminance adjustment (light adjustment) and the color temperature adjustment (color adjustment) of the LED module 1060. The operation unit 1047 of the light control apparatus 1040 according to the sixth embodiment has a dial type knob (dial). However, the operation unit 1047 may have a slide bar in place of the dial type knob.

In the sixth embodiment, when the luminance (light emission amount) of the LED module 1060 is adjusted, then the knob of the operation unit 1047 is rotated leftwardly (counterclockwise) to brighten the light, or the knob is rotated rightwardly (clockwise) to darken the light. However, the setting as described above is provided as the setting aimed for the convenience of explanation. That is, in the case of the light control apparatus generally used at present, when the rotary type dial is rotated rightwardly in the clockwise direction, the conduction time is increased in the AC half cycle (for example, FIG. 23 (a)→FIG. 23 (b)). In this situation, the following setting is made. That is, when the illumination instrument (illuminator), which is connected to the light control apparatus, is a constant resistance load such as an incandescent bulb (lamp), then the electric power consumption is increased, and the luminance of the incandescent bulb is raised.

The information about the angle of rotation (operation amount) of the operation unit 1047 (dial) in the sixth embodiment is used to input the "information about the intention of the user", without being used to control the increase/decrease in the conduction time of the driving current with respect to the LED module 1060. Therefore, the operation amount of the operation unit 1047 does not directly relate to the increase/decrease in the electric power consumption and the increase/decrease in the luminance of the load.

The electric power consumption of the LED module 1060 in the sixth embodiment is determined by the judgment of the control circuit (microcomputer 1100) disposed on the side of the load independently from the ignition phase angle θ of the triac 1042, unlike the incandescent bulb load which can be approximated by a genuine resistor.

An explanation will be made about the driving control for the LED module 1060 in the sixth embodiment by using the triac 1042 with reference to FIG. 23. In the sixth embodiment, the luminance adjusting unit 1103, which is contained in the LED illumination instrument 1050, determines the constant current value supplied to the LED module 1060 irrelevant to whether the conduction time of the triac 1042 is long or short (irrelevant to the ignition phase angle) as shown in FIGS. 23 (a) to 23(c). Therefore, the LED module 1060 does not necessarily consume the electric power proportional to the instantaneous value of the AC voltage wave.

However, as shown in FIG. 23 (a), when the ignition timing of triac 1042 (ignition phase angle) is relatively delayed (conduction time is short), and the instantaneous value of the voltage wave is low, then the driving current is continuously supplied to the LED module 1060 after the electric power, which is required to turn ON the LED module 1060, is stored in the capacitor 1084 (condenser unit).

For example, in the example shown in FIG. 23 (a), the conduction period of time of triac 1042 is the period of time of 30 degrees ranging from the ignition phase angle θ=150° in the latter half of the positive half cycle to the phase angle θ=180°. The instantaneous value of the commercial sine wave AC current (100 V) in Japan, which is provided at the ignition phase angle of 150 degrees, is 70.7 V which is sufficient to turn ON the LED element (operation voltage: for example, 24 to 30 V).

However, the instantaneous voltage of the sine wave AC current is steeply decreased from the ignition phase angle 150 degrees to 180 degrees. Therefore, in the range between the phase angle of 150 degrees for supplying 70.7 V and to the phase angle of about 168 degrees for supplying 35 V that is the half 70.7 V at 150 degree, it is suitable for stable operation, as the driving circuit power source for the LED elements for constructing the LED module 1060. Within the above mentioned phase angle range from 150 degree to 168 degree, the capacitor of large capacitance, Capacitor 1084, is charged. Capacitor 1084 can supply enough power to LED's 1060 still in the phase angle range of 168 degree to 180 degree, in which the instantaneous voltage AC line shows from 35V to 0V.

As for the charging current for the capacitor 1084 required in the example described above, the electric power consumed during the period of time of 180 degrees, namely half cycle of AC current, is charged within the period of time of 18 degrees. Therefore, the charging current is about 10 times of the current consumed in the steady state. For example, in the case of the LED illumination instrument (illuminator) which consumes 30 W (watt), 0.3 Arms is provided at 100 Vrms (rms represents the effective value of the AC current) in view of the time average. However, the average current, which ranges from the phase angle of 150 degrees to the phase angle of 168 degrees, is approximately calculated to be about 3 [A] which is ten times the above. This value is an allowable current value. However, the charging current is approximately about 0.3 A in the range of the phase of 90 degrees±45 degrees in which the instantaneous voltage is greater than 100 volt.

When the power source of the LED module 1060 is constructed as described above, it is possible to determine the driving current of LED independently from the ignition phase angle of the triac 1042. As a result, the luminance of the LED module 1060 can be controlled on the basis of the intention of the user independently from the conduction angle of the triac 1042.

An existing light control apparatus for the incandescent bulb (lamp), which has the triac 1042 and the dial as the operation unit 1047, can be applied to the light control apparatus 1040 shown in FIG. 22. The ignition phase angle θ (see FIG. 3) of the triac 1042 can be adjusted to have an arbitrary value ranging from 0° to 180°, depending on the amount of rotation (operation amount) of the knob of the operation unit 1047.

In the sixth embodiment, in order to avoid any confusion of the explanation, the following definition is provided so that the numerical value of the position angle of the operation unit (dial) 1047 of the light control apparatus 1040 is coincident with the numerical value of the ignition phase angle in the AC current period.

That is, the dial is rotatable by 90° leftwardly and rightwardly (counterclockwise and clockwise) about the center of the position of twelve o'clock. The "position of three o'clock", which is the end point of the rotation of the dial in the clockwise direction, is referred to as "angle position 180 degrees", which is defined such that the ignition phase angle is 180 degrees and the ordinary electric power consumption is the minimum. Further, the "position of nine o'clock", which the end point of the rotation of the dial in the counterclockwise direction, is referred to as "angle position 0 degree", which is defined such that the ignition phase angle is 0 degree and the ordinary electric power consumption is the maximum. Further, in the following description, the operation, in which the luminance (light emission amount) of the LED module 1060 is adjusted, is referred to as "light adjustment", and the operation, in which the color temperature of the LED module 1060 is adjusted, is referred to as "color adjustment".

Figure 24:
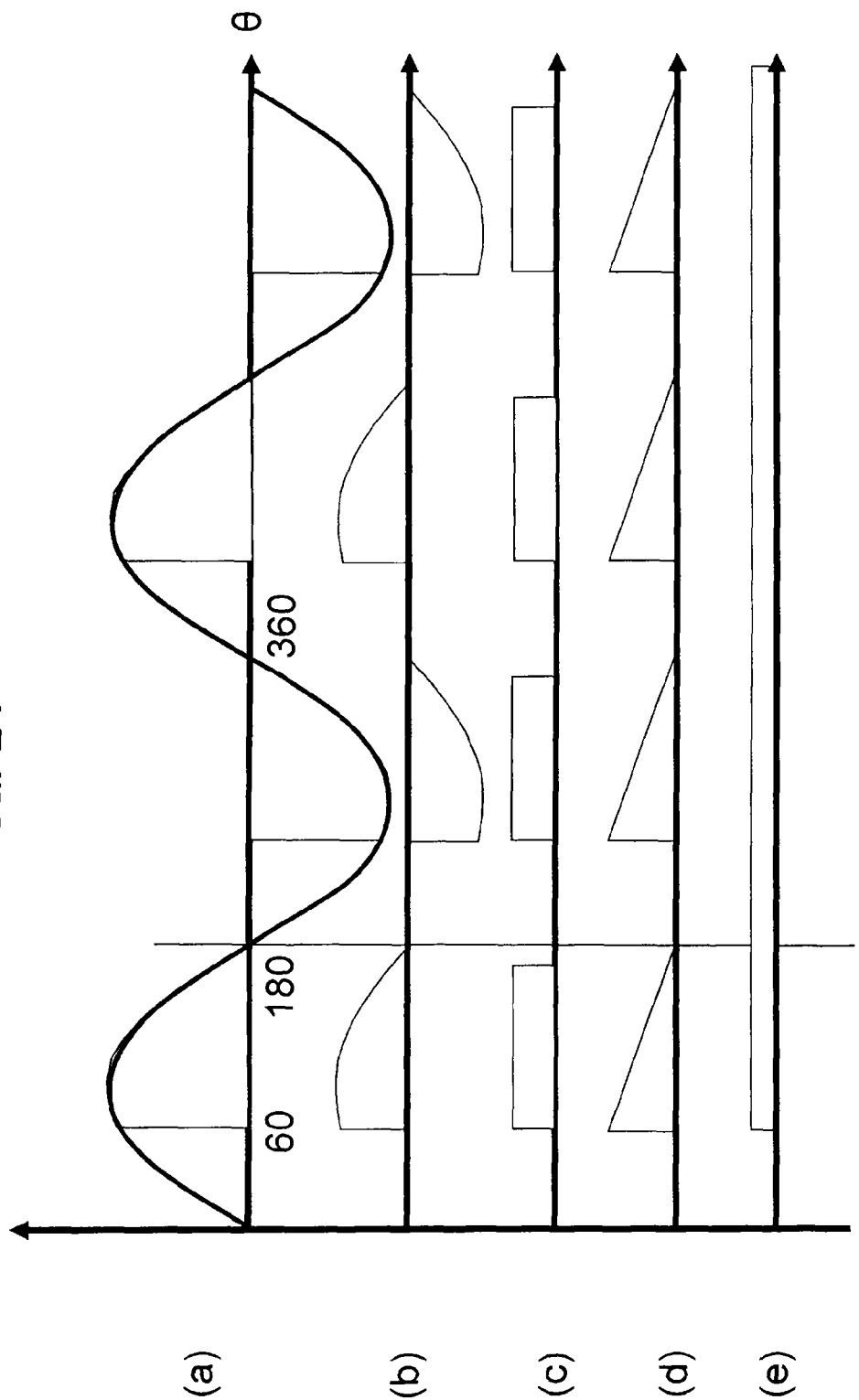
FIG. 24 illustrates the shape of waves of, for example, the AC voltage and the driving current during the light modulation.
Figure 25:
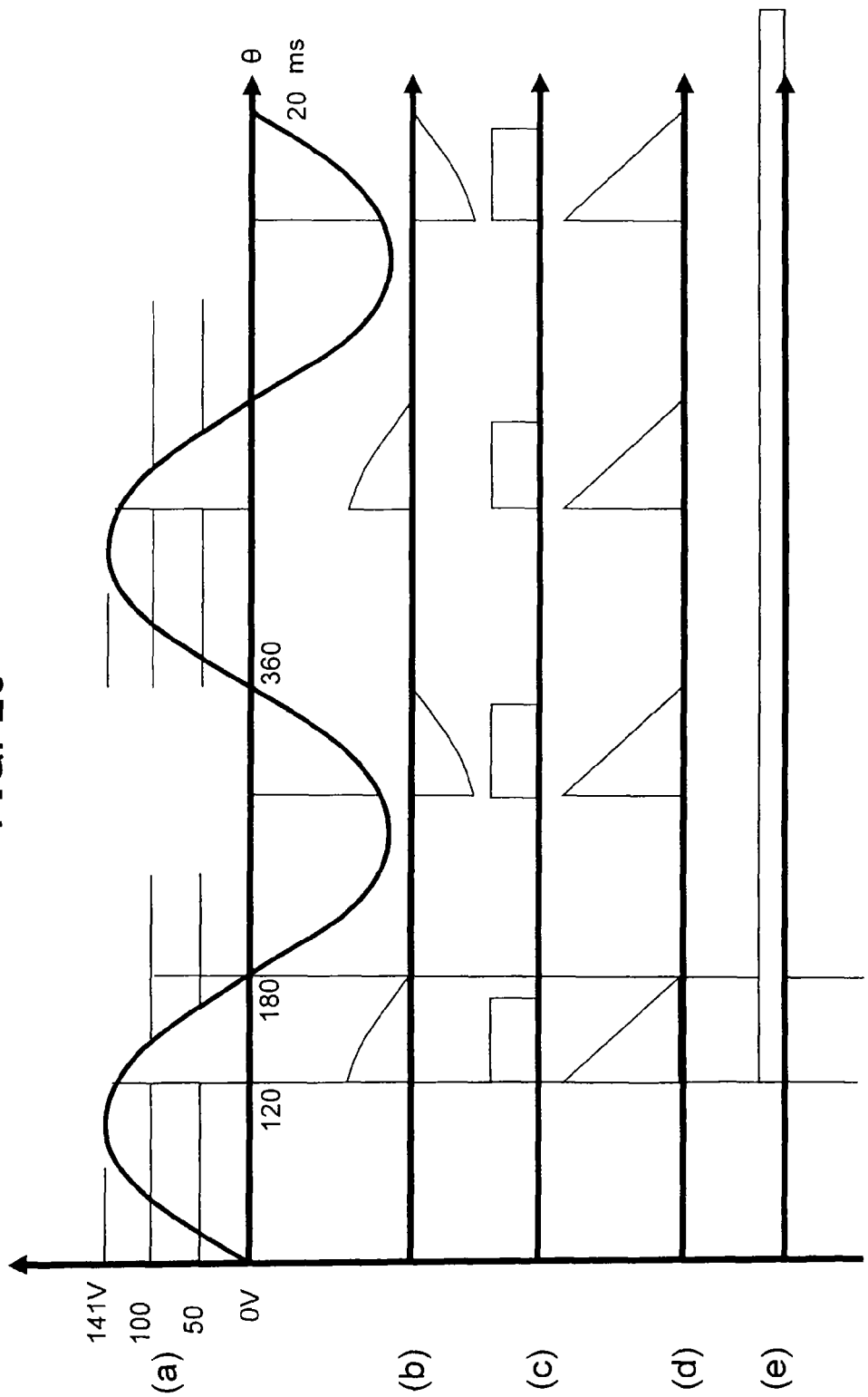
FIG. 25 illustrates the shape of waves of, for example, the AC voltage and the driving current during the color modulation.

Exemplary operations will be explained below, which are to be performed during the light adjustment and during the color adjustment of the LED module 1060. FIG. 24 illustrates the shape of waves of, for example, the AC voltage and the driving current during the light adjustment. FIG. 25 illustrates the shape of waves of, for example, the AC voltage and the driving current during the color adjustment.

The LED module 1060 is turned ON (subjected to the lighting) by closing (turning ON) the main power source switch 1041 (FIG. 22) by the user. The luminance and the color temperature of the LED module 1060 are not determined when the main power source is turned ON. However, for example, it is also possible to provide such an arrangement that the LED module 1060 is turned ON (subjected to the lighting) at a predetermined luminance and a predetermined color temperature in accordance with the initial setting of the microcomputer 1100.

The user intends that the luminance is changed to have a desired value in the first step, and the user rotates the operation unit 1047 (dial) leftwardly or rightwardly. The user rotates the dial while confirming the brightness by looking at the light coming from the LED module 1060. For example, when the user sets the dial to the position of eleven o'clock, as shown in FIG. 24 (a), a state is given, in which the ignition phase angle is fixed at 60°. In this stage, the LED module 1060 is subjected to the lighting at a luminance slightly brighter than the middle of the range of the adjustable luminance. If the user is satisfied by this luminance, then the user judges that any further dial operation is unnecessary, and the user releases the hand from the dial. This action is interpreted by the microcomputer 1100 as described later on as the representation of intention to complete the first step.

In the first step, the microcomputer 1100 executes the light adjustment operation program during the period until the user releases the hand from the operation unit 1047 after the main power source is turned ON, and the operation is performed in the first step. In this embodiment, the microcomputer 1100 performs the operation in accordance with the light adjustment operation program as the initial state of the microcomputer 1100 brought about by the application (turning ON) of the main power source. That is, the microcomputer 1100 is operated in the light adjustment mode.

In accordance with the execution of the light adjustment operation program, the microcomputer 1100 momentarily measures the position of rotation of the dial, i.e., the ignition phase angle (conduction period) of the triac 1042. The microcomputer 1100 controls the constant current circuit 1091 in accordance with the measured ignition phase angle (conduction period) to increase/decrease the total value $(I_{lowk}+I_{hik})$ of the driving current $I_{lowk}$ supplied to the LED group 1060a for constructing the LED module 1060 and the driving current $I_{hik}$ supplied to the LED group 1060b. As a result, the luminance of the LED module 1060 is updated to have a desired value. The user momentarily adjusts the position of the angle of rotation of the dial of the operation unit 1047 while observing the brightness of the LED module 1060, and thus it is possible to allow the luminance to have a desired brightness.

After that, when the state, in which the ignition phase angle (conduction time) is not changed, is continued for a predetermined time (for example, 5 seconds) by releasing the hand from the operation unit 1047 by the user as described above, then the microcomputer 1100 completes the execution of the light adjustment operation program, and the microcomputer 1100 starts the execution of the color adjustment operation program. That is, the control mode is switched into the color adjustment mode.

It is assumed that the user determines the further change of the color temperature to a desired value in the second step. For example, the user rotates the operation unit 1047 (dial) leftwardly/rightwardly again from the position of eleven o'clock within the first stop time which is within 10 seconds and which is to be provided 5 seconds after the release of the hand from the operation unit 1047 in the first step. The user operates the dial while looking at the color temperature of the LED module 1060. When the desired color temperature is exhibited, the user releases the hand from the operation unit 1047 (dial) again. For example, it is assumed that the user releases the hand at the position of thirteen o'clock. In this case, as shown in FIG. 23 (b), the ignition phase angle of the AC current is fixed at 120°.

The microcomputer 1100 changes the ratio between the value of the driving current $I_{lowk}$ and the value of the driving current $I_{hik}$ without changing the luminance of the LED module 1060. Namely, the sum of $I_{lowk}$ and $I_{hik}$ of the LED driving currents, $(I_{lowk}+I_{hik})$, is maintain constant during the execution of the color adjustment operation program, i.e., in the color adjustment mode. Accordingly, the color temperature of the LED module 1060 is changed. In the case that the time in which the dial is not operated, i.e., the time period in which the ignition phase angle (conduction time) is not changed, the microcomputer 1100 starts the time measurement by the timer. If any change of the operation (conduction time) is not detected before the elapse of a predetermined time (for example, 5 seconds), then it is judged that the color adjustment operation by the user is completed, and the control mode is returned to the light adjustment mode in the state in which the ratio between the driving currents $I_{lowk}$ and $I_{hik}$ is fixed. On the other hand, when the operation starts again, i.e., the change of the conduction time is detected before the timer measures the predetermined time, then the microcomputer 1100 completes the time measurement by the timer, and the color adjustment mode is maintained.

The microcomputer 1100 can continue the time measurement by the timer if the timer measures the predetermined time (5 seconds) in the light adjustment mode, and the control mode is switched from the light adjustment mode to the color adjustment mode. If a predetermined time elapses from the mode change, for example, if the timer measures 10 seconds after the starting the measurement of time, then it is judged that the user has no intention of the color adjustment. In this case, the microcomputer 1100 changes the control mode into the light adjustment mode without changing the ratio between the values of the driving currents $I_{lowk}$ and $I_{hik}$.

The LED illumination instrument 1050 (LED module 1060), which is the load for the light control apparatus 1040 as the triac light modulator, is operated in accordance with the exemplary operation as described above. Therefore, the rule, which should be learned by the user before when the user utilizes the LED illumination system based on the use of the light control apparatus 1040 and the LED illumination instrument 1050, is the following simple rule. That is, the present control mode (one of the light adjustment mode and the color adjustment mode) is continued on condition that the operation of the operation unit 1047 is continued at an interval within 5 seconds. The control mode is altered the dial operation is halted (stopped) for not less than 5 seconds.

The numerical value of 5 seconds described above is the value which can be changed depending on, for example, the socially accepted idea or common sense, the age bracket or age group, and the social rank or status of the user. That is, the numerical value can be set in conformity with the preference of the market. According to an experiment carried out by the present inventors, such knowledge has been obtained that the range, in which the user feels the convenience, is 4 seconds±2 seconds (2 to 6 seconds). The predetermined time, in which the ignition phase angle (conduction time) is not changed, can be appropriately set. It is also allowable to provide a user interface for changing the predetermined time set in the microcomputer 1100. In the exemplary operation described above, the explanation has been made about the case in which the same predetermined time of 5 seconds is used as the opportunity for the mode changing in both of the light adjustment mode and the color adjustment mode. However, it is also allowable that the length of the predetermined time differs between the light adjustment mode and the color adjustment mode.

The explanation has been made such that the microcomputer 1100 changes the color temperature while maintaining the constant luminance in the exemplary operation of the color adjustment mode described above. The operation in the color adjustment mode will be explained in detail below.

FIGS. 24 (*a*) and (*b*) show the relationship between the conduction voltage of the triac 1042 (light control apparatus 1040) and the driving current of the LED module 1060. The shape of wave shown in FIG. 24 (*b*) is the shape of current wave provided when the illumination instrument (illuminator) is a simple resistance load (for example, an incandescent bulb (lamp)). As appreciated from FIGS. 24 (*a*) and (*b*), it is well-known that the shape of voltage wave is similar to the shape of current wave.

On the other hand, FIG. 24 (*c*) shows the shape of current wave provided when the constant current driving load is used as in this embodiment. It is appreciated that the shape of current wave shown in FIG. 24 (*c*) is completely different from shape of the AC voltage wave shown in FIG. 24 (*a*). That is, in the LED illumination instrument 1050 which contains the constant current driving circuit (constant current circuit 1081), the substantially constant driving current is supplied to the load (LED module 1060) irrelevant to the time-dependent change of the voltage just after ignition to phase angle of 180.

Further, it is possible to design the rectifier circuit 1083 such that the capacitor 1084 is charged with the large charging current immediately after the ignition as indicated by the shape of the charging wave (triangular wave) shown in FIG. 24 (*d*), the DC voltage is maintained, and thus the driving current is continuously supplied to the LED module 1060 as the load as well after the completion of the AC phase of 180° (after the completion of the half cycle) as indicated by the driving current shape of wave shown in FIG. 24 (*e*). FIGS. 24 (*c*), (*d*), (*e*) show the shape of the current waves after the full-wave rectification by the rectifier circuit 1083.

As described above, the relatively large current, which charges the capacitor 1084, is supplied from the rectifier circuit 1083 immediately after the ignition of the triac 1042. Accordingly, it is possible to maintain the DC voltage as shown in FIG. 24 (*e*) irrelevant to the dial position (operation amount) of the light control apparatus 1040. Therefore, the LED module 1060 can be driven at the desired current value.

An explanation will be made with reference to FIG. 25 about the relationship between the operation of the light control apparatus 1040 and the load current consumed by the LED module 1060 in addition to the operation procedure ranging from the eleven o'clock position to the thirteen o'clock position as performed by the user as described above.

When the user rotates the operation unit 1047 (dial) of the light control apparatus 1040 in the clockwise direction, then the transition is caused to the state in which the ignition phase angle is 120 degrees as shown in FIG. 25 (*a*) from the state in which the ignition phase angle is 60 degrees as shown in FIG. 24 (*a*), and the conduction time is decreased. In this situation, if the illumination instrument is a simple resistance load such as the incandescent bulb (lamp), the current, which has the shape of wave proportional to the voltage as shown in FIG. 25 (*b*), is allowed to flow. However, in this embodiment, the current does not flow as in FIG. 25 (*b*). The current, which charges the capacitor 1084, is allowed to flow as shown in FIG. 25 (*d*), and the capacitor 1084 is charged with the current which has the magnitude that is approximately twice the magnitude of the current shown in FIG. 24 (*d*), immediately after the ignition. This situation is caused such that the voltage of the capacitor 1084 is gradually lowered by the current consumed by LED because the nonconduction period of the AC current is so long, and the difference in the electric potential between that of the AC power source and that of the capacitor 1084 becomes larger.

When the capacitance of the capacitor 1084 is large enough, even if the ignition phase angle is 120 degrees, and the conduction time is decreased, then the load current, which is substantially the direct current as shown in FIG. 25 (*e*), can be continuously supplied to the LED module 1060. FIGS. 25 (*c*), (*d*), (*e*) show the DC current shape of waves after the full-wave rectification by the rectifier circuit 1083.

Further, in the case of the LED illumination instrument of the incandescent bulb-interchangeable type in which it is difficult to utilize the capacitor 1084 having the large capacitance, the intermittent DC current as shown in FIG. 25 (*c*) is supplied to the LED module 1060. However, when the human eye cannot make any distinction from the lighting brought about by the continuous supply of the DC current as shown in FIG. 25 (*e*), it is also possible to apply the supply of the DC current as shown in FIG. 25 (*c*).

As described above, it is possible to secure the DC power source to be supplied to the LED module 1060 irrelevant to the dial position of the operation unit 1047 of the light control apparatus 1040. Therefore, the LED driving current $I_{lowk}$ for the low Kelvin temperature and the LED driving current $I_{hik}$ for the high Kelvin temperature can be adjusted as shown in FIGS. 26 (*a*) and (*b*).

Figure 26:
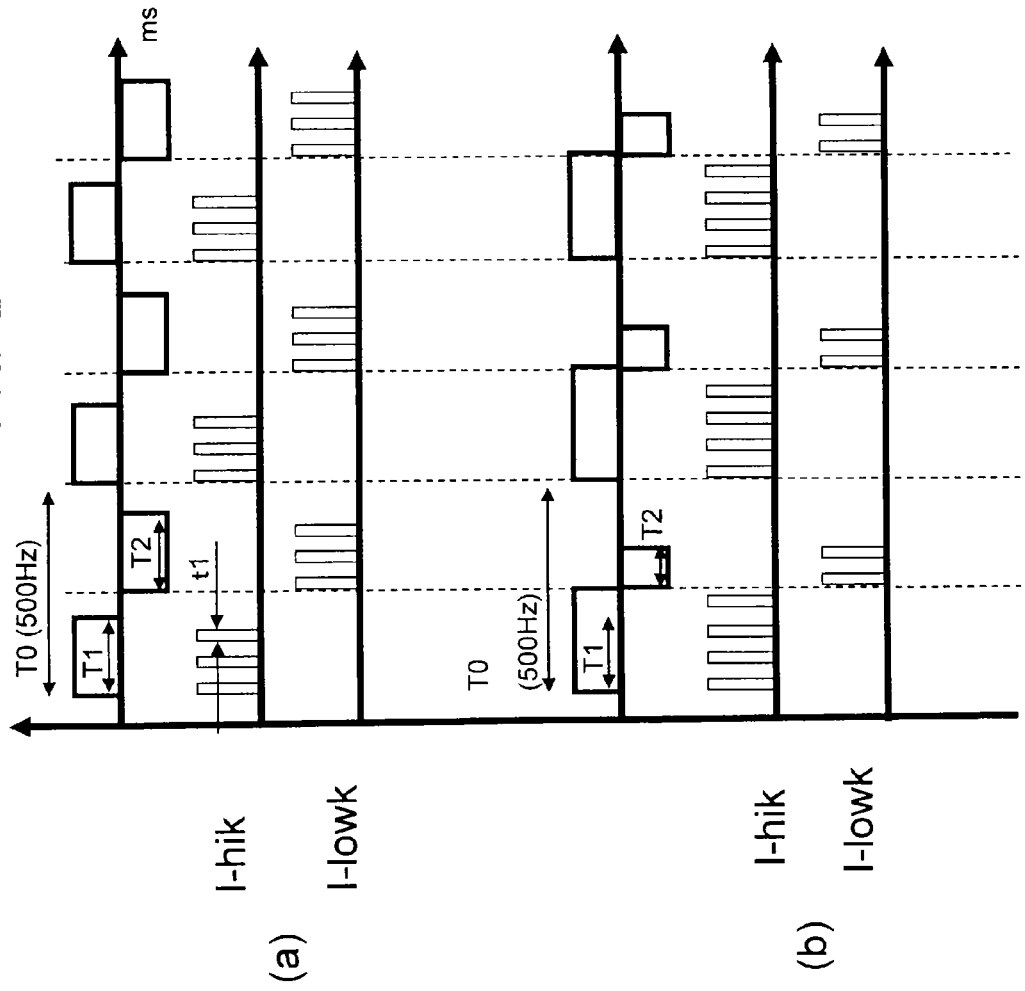
FIG. 26 shows the shape of waves illustrating the change of the driving current ratio in accordance with the balance adjustment.

That is, the driving currents, which are in the same amount, can be supplied as shown in FIG. 26 (*a*) in relation to the driving current $I_{lowk}$ and the driving current $I_{hik}$ upon the completion of the first step (light adjustment mode). On the other hand, for example, when the dial is moved to the position of thirteen o'clock in the color adjustment mode, as shown in FIG. 26 (*b*), the driving current $I_{hik}$ is increased, while the driving current $I_{lowk}$ is decreased. A bluish white color is provided as a whole. The operation as described above is realized by changing the ratio between the driving current $I_{hik}$ and the driving current $I_{lowk}$ by means of the PWM circuit contained in the balance circuit 1082.

As shown in FIGS. 26 (*a*) and (*b*), the pulse currents of the time t1 are supplied to the LED groups 60*a*, 60*b* at the time ratio determined by the balance circuit 1082 during the positive and negative 1 cycle periods of time of the AC current. In the example shown in FIG. 26 (*a*), the pulse currents of the same number (three) are supplied to the LED groups 1060*a*, 1060*b*. On the other hand, in the case of FIG. 26 (*b*), the four pulse currents are supplied to the LED group 1060*b*, while the two pulse currents are supplied to the LED group 1060*a*. In this way, the current ratio is changed, but the total number of the pulses is not changed. That is, the total value of the driving currents is constant. Therefore, it is possible to change the color temperature in the state in which the luminance is maintained.

In the sixth embodiment, it is possible to perform the light adjustment and the color adjustment for the LED illumination instrument 1050 by utilizing the existing wiring lines provided for the incandescent bulb and the existing triac light modulator (light control apparatus 1040). That is, the operation hysteresis of the operation unit 1047 (dial) of the light control apparatus 1040, i.e., the ignition phase angle (conduction time) of the triac is stored on the LED illumination instrument 1050, and thus the two control modes of the light adjustment mode and the color adjustment mode are realized. Accordingly, it is possible to realize the two functions of the light adjustment and the color adjustment by using the existing light control apparatus 1040 without carrying out any wiring construction work.

According to the sixth embodiment, the two types of control, i.e., the light adjustment and the color adjustment can be realized by one light control apparatus 1040. Therefore, it is possible to extremely easily introduce the LED illumination instrument which is capable of carrying out the light adjustment and the color adjustment, by changing the bulb or the light source disposed on the load to the LED illumination instrument 1050 without carrying out any exchange construction work for exchanging the light control apparatus.

Accordingly, the high performance can be realized by using the LED illumination instrument 1050 for the conventional illumination system in which the incandescent bulb or the fluorescent lamp has been used. Further, in the case of the white illumination, it is possible to realize the color representation performance which is more approximate to the spectrum of the sunrays or solar rays. According to the LED illumination instrument 1050, the color temperature can be varied continuously in a wide range ranging from the daylight color to the incandescent bulb color by using one LED illumination instrument.

The sixth embodiment is illustrative of the exemplary arrangement in which the conduction time is measured on the basis of the ignition phase angle, and the hysteresis of the conduction time is recorded in the memory 1101. In place of this arrangement, it is also appropriate that the ignition phase angle is simply detected for every predetermined cycle (for example, 1 cycle) without measuring the conduction time, and the hysteresis of the ignition phase angle is recorded in the memory 1101. The explanation has been made such that the hysteresis of the ignition phase angle (conduction time) is recorded in the memory 1101. However, it is appropriate that at least the lastly detected ignition phase angle (conduction time) is recorded in the memory 1101.

Seventh Embodiment

Next, a seventh embodiment of the present invention will be explained. The seventh embodiment is constructed in the same manner as the sixth embodiment. Therefore, different points or features will be principally explained. The arrangement, which is the same as or equivalent to that of the sixth embodiment, is omitted from the explanation.

In the seventh embodiment, the high convenience is realized by realizing the two functions of the light adjustment and the color adjustment by exchanging the existing triac light modulator (light control apparatus 1040) with a novel light control apparatus unlike the sixth embodiment.

Figure 27:
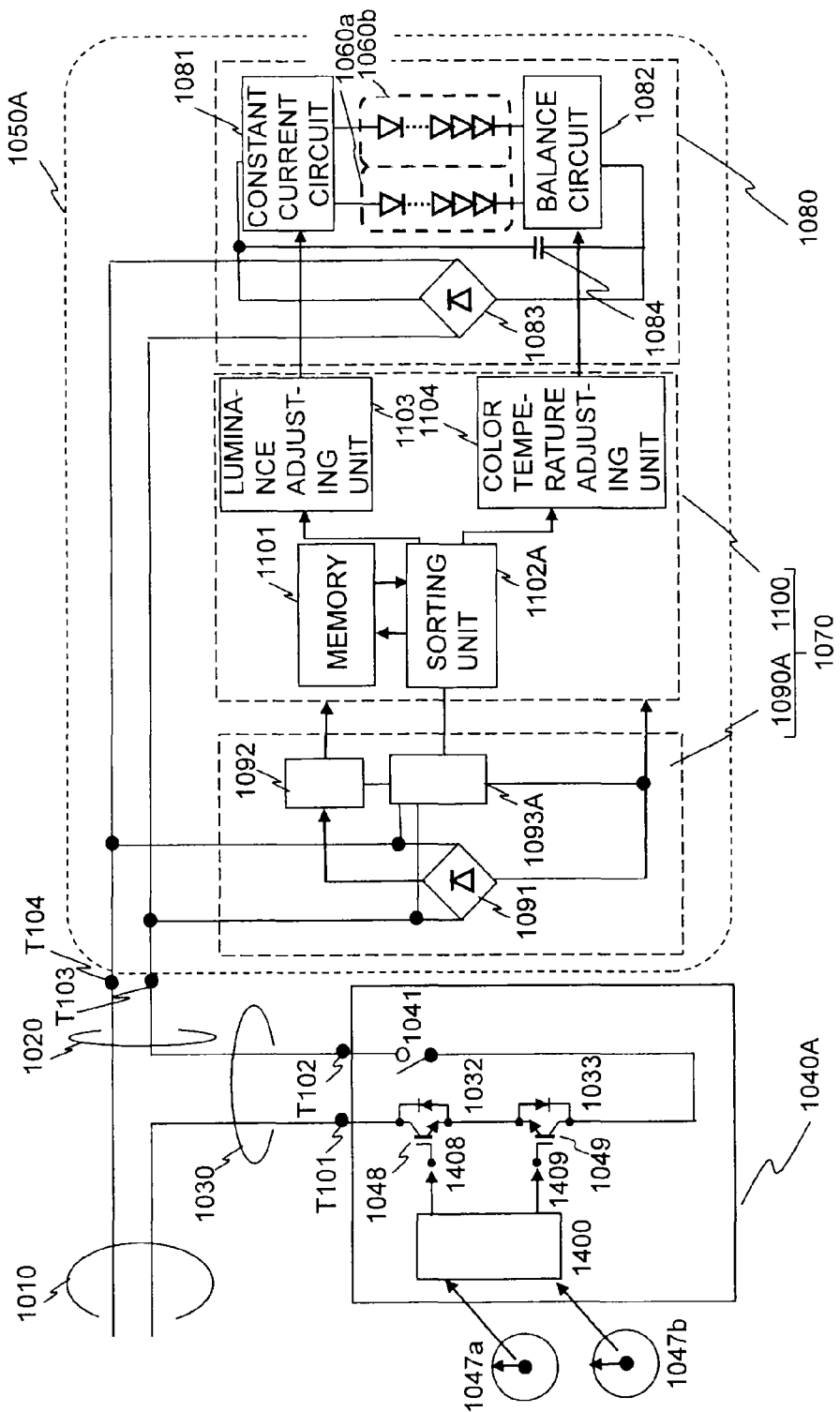
FIG. 27 shows an exemplary circuit arrangement of an illumination system according to a seventh embodiment.

FIG. 27 shows an exemplary circuit arrangement of an LED illumination system according to the seventh embodiment. The LED illumination system comprises a light control apparatus 1040A and an LED illumination instrument 1050A. The existing wiring lines (bus lines 1010, power supply lines 1020, and lead-out lines 1030), which are the same as or equivalent to those of the sixth embodiment, are also utilized in the seventh embodiment.

In the seventh embodiment, the light control apparatus 1040A is applied, which has two or more operation units including an operation unit for the light adjustment and an operation unit for the color adjustment. Accordingly, it is possible to provide the LED illumination system in which the convenience is improved as compared with the sixth embodiment.

The light control apparatus 1040A is provided with a pair of IGBT's (insulated gate bipolar transistors) as first and second shaping units. IGBT can switch on and off the high voltage output with the low voltage input signal. IGBT is a discrete bipolar transistor. Therefore, as shown in FIG. 27, two IGBT's 1048, 1049 are connected in series while providing the opposite polarities. IGBT's 1048, 1049 are provided with diodes 1032, 1033 respectively.

The light control apparatus 1040A is provided with the operation unit 1047*a* for the light adjustment (first user interface) and the operation unit 1047*b* for the color adjustment (second user interface). Each of the operation unit 1047*a* and the operation unit 1047*b* has a dial (knob) for adjusting each of the luminance and the color temperature. The signal, which indicates the operation amount of each of the operation units 1047*a*, 1047*b*, is imparted to a logic circuit 1400.

The logic circuit 1400 includes two rotary encoders (not shown) for detecting the respective operation amounts (angles of rotation of the dials) of the operation units 1047*a*, 1047*b* respectively. The logic circuit 1400 supplies the signals 1408, 1409 to the gates of IGBT's 1048, 1049 at the timing corresponding to the dial position of the operation unit 1047*a* (detection position of the rotary encoder). The signal 1408 is the current in the opposite direction to stop the current between the collector and the emitter for a predetermined period of time. The output timing of the signals 1408, 1409 depends on the dial position of the operation unit 1047*a*. When the signals 1408, 1409 are supplied to the gates of the IGBT's 1048, 1049, it is possible to stop the conduction of the current (current allowed to flow in the positive half cycle of the AC current from the commercial power source) allowed to flow between the collector and the emitter of IGBT's 1048, 1049 for a predetermined period of time (for example, 1 ms).

Figure 28:
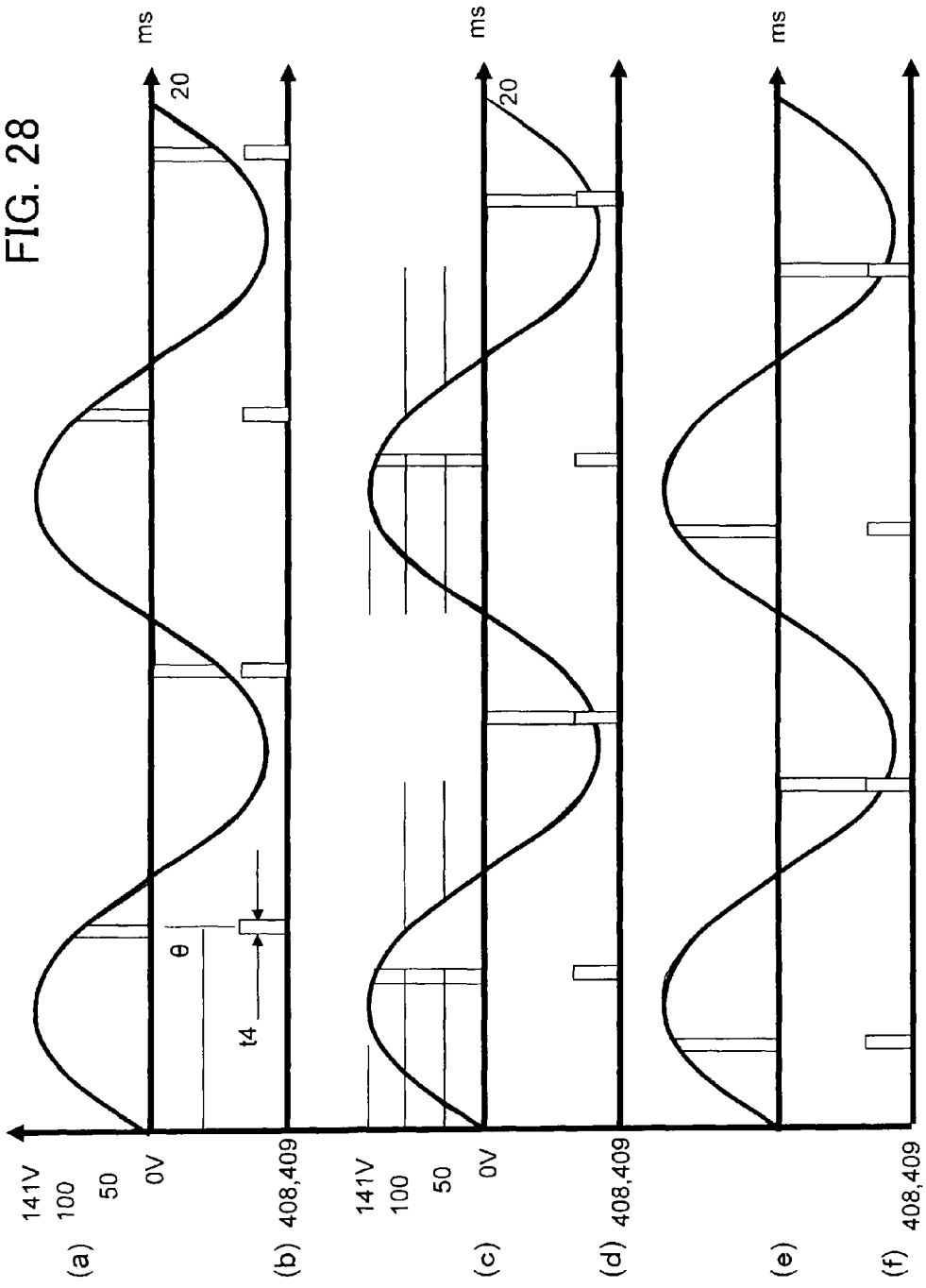
FIG. 28 shows the relationship between the operation amount of an operation unit and the shape of AC wave.

FIG. 28 shows the relationship between the operation amount of the operation unit 1047*a* and the shape of AC wave. As shown in FIG. 28 (*a*), the pulse signals (signals 1408, 1409), which correspond to the operation amount of the operation unit 1047*a* as shown in FIG. 28 (*b*), are generated in the respective positive and negative half cycles of the AC current, and the pulse signals are imparted to the gates of IGBT's 1048, 1049. Accordingly, the AC current is shut off (discontinued) for a predetermined period of time t4 (for example, 1 ms) in each of the positive and negative half cycles.

Accordingly, the positive and negative half cycles of the AC voltage supplied from the commercial power source have the shape of waves in such a state that the positive and negative half cycles are shut off for the predetermined period of time t4 at the shutoff timings in accordance with the output timings of the signals 1408, 1409 corresponding to the operation amount of the operation unit 1047a. The AC voltage, which has the wave shape as described above, is supplied to the LED illumination instrument 1050A. The predetermined period of time t4 is the short time such as 1 ms as compared with the period of time of the half cycle (10 ms, in the case of 50 Hz). Therefore, it is possible to consider that the AC voltage is substantially a sine wave.

The shutoff timing, which is based on the pulse signal (signal 1408) in the positive/negative half cycle of the AC voltage, depends on the amount of rotation (operation amount) of the dial of the operation unit 1047a, i.e., the control amount of the luminance. As shown in FIGS. 28 (c) and FIG. 28 (e), as the operation amount of the dial is increased in the direction in which the luminance is increased, the output timing of the signal 1408, 1409 is advanced, and the shutoff timing is advanced in the positive/negative half cycle of the AC current. Accordingly, the wave shape of the positive and negative half cycles of the AC voltage, which are supplied to the LED illumination instrument 1050A, can be in such a state that the control signal for adjusting the luminance is embedded or buried (added) therein (thereto).

Further, the logic circuit 1400 supplies the signal 1409 corresponding to the dial position of the operation unit 1047b to the gate of IGBT 1049. The current, which is allowed to flow between the collector and the emitter of IGBT 1049 in the negative half cycle of the AC current from the commercial power source, can be subjected to the conduction stop (shutoff) for a predetermined time (for example, 1 ms) in accordance with the supply of the signal 1409.

Figure 29:
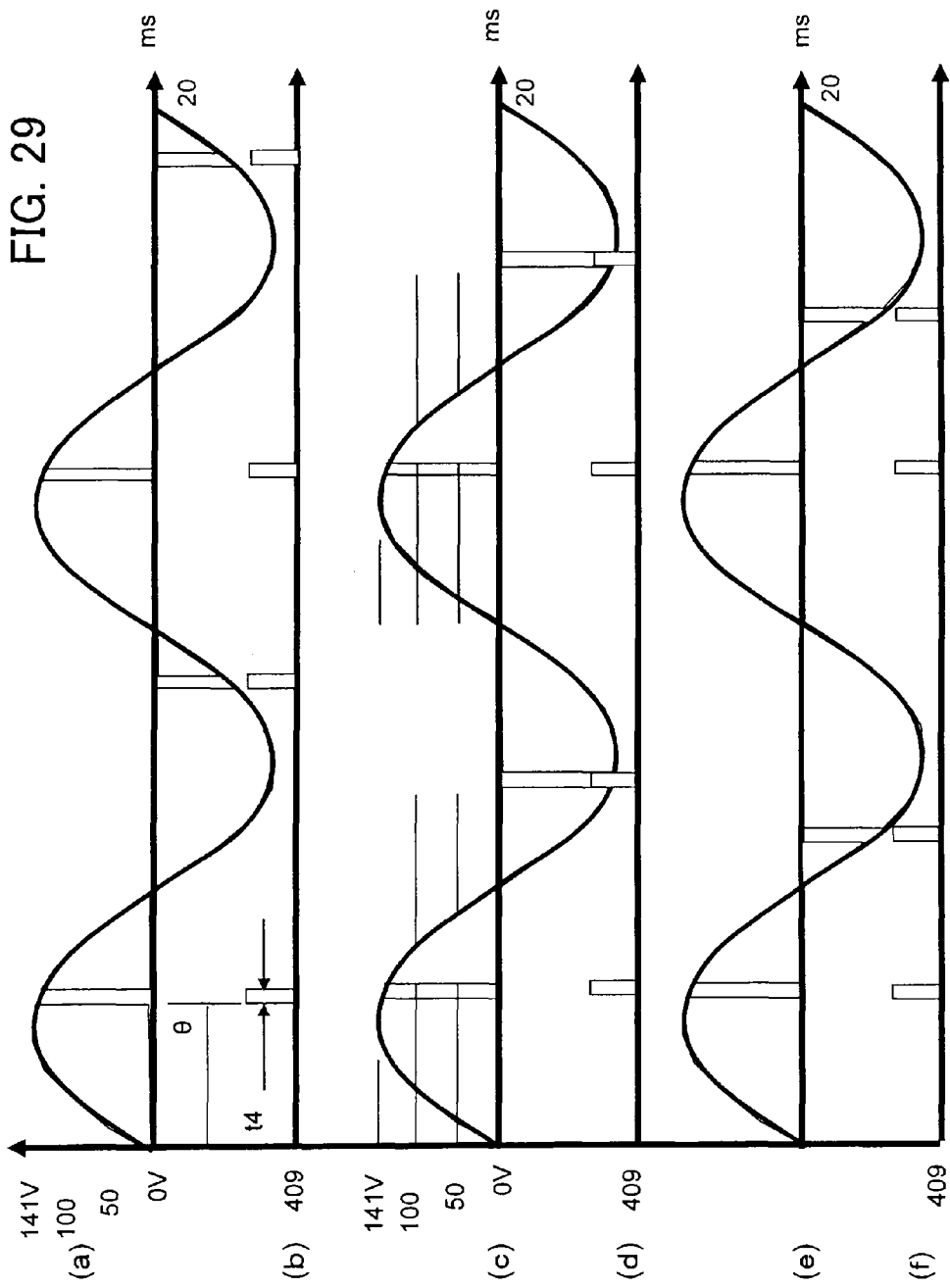
FIG. 29 shows the relationship between the operation amount of an operation unit and the shape of AC wave.

FIG. 29 shows the relationship between the operation amount of the operation unit 1047b and the shape of AC wave. As shown in FIG. 29 (a), the pulse signal (signal 1409) as shown in FIG. 29 (b) is generated in the negative half cycle of the AC current, and the signal is imparted to the gate of IGBT 1049. Accordingly, the AC current is shut off (discontinued) for a predetermined period of time t4 (for example, 1 ms) in the negative half cycle.

Accordingly, the negative half cycle of the AC voltage supplied from the commercial power source has the shape of wave in such a state that the negative half cycle is shut off (discontinued) for the predetermined period of time t4 at the shutoff timing corresponding to the output timing of the signal 1409. The AC voltage, which has the shape of wave as described above, is supplied to the LED illumination instrument 1050A. The predetermined period of time t4 is the short time such as 1 ms as compared with the half cycle period of time (10 ms, in the case of 50 Hz). Therefore, it is possible to consider that the AC voltage is substantially a sine wave.

The shutoff timing, which is based on the pulse signal (signal 1409) in the negative half cycle of the AC voltage, depends on the amount of rotation of the knob of the operation unit 1047b, i.e., the control amount of the color temperature. As shown in FIGS. 29 (c) and FIG. 29 (d), as the operation amount of the knob is increased in the direction in which the color temperature is lowered, the output timing of the signal 1409 is advanced, and the shutoff timing is advanced in the negative half cycle of the AC current. Accordingly, the wave shape of the negative half cycle of the AC voltage, which is supplied to the LED illumination instrument 1050A, can be in such a state that the control signal for adjusting the color temperature is embedded or buried (added) therein (thereto).

As described above, when the operation unit 1047a is operated, then the signals 1408, 1409 are generated, and thus the shutoff positions (shutoff phase angles) are varied in the positive and negative half cycles. On the other hand, when the operation unit 1047b is operated, then only the signal 1409 is generated, and only the shutoff position (shutoff angle) is varied in the negative half cycle, for the following reason. That is, it is judged on the side of the control device that the control signal for the light adjustment is provided when the positive and negative shutoff positions are simultaneously varied, while it is judged that the control signal for the color adjustment is provided when only the negative shutoff position is varied. However, it is also allowable that the operation unit 1047a is used as the operation unit for the color adjustment, and the operation unit 1047b is used as the operation unit for the light adjustment. Alternatively, it is also allowable that only the signal 1408 is generated in accordance with the operation of the operation unit 1047b, and only the shutoff position in the positive half cycle is varied.

The LED illumination instrument 1050A includes a shutoff angle detection circuit 1090A. The detection circuit 1090A is provided with a rectifier circuit 1091 which converts the AC current supplied from the side of the light control apparatus 1040A into the DC current, a constant voltage source 1092 which generates the operating DC voltage for operating the microcomputer 1100 from the DC voltage outputted from the rectifier circuit 1091, and an angle detection circuit 1093A which detects the shutoff timings in the positive and negative half cycles of the AC current.

The angle detecting unit 1093A detects the shutoff phase angles θ in the positive and negative half cycles respectively, and the shutoff phase angles θ are delivered to a sorting unit 1102A (including judging unit) of the microcomputer 1100. The sorting unit 1102A records the shutoff phase angles θ in the positive and negative half cycles respectively as the hysteresis information in the memory 1101. In this procedure, when the sorting unit 1102A detects the positive and negative shutoff phase angles θ in 1 cycle, the sorting unit 1102A compares the respective shutoff phase angles θ with the positive and negative shutoff phase angles θ lastly recorded in the memory 1101. In this procedure, if both of the positive and negative shutoff phase angles θ are varied (any difference is provided), the sorting unit 1102A feeds the detected shutoff phase angles θ to the luminance adjusting unit 1103 on the basis of the judgment that the light adjustment operation is carried out.

On the other hand, if only the negative shutoff phase angle θ is varied in the comparison of the shutoff phase angles θ, the sorting unit 1102A feeds the detected shutoff phase angle θ to the color temperature adjusting unit 1104 on the basis of the judgment that the color adjustment operation is carried out.

The luminance adjusting unit 1103, the color temperature adjusting unit 1104, and the LED module 1060 are constructed in approximately the same manner as in the sixth embodiment. That is, the luminance adjusting unit 1103 controls the supply of the driving current by the constant current circuit 1081 so that the LED module 1060 emits the light at the luminance corresponding to the shutoff phase angle θ. That is, the luminance adjusting unit 1103 controls the constant current circuit 1081 so that the driving current, which is predetermined depending on the shutoff phase angle θ, is supplied to the LED module 1060.

For example, when the AC voltage wave shape supplied to the LED illumination instrument 1050A is as shown in FIG. 28 (a), the luminance adjusting unit 1103 interprets that the user desires the light emission of the LED module 1060 at the low luminance, because the shutoff phase angle θ is positioned at the latter half of the positive (negative) half cycle. Assuming that the interpretation as described above is affirmed, the luminance adjusting unit 1103 controls the constant current circuit 1081 so that the driving current is supplied with the relatively small driving current value which is predetermined with respect to the shutoff phase angle θ.

Further, when the shape of the AC voltage wave is as shown in FIG. 28 (c), the luminance adjusting unit 1103 interprets that the user desires the light emission of the LED module 1060 at the middle or intermediate luminance, because the shutoff phase angle θ is positioned at the middle of the positive (negative) half cycle. Assuming that the interpretation as described above is affirmed, the luminance adjusting unit 1103 controls the constant current circuit 1081 so that the driving current is supplied with the relatively middle or intermediate driving current value which is predetermined with respect to the shutoff phase angle θ.

Further, when the shape of the AC voltage wave is as shown in FIG. 28 (e), the luminance adjusting unit 1103 interprets that the user desires the light emission of the LED module 1060 at the high luminance, because the shutoff phase angle θ is positioned at the former half of the positive (negative) half cycle. Assuming that the interpretation as described above is affirmed, the luminance adjusting unit 1103 controls the constant current circuit 1081 so that the driving current is supplied with the relatively high driving current value which is predetermined with respect to the shutoff phase angle θ. However, the foregoing example does not show that the luminance is controlled at the three stages. The luminance can be controlled at two or more stages corresponding to the value of the shutoff phase angle θ.

The color temperature adjusting unit 1104 controls the operation of the balance circuit 1082 so that the LED module 1060 emits the light at the color temperature corresponding to the negative shutoff phase angle θ. That is, the driving currents are supplied to the LED group 1060a (low color temperature LED (LED for the low Kelvin temperature)) and the LED group 1060b (high color temperature LED (LED for high Kelvin temperature)) for constructing the LED module 1060 respectively at the driving current ratio corresponding to the negative shutoff phase angle θ.

For example, when the shape of the AC voltage wave supplied to the LED illumination instrument 1050A is as shown in FIG. 29 (a), the shutoff phase angle θ is positioned at the latter half of the negative half cycle. In this case, assuming that the user desires the light emission of the LED module 1060 at the high color temperature, the color temperature adjusting unit 1104 controls the balance circuit 1082 so that the driving currents are supplied to the LED groups 1060a, 1060b at the balance (ratio) predetermined with respect to the shutoff phase angle θ.

Further, when the shape of the AC voltage wave supplied to the LED illumination instrument 1050A is as shown in FIG. 29 (c), the shutoff phase angle θ is positioned at the middle of the negative half cycle. In this case, assuming that the user desires the light emission of the LED module 1060 at the middle or intermediate color temperature, the color temperature adjusting unit 1104 controls the balance circuit 1082 so that the driving currents are supplied to the LED groups 1060a, 1060b at the balance (ratio) predetermined with respect to the shutoff phase angle θ.

Further, when the shape of the AC voltage wave is as shown in FIG. 29 (e), the shutoff phase angle θ is positioned at the former half of the negative half cycle. In this case, assuming that the user desires the light emission of the LED module 1060 at the low color temperature, the color temperature adjusting unit 1104 controls the balance circuit 1082 so that the driving currents are supplied to the LED groups 1060a, 1060b at the balance (ratio) predetermined with respect to the shutoff phase angle θ. However, the foregoing example does not show that the color temperature is controlled at the three stages. The color temperature can be controlled at two or more stages corresponding to the value of the shutoff phase angle θ.

The shutoff phase angles θ in the positive and negative half cycles, which are based on the signals 1408, 1409, are recorded in the memory 1101. Therefore, if the shutoff phase angle θ is not detected by the angle detection circuit 1093, the sorting unit 1102A supplies the positive and negative shutoff phase angles θ lastly recorded in the memory 1101 to the luminance adjusting unit 1103 and the color temperature adjusting unit 1104. Accordingly, even if the time t4 is 0, i.e., even if the shutoff time of t4 is extinguished, then the luminance and the color temperature are maintained.

According to the seventh embodiment, the light control apparatus 1040A has the operation unit 1047a for adjusting the luminance and the operation unit 1047b for adjusting the color temperature. Accordingly, the user can carry out the light adjustment operation and the color adjustment operation independently from each other. Therefore, it is possible to provide the LED illumination system in which the operability is improved as compared with the sixth embodiment.

The existing wiring equipment is also used in the seventh embodiment. Therefore, it is possible to avoid any large-scale wiring construction work which would be otherwise required to introduce the LED illumination instrument 1050A. It is possible to reduce the initial cost upon the introduction of the LED illumination instrument 1050A.

Eighth Embodiment

Figure 30:
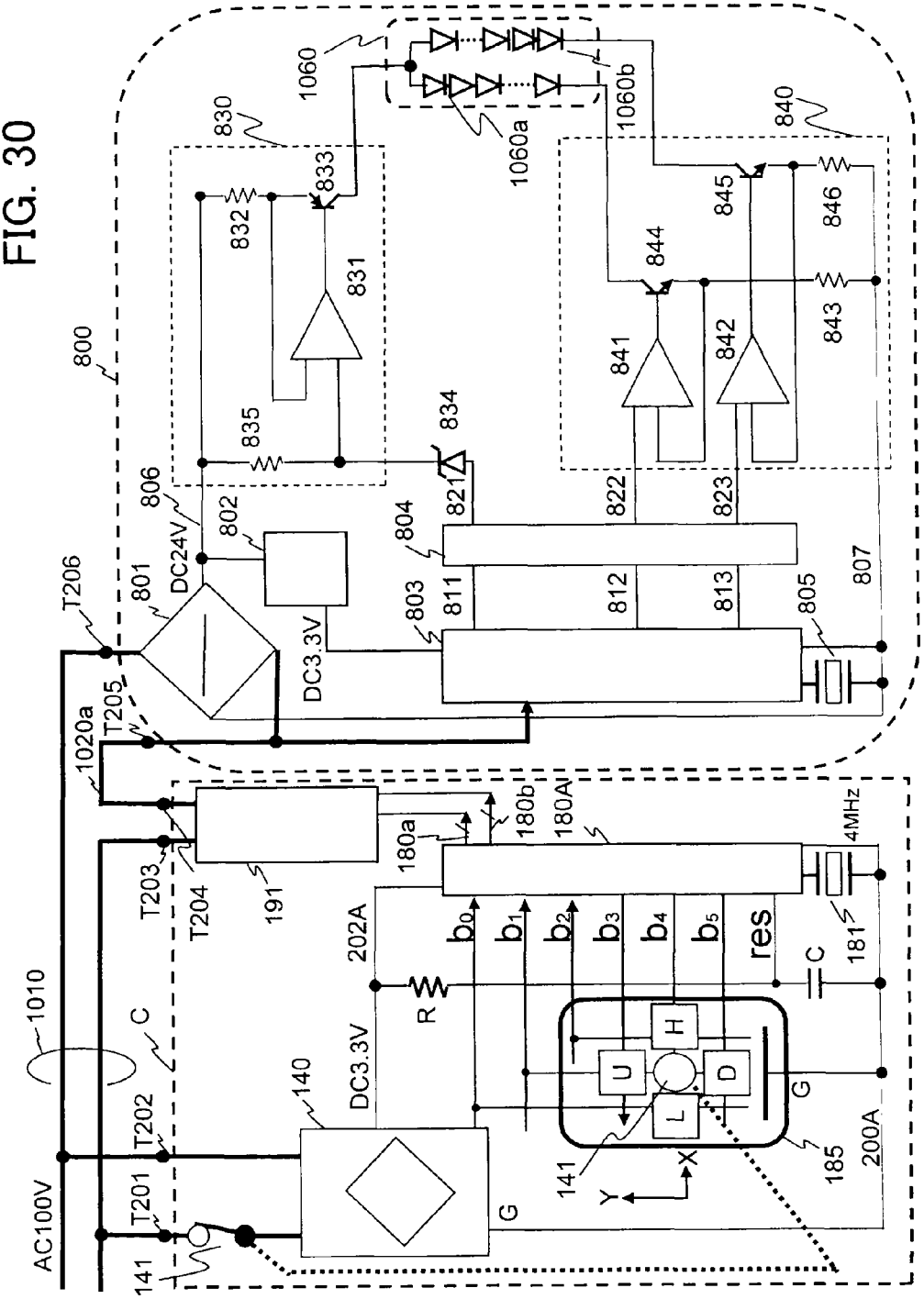
FIG. 30 shows an exemplary arrangement of an LED illumination system according to an eighth embodiment of the present invention.

Next, an LED illumination system according to an eighth embodiment of the present invention will be explained. FIG. 30 shows an exemplary arrangement of the LED illumination system according to the eighth embodiment. As roughly classified, the LED illumination system includes a light control apparatus (light adjustment/color adjustment controller) C and an LED illumination instrument (LED light-emitting device) 800.

The light control apparatus C has a pair of terminals T201, T202 and another pair of terminals T203, T204. The terminals T201, T202 are connected to a pair of commercial bus lines 1010 for supplying the commercial power source (for example, AC 100 V, 50 or 60 Hz). The terminal T203 is also connected to the commercial power source bus line 1010. The terminal T204 is connected via a power supply line 1020a to a terminal T205 of a pair of terminals T205, T206 provided for the LED illumination instrument 800. The terminal T206 is connected to the other of the commercial power source bus lines 1010.

The light control apparatus C comprises the main power source switch 141, the power source circuit 140 which is provided as the DC current generating unit, the microcomputer 180A which is provided as the first and second control units, and the XY switch 185 which is provided as the first and second operation units as explained in the second embodiment (FIG. 4). Details thereof are omitted from the explanation, because they have been explained in the second embodiment. However, it is also allowable that the power source circuit 140 does not have the generating function for DC 24 V as explained in the second embodiment.

On the other hand, the light control apparatus C is provided with a control signal generating circuit 191 which is provided as the control signal generating unit. The microcomputer 180A, which is provided in this embodiment, functions as the encoder which generates the digital value (luminance value) to indicate the luminance and the digital value (color temperature value) to indicate the chromaticity (color temperature in this embodiment) as the control information for the light adjustment and the color adjustment from the operation amount (control amount) (bit value represented by bits b0 to b5) for the light adjustment and the color adjustment inputted from the XY switch 185.

For example, the microcomputer 180A has a recording medium (memory) which holds the digital value for indicating the luminance value and the digital value for indicating the color temperature. The luminance value (digital value), which is held by the memory, is increased/decreased (updated) in accordance with the depression of the "U" button and the "D" button of the XY switch 185. The microcomputer 180A outputs the held luminance value to the signal line 180a. On the other hand, the microcomputer 180A increases/decreases the color temperature value (digital value) held in the memory in accordance with the depression of the "H" button and the "L" button. The microcomputer 180A outputs the held color temperature value to the signal line 180b. The respective digital values are expressed by predetermined bit numbers.

The control signal generating circuit 191 generates the control signal including the control information by using the shape of AC wave supplied from the commercial power source. The control signal generating circuit 191 is connected to the microcomputer 180A via the signal lines 180a, 180b, into which the luminance value and the color temperature value outputted from the microcomputer 180A are inputted. The control signal generating circuit 191 generates the control signal for the light adjustment and the color adjustment corresponding to the luminance value and the color temperature value by processing the shape of wave of the sine wave from the commercial power source inputted from the terminal T203, and the control signal is outputted from the terminal T204. Accordingly, the control signal for the light adjustment and the color adjustment is fed to the LED illumination instrument 800.

Figure 31:
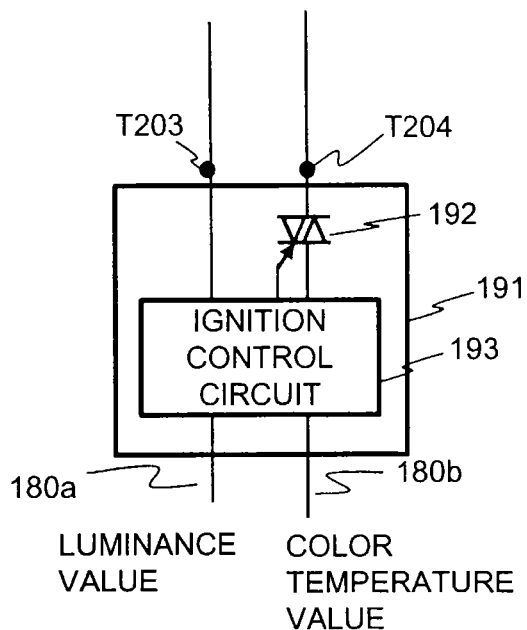
FIG. 31 shows a first form of a control signal generating circuit shown in FIG. 30.

Details of the arrangement of the control signal generating circuit 191 can be exemplified as follows. For example, as shown in FIG. 31, the control signal generating circuit 191 may include a triac 192 and an ignition control circuit 193 for the triac (first form). The ignition control circuit 193 controls the ignition timing of the triac 192 in accordance with the control information (luminance value and color temperature value) concerning the light adjustment and the color adjustment supplied from the microcomputer 180A in relation to the positive and negative half cycles with respect to the sine wave of the commercial AC current.

That is, the ignition control circuit 193 supplies the trigger signal to the triac 192 in order to perform the ignition at the ignition phase angle corresponding to one of the luminance value and the color temperature value (for example, the luminance value) in relation to the positive half cycle. On the other hand, the ignition control circuit 193 supplies the trigger signal to the triac 192 to perform the ignition at the ignition phase angle corresponding to the other of the luminance value and the color temperature value (for example, the color temperature value) in relation to the negative half cycle. The triac 192 allows the AC current from the commercial power source supplied from the terminal T203 to be in conduction in the ignition period of time until the voltage becomes 0 after obtaining the trigger signal.

Therefore, the AC current from the commercial power source is outputted as the control signal from the terminal T204 of the light control apparatus C in the conduction period of time corresponding to the luminance value and the color temperature value respectively. In the LED illumination instrument 800, the ignition phase angles can be recognized in the respective positive and negative half cycles of the triac 192 from the shape of AC wave (control signal wave shape) inputted from the terminal T205, and it is possible to obtain the control information concerning the color adjustment and the light adjustment corresponding to the luminance value and the color temperature value from the ignition phase angles.

Figure 32:
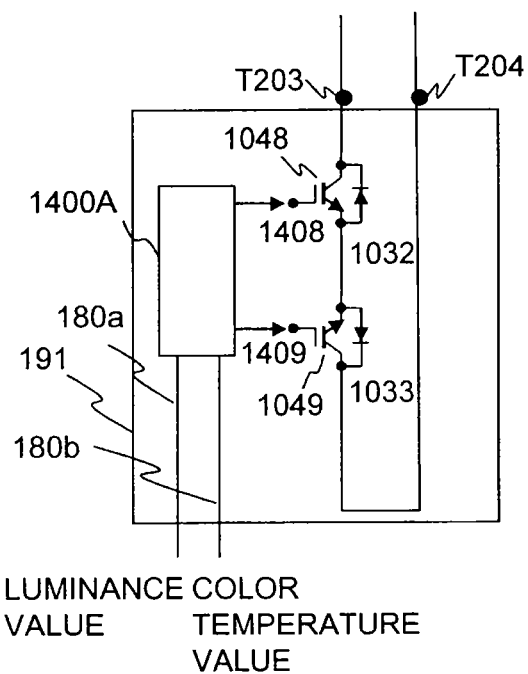
FIG. 32 shows a second form of the control signal generating circuit shown in FIG. 30.

Alternatively, the control signal generating circuit 191 may have a second form as shown in FIG. 32. The second form may include a logic circuit 1400A and a pair of IGBT's 1048, 1049 (diodes 1032, 1033) as explained in the seventh embodiment. In the control signal generating circuit 191 of the second form, the logic circuit 1400A imparts the signal to the gate of IGBT 1048 at the timing corresponding to one (for example, the luminance value) of the luminance value and the color temperature value supplied from the microcomputer 180A. On the other hand, the logic circuit 1400A imparts the signal to the gate of IGBT 1049 at the timing corresponding to the other (for example, the color temperature value) of the luminance value and the color temperature value.

Accordingly, the sine wave from the commercial power source has the shape of wave (control signal) including the shutoff portion corresponding to the luminance value and the color temperature value in the respective positive and negative half cycles of the sine wave. The shape of AC wave (control signal) as described above is outputted from the terminal T204, which is supplied to the LED illumination instrument 800. In the LED illumination instrument 800, it is possible to obtain the control information corresponding to the luminance value and the color temperature value from the position of the shutoff portion (shutoff phase angle) of the AC shape of wave inputted from the terminal T205.

The LED illumination instrument 800 comprises the terminal T205, a power source circuit 801 which is connected to the terminal 206, a power source circuit 802, a control circuit 803 which includes the microcomputer, and a digital/analog converter (D/A converter) 804. The LED illumination instrument 800 further comprises a total current defining circuit 830, an individual current value adjusting circuit 840, and an LED module 1060 which is the same as or equivalent to that of the sixth embodiment.

The power source circuit 801 has a rectifier circuit for converting the commercial power source AC current from the bus lines 1010 into the DC current, while the power source circuit 801 generates the voltage (for example, 24 V) for driving LED so that the voltage is outputted to a wiring line 806. The power source circuit (constant voltage source) 802 obtains the voltage (for example, 3.3 V) for operating the control circuit 803 from the voltage from the wiring line 806, and the obtained voltage is inputted into the control circuit 803.

Figure 33:
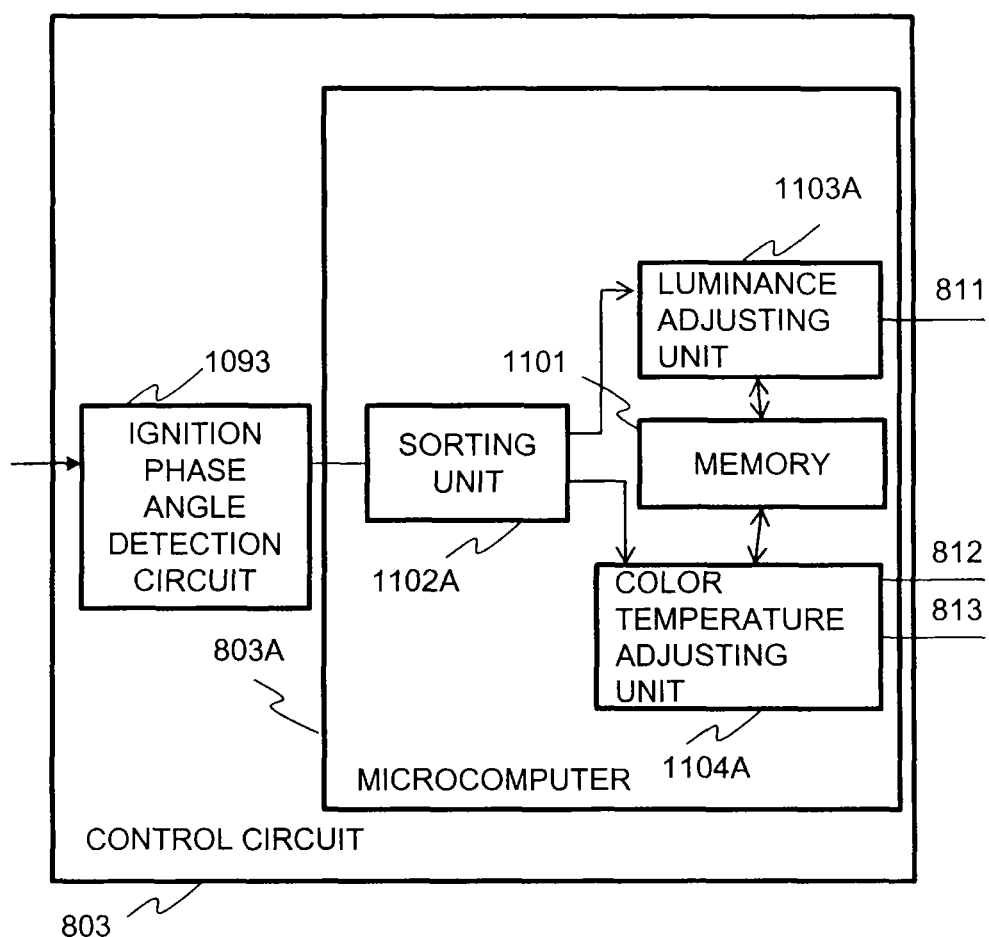
FIG. 33 shows a first form of a control circuit included in an LED illumination instrument shown in FIG. 30.

An arrangement of the control circuit 803 shown in FIG. 33 is applied to the first form shown in FIG. 31. With reference to FIG. 33, the control circuit 803 is provided with an ignition phase angle detection circuit 1093 for detecting the ignition phase angle, and the microcomputer 803A. The microcomputer 803A is operated in accordance with the operation clock supplied from a crystal oscillator 805 (FIG. 30). The microcomputer 803A is provided with a memory 1101. Further, the microcomputer 803A is provided with a sorting unit (distributing unit) 1102A, a luminance adjusting unit 1103A, and a color temperature adjusting unit 1104A as the function realized by executing the program by the unillustrated processor provided for the microcomputer 803A.

The ignition angle detection circuit 1093 determines the ignition phase angles in the positive and negative half cycles in the control signal supplied from the light control apparatus C. The sorting unit 1102A delivers the positive ignition phase angle to the luminance adjusting unit 1103A, and the sorting unit 1102A delivers the negative ignition phase angle to the color temperature adjusting unit 1104A.

The luminance adjusting unit 1103A makes reference to a correspondence table (not shown) which stores the ignition phase angle and the luminance value correlated to one another as held in the memory 1101, and the luminance value, which corresponds to the ignition phase angle obtained from the sorting unit 1102A, is obtained from the correspondence table. Accordingly, it is possible to obtain (restore) the luminance value outputted by the microcomputer 803A. The luminance value is outputted to the wiring line 811.

The color temperature adjusting unit 1104A makes reference to a correspondence table (not shown) which stores the ignition phase angle and the color temperature value correlated to one another as held in the memory 1101, and the color temperature value, which corresponds to the ignition phase angle obtained from the sorting unit 1102A, is obtained from the correspondence table. The color temperature value is composed of the color temperature value for the LED group 1060a to be outputted to the wiring line 812 and the color temperature value for the LED group 1060b to be outputted to the wiring line 813. The respective color temperature values are outputted to the wiring lines 812, 813.

Figure 34:
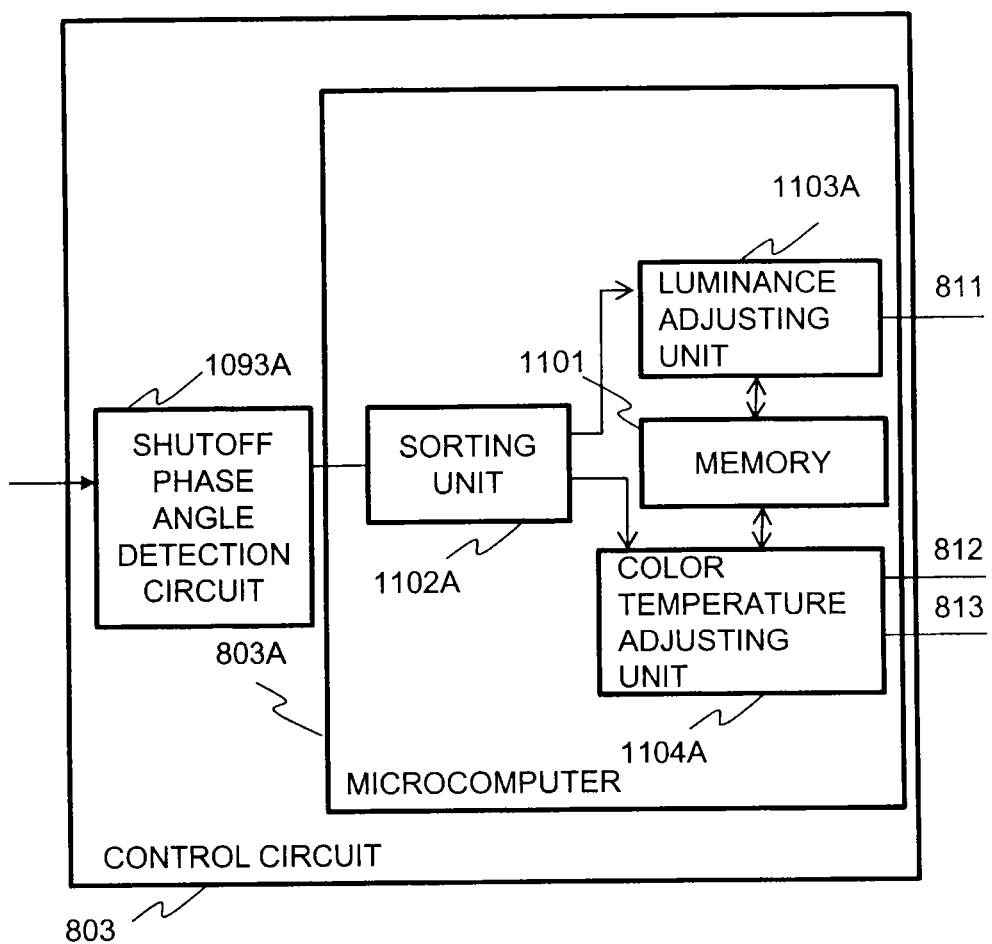
FIG. 34 shows a second form of the control circuit included in the LED illumination instrument shown in FIG. 30.

An arrangement of the control circuit 803 shown in FIG. 34 is applied to the second form shown in FIG. 32. With reference to FIG. 34, the control circuit 803 has the same arrangement as that shown in FIG. 33 except that the control circuit 803 comprises a (shutoff phase) angle detection circuit 1093A in place of the ignition phase angle detection circuit 1093.

The angle detection circuit 1093A detects the shutoff phase angles in the positive and negative half cycles in the control signal. The sorting unit 1102A feeds the shutoff phase angle in the positive half cycle to the luminance adjusting unit 1103A, and the sorting unit 1102A feeds the shutoff phase angle in the negative half cycle to the color temperature adjusting unit 1104A. As described above, the control device 803 functions as a decoder which receives the control signal for the light adjustment and the color adjustment from the light control apparatus C and which obtains the luminance value and the color temperature value from the control signal.

The total current defining circuit 830 includes an operational amplifier 831, a resistor 832, and a transistor 833. The individual current value adjusting circuit 840 includes operational amplifiers 841, 842, resistors 846, 843, and transistors 844, 845.

The microcomputer 803A of the control circuit 803 is connected to the D/A converter 804 via the wiring lines 811, 812, and 813. The D/A converter 804 is connected to the wiring line 806 via a wiring line 821, a Zener diode 834, and a resistor 835. The terminal of the operation amplifier 831 is connected between the Zener diode 834 and the resistor 835. The D/A converter 804 is connected to one terminal of the operation amplifier 841 via a wiring line 822, and the D/A converter 804 is connected to one terminal of the operation amplifier 842 via a wiring line 823.

When the operator intends the increase in the luminance and the operator depresses the U button of the XY switch 185 in the LED illumination instrument 800 as described above, then the luminance value, which is outputted from the microcomputer 803A to the wiring line 811, is decreased. The D/A converter 804 generates the analog electric potential corresponding to the luminance value on the wiring line 821.

As a result, the analog electric potential of the wiring line 831 is lowered, the base electric potential of the transistor 833, which is the output of the operation amplifier 831, is also lowered, and the emitter current of the pnp transistor 833 is increased. Therefore, the total current, which is supplied to the respective LED groups 1060a, 1060b of the LED module 1060, is increased, and the light, which is emitted from the LED module 1060, is brightened as compared with the light having been previously emitted (luminance is raised). On the contrary, when the D button of the XY switch 185 is depressed, then the action, which is opposite to the above, is caused, and the light, which is emitted from the LED module 1060, is darkened.

When the operator intends to increase the color temperature and the operator depresses the H button of the XY switch 185, then the color temperature value, which is outputted from the microcomputer 803A to the wiring line 812, is increased, while the color temperature value, which is outputted from the microcomputer 803A to the wiring line 813, is lowered. The D/A converter 804 generates the analog electric potential corresponding to the color temperature value supplied from the wiring line 812 on the wiring line 822, while the D/A converter generates the analog electric potential corresponding to the color temperature value supplied from the wiring line 813 on the wiring line 823.

As a result, the analog electric potential of the wiring line 822 is raised, the base electric potential of the npn transistor 844, which is the output of the operational amplifier 841, is also raised, and the collector current of the npn transistor 844 is increased. On the other hand, the base electric potential of the npn transistor 845, which is the output of the operational amplifier 842, is lowered, and the collector current of the npn transistor 845 is decreased.

Therefore, the light emission amount of the LED group 1060a having the high color temperature is larger than the light emission amount of the LED group 1060b having the low color temperature. The color temperature is raised as the entire LED module 1060 to provide a bluish pale blue color. When the decrease in the color temperature is intended, and the L button of the XY switch 185 is depressed, then the action, which is opposite to the above, is caused. The light emission amount of the LED group 1060a is decreased, and the light emission amount of the LED group 1060b is increased. Accordingly, the color temperature of the LED module 1060 is lowered. In accordance with the operation as described above, the luminance and the color temperature of the LED module 1060 can be adjusted to have the desired values.

In the example shown in FIG. 30, the total current defining circuit 830, which is independent from the individual current value adjusting circuit 840, is provided. On the other hand, the following modification can be made. That is, the control value, with which the average currents supplied to the LED groups 1060a, 1060b are increased/decreased, is outputted from the wiring lines 812, 813 in a state in which the ratio of the average currents supplied to the LED groups 1060a, 1060b respectively is unchanged, on the basis of the luminance value obtained by the microcomputer 803A, with respect to the individual current value adjusting circuit 840. According to the modification as described above, the luminance adjustment can be also carried out by the individual current value adjusting circuit 840. Therefore, it is possible to omit the arrangement concerning the total current defining circuit 830.

The arrangements in the embodiments explained above can be appropriately combined with each other within a range without deviating from the object of the present invention.

What is claimed is:

1. An LED illumination system, comprising:
a light control apparatus; and
an LED illumination apparatus including a first LED and a second LED which have mutually different chromaticities and which are connected in anti-parallel,
wherein the light control apparatus is connected to the LED illumination apparatus via only a pair of two wiring lines, and comprises:
a DC current generating unit which generates a DC power source from an AC current supplied from an AC power source;
a first operation unit which is provided to operate a luminance of an illumination light from the first LED and the second LED;
a second operation unit which is provided to operate a chromaticity of the illumination light from the first LED and the second LED;
a first control unit which determines a total amount of average currents to be supplied to the first LED and the second LED at every predetermined period depending on an operation amount of the first operation unit;
a second control unit which determines a ratio between the average currents to be supplied to the first LED and the second LED respectively at the every predetermined period depending on an operation amount of the second operation unit; and
a supply unit which converts the DC current supplied from the DC current generating unit to an AC current including one of positive and negative currents to be supplied to the first LED and the other of the positive and negative currents to be supplied to the second LED as having the total amount of the average currents and the ratio between the average currents determined by the first and second control units at the every predetermined period and which supplies the AC current to the LED illumination apparatus.

2. The LED illumination system according to claim 1, wherein:
the first control unit includes a comparator which compares a triangular wave voltage having a cycle equal to that of an AC voltage of the AC power source with a reference voltage corresponding to the operation amount of the second operation unit for defining a slice level for the triangular wave voltage and which outputs a positive/negative rectangular wave voltage;
the second control unit includes a pulse width adjusting circuit which determines a duty ratio of the current to be supplied to the LED illumination apparatus in each of positive and negative periods of time in 1 cycle of the positive/negative rectangular wave voltage depending on the operation amount of the first operation unit; and
the supply unit supplies the positive current at the duty ratio determined by the pulse width adjusting circuit to one of the first LED and the second LED in the positive period of time of the positive/negative rectangular wave voltage, while the supply unit supplies the negative current at the duty ratio determined by the pulse width adjusting circuit to the other of the first LED and the second LED in the negative period of time of the positive/negative rectangular wave voltage.

3. The LED illumination system according to claim 1, wherein:
the supply unit includes a driving circuit into which positive and negative pulses are inputted at the every predetermined period so that the positive current is supplied to the LED illumination apparatus for a time in which the positive pulse is turned ON, while the negative current is supplied to the LED illumination apparatus for a time in which the negative pulse is turned ON;
the first control unit determines the ON time of the positive pulse and the ON time of the negative pulse in the predetermined period depending on the operation amount of the first operation unit; and
the second control unit determines a ratio between the ON time of the positive pulse and the ON time of the negative pulse in the predetermined period depending on the operation amount of the second operation unit.

4. The LED illumination system according to claim 3, wherein:
the first control unit determines numbers of the positive and negative pulses having predetermined pulse widths respectively in the predetermined period depending on the operation amount of the first operation unit; and
the second control unit determines the pulse widths of the positive and negative pulses.

5. A light control apparatus which controls an LED illumination apparatus including a first LED and a second LED which have different wavelength regions and which are connected in anti-parallel, the light control apparatus being connected to the LED illumination apparatus via only a pair of two wiring lines, and comprising:
a DC current generating unit which generates a DC power source converted an AC current provided from an AC power line;
a first operation unit which is provided to operate a luminance of an illumination light brought about by turning ON the first LED and the second LED;
a second operation unit which is provided to operate a color or a color temperature of the illumination light brought about by turning ON the first LED and the second LED;
a first control unit which determines a total amount of average currents to be supplied to the first LED and the second LED at every predetermined cycle depending on an operation amount of the first operation unit;
a second control unit which determines a ratio between the average currents to be supplied to the first LED and the second LED respectively at the every predetermined cycle depending on an operation amount of the second operation unit; and
a supply unit which generates an AC current, either one of positive and negative currents of which is supplied to the first LED and the other one of the positive and negative currents of which is supplied to the second LED, having the total amount of the average currents and the ratio between the average currents determined by the first and second control units at the every predetermined cycle by using the DC power source obtained by the DC current generating unit and which supplies the AC current to the LED illumination apparatus.

6. The light control apparatus according to claim 5, wherein:
the first control unit includes a comparator which compares a triangular wave voltage having a cycle equal to that of an AC voltage of the AC power source with a reference voltage corresponding to the operation amount of the second operation unit for defining a slice level for the triangular wave voltage and which outputs a positive/negative rectangular wave voltage;
the second control unit includes a pulse width adjusting circuit which determines a duty ratio of the current to be supplied to the LED illumination apparatus in each of positive and negative periods of time in 1 cycle of the positive/negative rectangular wave voltage depending on the operation amount of the first operation unit; and
the supply unit supplies the positive current at the duty ratio determined by the pulse width adjusting circuit to one of the first LED and the second LED in the positive period of time of the positive/negative rectangular wave voltage, while the supply unit supplies the negative current at the duty ratio determined by the pulse width adjusting circuit to the other of the first LED and the second LED in the negative period of time of the positive/negative rectangular wave voltage.

7. The light control apparatus system according to claim 5, wherein:
the supply unit includes a driving circuit into which positive and negative pulses are inputted at the every predetermined cycle so that the positive current is supplied to the LED illumination apparatus for a time in which the positive pulse is turned ON, while the negative current is supplied to the LED illumination apparatus for a time in which the negative pulse is turned ON;
the first control unit determines the ON time of the positive pulse and the ON time of the negative pulse in the predetermined cycle depending on the operation amount of the first operation unit; and
the second control unit determines a ratio between the ON time of the positive pulse and the ON time of the negative pulse in the predetermined cycle depending on the operation amount of the second operation unit.

8. The light control apparatus according to claim 7, wherein:
the first control unit determines numbers of the positive and negative pulses having predetermined pulse widths respectively in the predetermined cycle depending on the operation amount of the first operation unit; and
the second control unit determines the pulse widths of the positive and negative pulses.

9. An LED illumination system, comprising:
a light control apparatus; and
an LED illumination instrument including a first LED and a second LED which have different chromaticity each other,
wherein the light control apparatus being connected to the LED illumination apparatus via only a pair of two wiring lines, and comprises:
a DC current generating unit which generates a DC power source from an AC current supplied from an AC power line;
a first operation unit which is provided to operate a luminance of an illumination light brought about by turning ON the first LED and the second LED;
a second operation unit which is provided to operate a chromaticity of the illumination light brought about by turning ON the first LED and the second LED;
a first control unit which determines a total amount of average currents to be supplied to the first LED and the second LED at every predetermined cycle depending on an operation amount from the first operation unit;
a second control unit which determines a ratio between the average currents to be supplied to the first LED and the second LED respectively at the every predetermined cycle depending on an operation amount from the second operation unit; and
a supply unit which generates a current to be supplied to the first LED and a current to be supplied to the second LED as having the total amount of the average currents and the ratio between the average currents determined by the first and second control units at the every predetermined cycle by using the DC power source obtained by the DC current generating unit and which supplies the currents to the LED illumination instrument.

10. The LED illumination system according to claim 9, wherein:

the first control unit includes a comparator which compares a triangular wave voltage having a cycle equal to that of an AC voltage of the AC power source with a reference voltage corresponding to the operation amount of the second operation unit for defining a slice level for the triangular wave voltage and which outputs a positive/negative rectangular wave voltage;
the second control unit includes a pulse width adjusting circuit which determines a duty ratio of the current to be supplied to the LED illumination apparatus in each of positive and negative periods of time in 1 cycle of the positive/negative rectangular wave voltage depending on the operation amount of the first operation unit; and
the supply unit supplies the positive current at the duty ratio determined by the pulse width adjusting circuit to one of the first LED and the second LED in the positive period of time of the positive/negative rectangular wave voltage, while the supply unit supplies the negative current at the duty ratio determined by the pulse width adjusting circuit to the other of the first LED and the second LED in the negative period of time of the positive/negative rectangular wave voltage.

11. The LED illumination system according to claim 9, wherein:
the supply unit includes a driving circuit into which positive and negative pulses are inputted at the every predetermined cycle so that the positive current is supplied to the LED illumination apparatus for a time in which the positive pulse is turned ON, while the negative current is supplied to the LED illumination apparatus for a time in which the negative pulse is turned ON;
the first control unit determines the ON time of the positive pulse and the ON time of the negative pulse in the predetermined cycle depending on the operation amount of the first operation unit; and
the second control unit determines a ratio between the ON time of the positive pulse and the ON time of the negative pulse in the predetermined cycle depending on the operation amount of the second operation unit.

12. The LED illumination system according to claim 11, wherein:
the first control unit determines numbers of the positive and negative pulses having predetermined pulse widths respectively in the predetermined cycle depending on the operation amount of the first operation unit; and
the second control unit determines the pulse widths of the positive and negative pulses.

13. An LED illumination instrument comprising:
a first LED and a second LED which have different chromaticity each other and are connected to each other such that they provide only a pair of two wiring lines for control of the first and second LEDs;
a DC current generating unit which generates a DC current from an AC current;
receiving means which receives total amount information of average currents to be supplied to the first LED and the second LED and ratio information of the average currents to be supplied to the first LED and the second LED respectively from a light control apparatus;
calculating means which calculates a total amount and ratio of the average currents using the total amount information and the ratio information; and
supply means which generates currents corresponding to the total amount and the ratio of the average currents and supplies the currents to the first LED and the second LED.

* * * * *